US011918517B2

(12) United States Patent
Graves et al.

(10) Patent No.: US 11,918,517 B2
(45) Date of Patent: Mar. 5, 2024

(54) COVER SYSTEMS FOR BLOCKING APERTURES OF PATIENT SUPPORT APPARATUSES

(71) Applicant: Stryker Corporation, Kalamazoo, MI (US)

(72) Inventors: Michael W. Graves, Paw Paw, MI (US); Matthew A. Cutler, Portage, MI (US); Anish Paul, Kalamazoo, MI (US); Christopher Ryan Sweeney, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/945,264

(22) Filed: Sep. 15, 2022

(65) Prior Publication Data

US 2023/0115550 A1 Apr. 13, 2023

Related U.S. Application Data

(60) Provisional application No. 63/253,283, filed on Oct. 7, 2021.

(51) Int. Cl.

| | |
|---|---|
| ***A61G 1/048*** | (2006.01) |
| ***A61G 1/02*** | (2006.01) |
| ***A61G 1/044*** | (2006.01) |

(52) U.S. Cl.
CPC ............... *A61G 1/048* (2013.01); *A61G 1/02* (2013.01); *A61G 1/044* (2013.01)

(58) Field of Classification Search
USPC .............................................................. 5/628
See application file for complete search history.

(56) References Cited

U.S. PATENT DOCUMENTS

| | | |
|---|---|---|
| 4,430,763 A | 2/1984 | Whitehead |
| 5,023,967 A | 6/1991 | Ferrand |
| 5,097,550 A | 3/1992 | Marra, Jr. |

(Continued)

FOREIGN PATENT DOCUMENTS

| | | |
|---|---|---|
| WO | 2021138176 A1 | 7/2021 |

OTHER PUBLICATIONS

Hillrom, "Pro+Surface Webpage", 2022, 4 pages.

*Primary Examiner* — Justin C Mikowski
*Assistant Examiner* — Adam C Ortiz
(74) *Attorney, Agent, or Firm* — Howard & Howard Attorneys PLLC

(57) ABSTRACT

A cover system for selectively blocking insertion of unauthorized objects through an aperture of a restraint mount of a patient support apparatus is provided. The cover system includes a cover and an instrument having an interface. The cover includes a brace and a restrictor coupled to the brace. The brace attaches to the patient support apparatus adjacent to the aperture and the restrictor operates in a restrict mode blocks access to the aperture and a permit mode where the restrictor permits access to the aperture. The cover also includes a lock mechanism, which includes a keeper movable between a locked state where movement of the restrictor is inhibited and an unlocked state where movement of the restrictor is permitted. The keeper moves from the locked state to the unlocked state in response to selective engagement between the interface of the instrument and a receiver of the lock mechanism.

20 Claims, 53 Drawing Sheets

(56) References Cited

U.S. PATENT DOCUMENTS

| | | | | |
|---|---|---|---|---|
| 5,433,222 | A | 7/1995 | Boomgaarden et al. | |
| 5,557,817 | A | 9/1996 | Haddock | |
| 5,575,025 | A | 11/1996 | Peters | |
| 5,749,112 | A | 5/1998 | Metzler | |
| 6,615,426 | B1 | 9/2003 | Risk, Jr. | |
| 6,928,673 | B2 | 8/2005 | Risk, Jr. | |
| 8,269,631 | B2 * | 9/2012 | Yang | E05B 73/0052 340/572.1 |
| 8,590,115 | B2 * | 11/2013 | Lumsden | F16G 11/14 24/132 R |
| 9,044,365 | B2 | 6/2015 | Rawls-Meehan | |
| 9,173,793 | B2 | 11/2015 | Rawls-Meehan | |
| 9,311,797 | B2 * | 4/2016 | Yang | G08B 13/2434 |
| 10,385,591 | B2 * | 8/2019 | Yang | G08B 13/2434 |
| 2004/0172988 | A1 * | 9/2004 | Gorst | E05B 73/0041 70/57.1 |
| 2005/0108825 | A1 | 5/2005 | Tayoun | |
| 2006/0021394 | A1 * | 2/2006 | Belden, Jr. | E05B 73/0041 70/57.1 |
| 2017/0165097 | A1 | 6/2017 | Patmore et al. | |
| 2017/0172829 | A1 | 6/2017 | Tessmer et al. | |
| 2021/0093498 | A1 | 4/2021 | Lafleche et al. | |
| 2022/0372787 | A1 * | 11/2022 | Lorusso | E05B 5/003 |

* cited by examiner

COVER SYSTEMS FOR BLOCKING APERTURES OF PATIENT SUPPORT APPARATUSES

CROSS-REFERENCE TO RELATED APPLICATION

The subject patent application claims priority to and all the benefits of U.S. Provisional Patent Application No. 63/253,283, filed on Oct. 7, 2021, the disclosure of which is hereby incorporated by reference in its entirety.

BACKGROUND

Certain types of patient support apparatuses may include one or more restraint mounts configured to facilitate removably attaching patients in order to, among other things, prevent patient harm. To this end, restraint mounts are typically arranged at different locations about the patient support apparatus, and may be defined such as by discrete rigid members (e.g., bent bars, rods, and the like) and/or by apertures formed into other components or structural features of the patient support apparatus (e.g., deck sections of a patient support deck). Generally, when there is a need to restrain a patient, one or more caregivers will attach patient restraints to the restraint mounts by passing webbing, loops, fasteners, and the like of the patient restraint through apertures of the restraint mounts in order to secure the patient restraints to the patient support apparatus, and will then subsequently restrain the patient by attaching or otherwise securing the patient restraints to the patient.

In some scenarios, a patient who has not been restrained to the patient support apparatus may tamper with restraint mounts or other portions of the patient support apparatus. For example, in various behavioral health settings, an unrestrained patient may try to pass unauthorized objects through the apertures of the restraint mounts in order to cause self-harm, or may attempt to damage or otherwise remove various portions of the patient support apparatus.

While patient support apparatuses have generally performed well for their intended use, there remains a need in the art for patient support apparatuses and systems which provide improved usability and safety for both caregivers and patients in a number of different health care settings.

SUMMARY

The present disclosure is directed towards a cover system for selectively blocking insertion of unauthorized objects through an aperture of a restraint mount of a patient support apparatus. The cover system includes an instrument having an interface; and a cover including: a brace configured for attaching to the patient support apparatus adjacent to the aperture, a restrictor movably coupled to the brace and arranged for operation between: a restrict mode where the restrictor is arranged relative to the brace to block access to the aperture of the restraint mount; and a permit mode where the restrictor is arranged relative to the brace to at least partially permit access to the aperture of the restraint mount, and a lock mechanism interposed between the brace and the restrictor, the lock mechanism including a receiver shaped to receive the interface of the instrument, and a keeper being movable between: a locked state to inhibit movement of the restrictor relative to the brace to maintain the restrictor in the restrict mode; and an unlocked state to permit movement of the restrictor relative to the brace to change operation of the restrictor between the permit mode and the restrict mode, where the keeper of the lock mechanism moves from the locked state to the unlocked state in response to selective engagement occurring between the interface of the instrument and the receiver of the lock mechanism.

The present disclosure is also directed towards a patient support system including an instrument having an interface; a patient support apparatus including: a support structure may include a base and a patient support deck; a restraint mount defining an aperture; and an apparatus device configured to control a function associated with operation of the patient support apparatus between a first apparatus mode and a second apparatus mode different from the first apparatus mode, the apparatus device including an apparatus receiver shaped to receive the interface of the instrument, where selective engagement occurring between the interface of the instrument and the apparatus receiver of the apparatus device changes operation between the first apparatus mode and the second apparatus mode; and a cover for selectively blocking insertion of unauthorized objects through the aperture of the restraint mount, the cover including: a brace configured for attaching to the patient support apparatus adjacent to the aperture, a restrictor movably coupled to the brace and arranged for operation between: a restrict mode where the restrictor is arranged relative to the brace to block access to the aperture of the restraint mount; and a permit mode where the restrictor is arranged relative to the brace to at least partially permit access to the aperture of the restraint mount, and a lock mechanism interposed between the brace and the restrictor, the lock mechanism including a receiver shaped to receive the interface of the instrument, and a keeper being movable between: a locked state to inhibit movement of the restrictor relative to the brace to maintain the restrictor in the restrict mode; and an unlocked state to permit movement of the restrictor relative to the brace to change operation of the restrictor between the permit mode and the restrict mode, where the keeper of the lock mechanism moves from the locked state to the unlocked state in response to selective engagement occurring between the interface of the instrument and the receiver of the lock mechanism.

DETAILED DESCRIPTION

Figure 1:
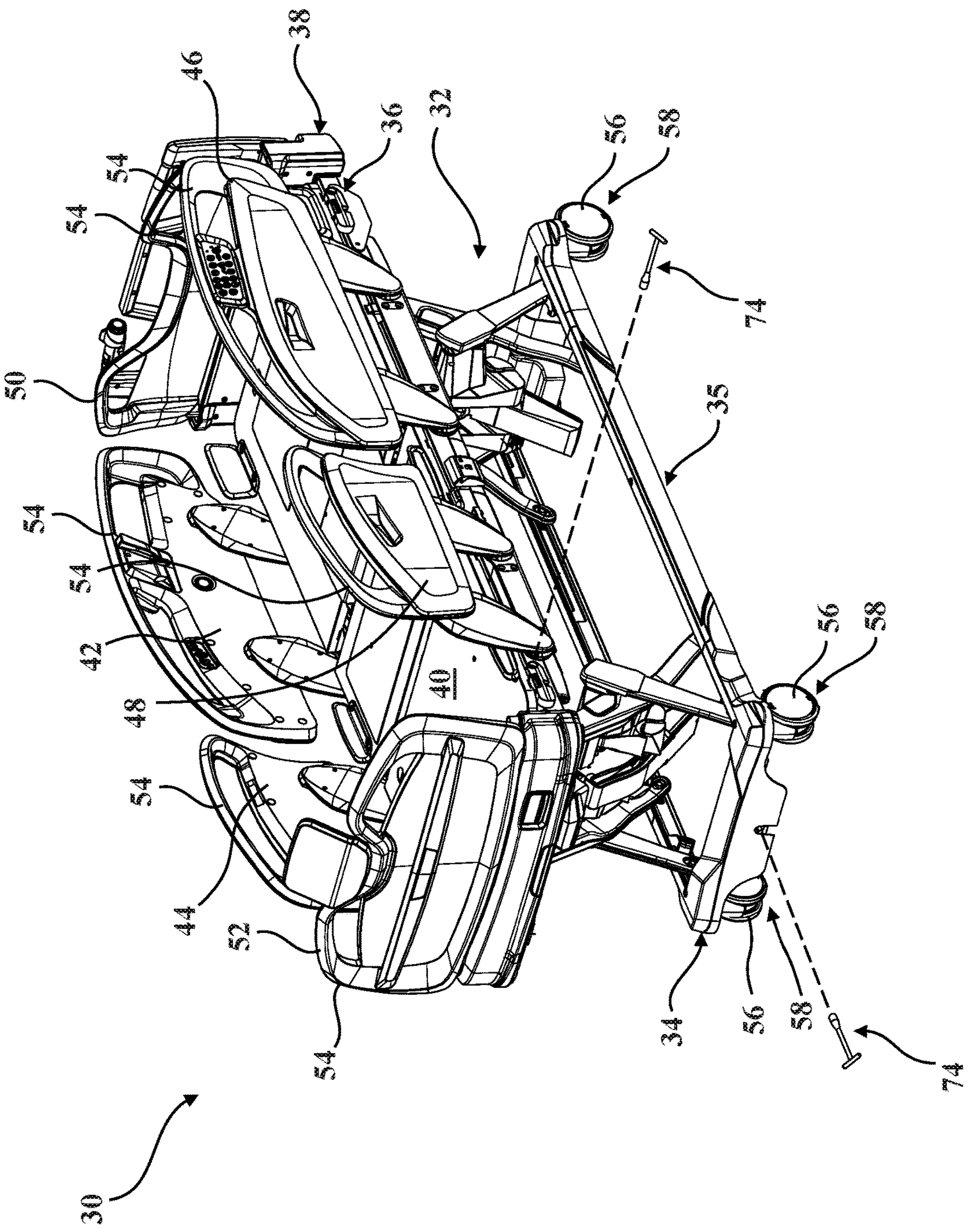
FIG. 1 is perspective view of a patient support apparatus.

Referring to FIG. 1, a patient support apparatus 30 is shown for supporting a patient in a health care setting. The patient support apparatus 30 illustrated in FIG. 1 comprises a hospital bed. In other versions, however, the patient support apparatus 30 may comprise a stretcher, cot, table, wheelchair, chair, or similar apparatus utilized in the care of a patient.

A support structure 32 provides support for the patient. The support structure 32 illustrated in FIG. 1 comprises a base 34 and a intermediate frame 36. The base 34 comprises a base frame 35. The intermediate frame 36 is spaced above the base frame 35 in FIG. 1. The support structure 32 also comprises a patient support deck 38 disposed on the intermediate frame 36. The patient support deck 38 provides a patient support surface 40 upon which the patient is supported.

A mattress (not shown) is disposed on the patient support deck 38 during use. The mattress comprises a secondary patient support surface upon which the patient is supported. The base 34, intermediate frame 36, patient support deck 38, and patient support surfaces each have a head end and a foot end corresponding to designated placement of the patient's head and feet on the patient support apparatus 30. The construction of the support structure 32 may take on any known design, and is not limited to that specifically set forth above. In addition, the mattress may be omitted in certain versions, such that the patient rests directly on the patient support surface 40.

Patient barriers, such as side rails 42, 44, 46, 48 are coupled to the intermediate frame 36 and/or patient support deck 38 and are thereby supported by the base 34. A first side rail 42 is positioned at a right head end. A second side rail 44 is positioned at a right foot end. A third side rail 46 is positioned at a left head end. A fourth side rail 48 is positioned at a left foot end. If the patient support apparatus 30 is a stretcher or a cot, there may be fewer side rails. The side rails 42, 44, 46, 48 are movable to a raised position in which they block ingress and egress into and out of the patient support apparatus 30, one or more intermediate positions, and a lowered position in which they are not an obstacle to such ingress and egress. Such side rails and the manner in which they may be raised/lowered are shown and described in U.S. Patent Application Publication No. 2017/0172829, filed on Dec. 15, 2016 and entitled "Powered Side Rail For A Patient Support Apparatus," hereby incorporated by reference in its entirety.

A headboard 50 and a footboard 52 are coupled to the intermediate frame 36. The headboard 50 and footboard 52 may be coupled to any location on the patient support apparatus 30, such as the intermediate frame 36 or the base 34. In still other versions, the patient support apparatus 30 does not include the headboard 50 and/or the footboard 52.

Caregiver interfaces 54, such as handles, are shown integrated into the headboard 50, footboard 52, and side rails 42, 44, 46, 48 to facilitate movement of the patient support apparatus 30 over a floor surface. Additional caregiver interfaces 54 may be integrated into other components of the patient support apparatus 30. The caregiver interfaces 54 are graspable by the caregiver to manipulate the patient support apparatus 30 for movement, to move the side rails 42, 44, 46, 48, and the like.

Other forms of the caregiver interface 54 are also contemplated. The caregiver interface may comprise one or more handles coupled to the intermediate frame 36. The caregiver interface may simply be a surface on the patient support apparatus 30 upon which the caregiver logically applies force to cause movement of the patient support apparatus 30 in one or more directions, also referred to as a push location. This may comprise one or more surfaces on the intermediate frame 36 or base 34. This could also comprise one or more surfaces on or adjacent to the headboard 50, footboard 52, and/or side rails 42, 44, 46, 48. In other versions, the caregiver interface may comprise separate handles for each hand of the caregiver. For example, the caregiver interface may comprise two handles.

Wheels 56 are coupled to the base 34 to facilitate transport over a floor surface. The wheels 56 are arranged in each of four quadrants of the base 34 adjacent to corners of the base 34. In the version shown, the wheels 56 are caster wheels able to rotate and swivel relative to the support structure 32 during transport. Each of the wheels 56 forms part of a caster assembly 58. Each caster assembly 58 is mounted to the base 34. It should be understood that various configurations of the caster assemblies 58 are contemplated. In addition, in some versions, the wheels 56 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels.

In other versions, one or more auxiliary wheels (powered or non-powered), which are movable between stowed positions and deployed positions, may be coupled to the support structure 32. In some cases, when these auxiliary wheels are located between caster assemblies 58 and contact the floor surface in the deployed position, they cause two of the caster assemblies 58 to be lifted off the floor surface thereby shortening a wheel base of the patient support apparatus 30. A fifth wheel may also be arranged substantially in a center of the base 34.

Figure 2:
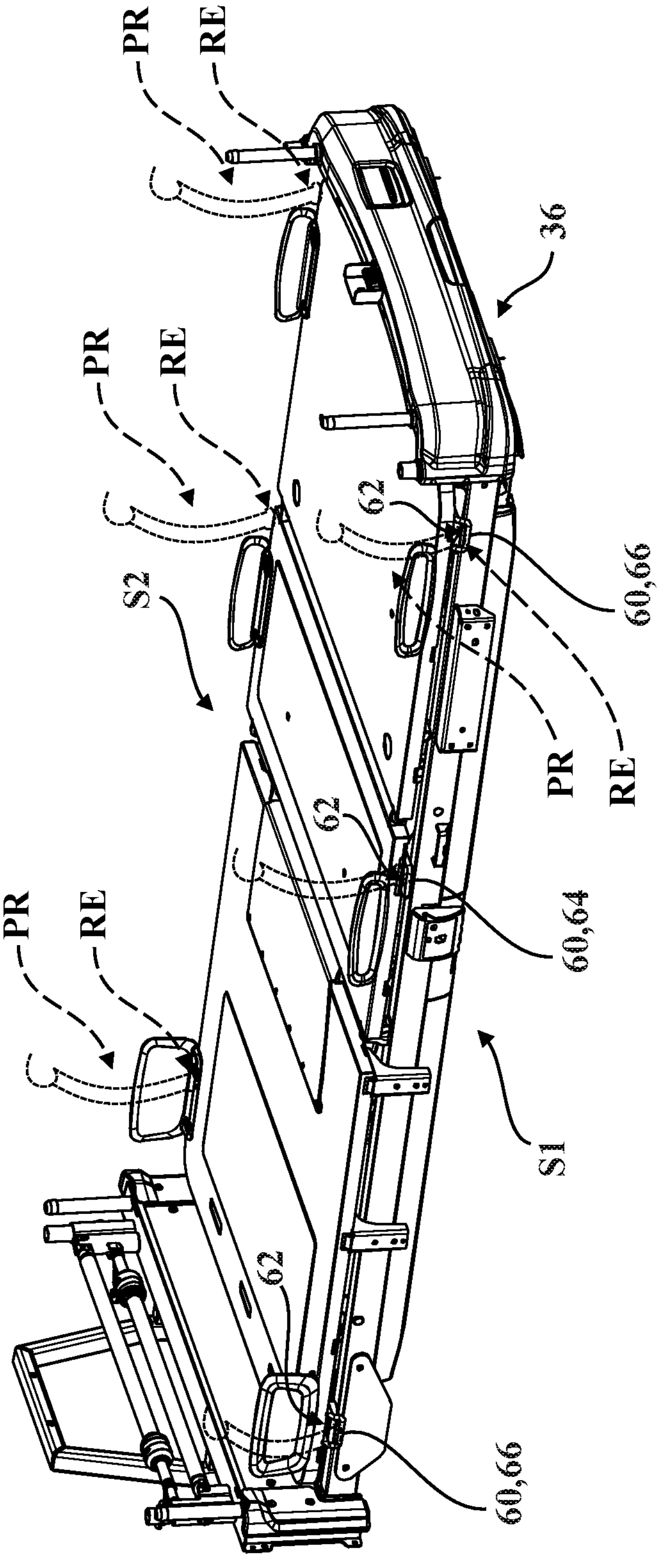
FIG. 2 is a perspective view of a portion of a support structure of the patient support apparatus of FIG. 1 including an intermediate frame.

As shown in FIG. 2, the patient support apparatus 30 may include one or more restraint mounts 60 configured to extend from the patient support deck 38. Each restraint mount 60 may include or otherwise define one or more apertures 62. In the instance of FIG. 2, each restraint mount 60 includes one aperture 62; however, in other instances, each restraint mount 60 may include a greater number of apertures 62. The restraint mounts 60 are configured to allow a patient to be secured to the patient support deck 38. To this end, a restraint end RE of a patient restraint PR (depicted schematically) may be passed through the aperture 62 of one or more restraint mounts 60 to secure a patient to the patient support deck 38. Those having ordinary skill in the art will appreciate that patient restraints PR could be realized in a number of different ways, such as by various arrangements of webbing, straps, buckles, carabineers, fasteners, cords, cuffs, padding, and the like. In some versions, patient restraints PR may be similar to as is described in U.S. Patent Application Publication No. US 2017/0165097 A1, filed on Dec. 6, 2016 and entitled "Patient Restraint System And Methods For Assisting A Caregiver With Patient Restraint," hereby incorporated by reference in its entirety. Other configurations are contemplated.

The intermediate frame 36, or other portions of the patient support apparatus 30, may include any suitable number of restraint mounts 60 and/or apertures 62. For example, in the instance of FIG. 2, the intermediate frame 36 includes three restraint mounts 60 and three apertures 62 on each lateral side S1, S2 of the intermediate frame 36, with the three restraint mounts 60 and three apertures 62 on the lateral side S1 being shown. In other instances, the intermediate frame 36 may include a greater or fewer number of restraint mounts 60 and/or apertures 62 on each lateral side S1, S2. Additionally, the intermediate frame 36 may include a different number of restraint mounts 60 and/or apertures 62 on each lateral side S1, S2.

Figure 3A:
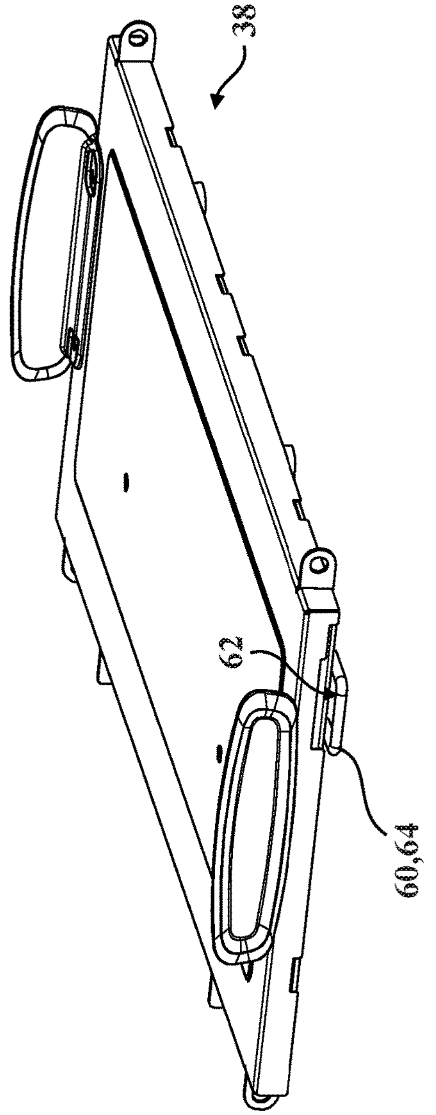
FIG. 3A is a perspective view of a portion of a patient support deck of the patient support apparatus of FIG. 1, the portion of the patient support deck including a restraint mount including a straight rod structure.
Figure 4A:
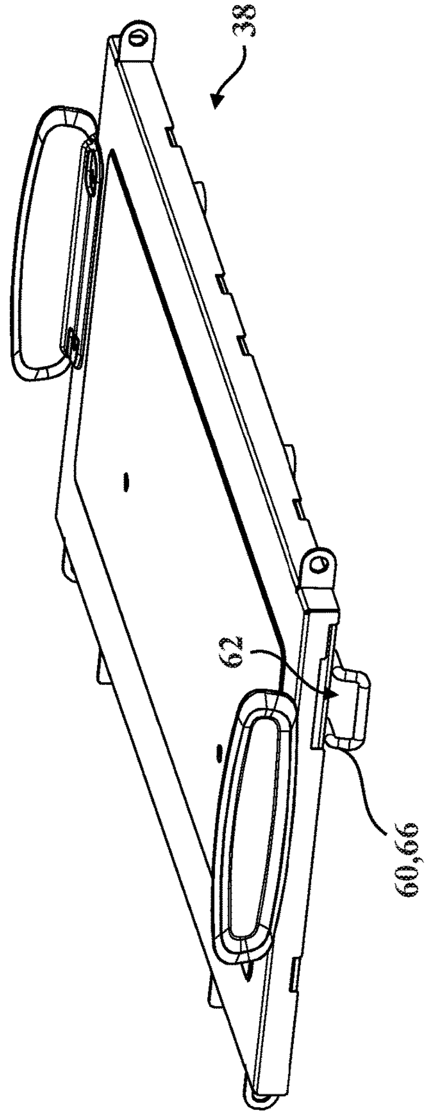
FIG. 4A is a perspective view of a portion of the patient support deck of the patient support apparatus of FIG. 1, the portion of the patient support deck including a restraint mount including a bent rod structure.

The restraint mounts 60 and/or apertures 62 may be of various types and/or configurations. For example, as shown in FIG. 2, the restraint mounts 60 may include a "straight rod" structure or a "bent rod" structure. One version of a straight rod restraint mount 64 is shown in greater detail in FIG. 3A, and one version of a bent rod restraint mount 66 is shown in greater detail in FIG. 4A. Other forms of the restraint mount 60 and/or apertures 62 are contemplated by the present disclosure. For example, while the restraint mounts 60 in FIG. 2 include a rounded structure, in other instances, the restraint mounts 60 may include a cuboidal and/or prismatic structure. Other configurations are contemplated.

Figure 5A:
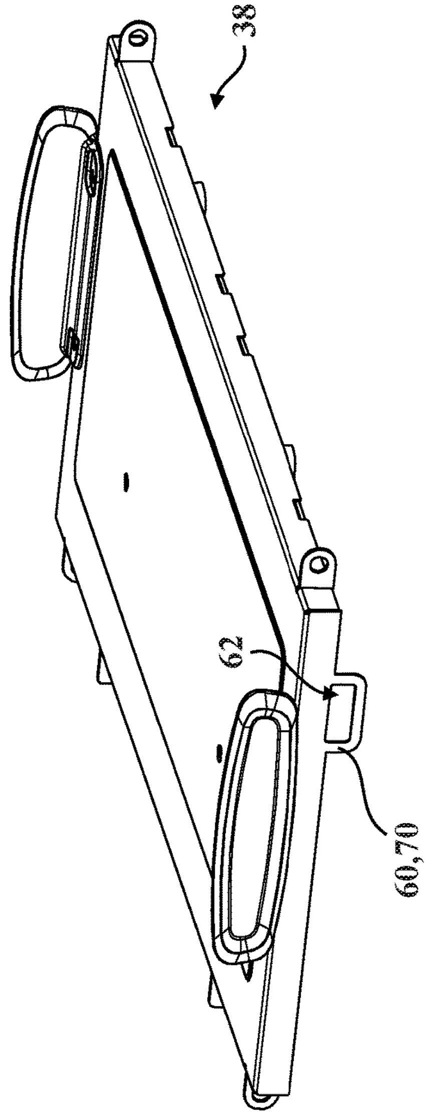
FIG. 5A is a perspective view of a portion of the patient support deck of the patient support apparatus of FIG. 1, the portion of the patient support deck including a restraint mount integrally formed with the patient support deck.

It will be appreciated that the restraint mounts 60 and/or apertures 62 may be configured to extend from, or otherwise be attached to, the patient support deck 38 in various ways. For example, in the instance of FIG. 2, the restraint mounts 60 may be realized as bent rods that are welded to the patient support deck 38 such that the restraint mounts 60 and apertures 62 extend from the patient support deck 38. As another example, in FIG. 5A, the restraint mount 60 is an integrated restraint mount 70 configured so as to be integrally formed with the patient support deck 38 such that the integrated restraint mount 70 and aperture 62 extend from the patient support deck 38 (e.g., formed in the "skin" covering of the patient support deck 38). As noted above, other configurations of the restraint mount 60 and/or apertures 62 are contemplated by the present disclosure. For example, while the integrated restraint mount 70 depicted in FIG. 5A is formed in a lateral surface of the "skin" covering of the patient support deck 38, one or more integrated restraint mounts 70 could also or alternatively be formed in other portions of the "skin" covering of the patient support deck 38 (e.g., a portion of the "skin" parallel to a corresponding portion of the patient support surface 40 or otherwise disposed adjacent to a mattress). Other configurations are contemplated.

Furthermore, it will be appreciated that the restraint mounts 60 and/or apertures 62 may extend from any suitable component of the patient support apparatus 30. For example, while the restraint mounts 60 and apertures 62 extend from sections of the patient support deck 38 in FIG. 2, in other instances, the restraint mounts 60 and/or apertures 62 may extend from other components of the patient support apparatus 30. For example, the restraint mounts 60 and/or apertures 62 may extend from the intermediate frame 36 and/or the base 34 of the patient support apparatus. As another example, the restraint mounts 60 and/or apertures 62 may extend from or be integrally formed with the side rails 42, 44, 46, 48, the headboard 50, and/or the footboard 52 of the patient support apparatus.

One or more types of covers 72 may be used with the patient support apparatus 30 to selectively block insertion of unauthorized objects through apertures 62 of restraint mounts 60. As previously stated, the restraint mounts 60 and apertures 62 are configured to extend from the patient support deck 38 and are configured to allow a patient to be secured to the patient support deck 38 using a patient restraint PR (see, for example, FIGS. 2, 8G, and 11G; depicted schematically). However, in instances where one or more restraint mounts 60 and apertures 62 are not being used to secure a patient to the patient support deck 38, unauthorized objects could otherwise be inserted through an aperture 62 by the patient or others. The covers 72 described herein advantageously allow caregivers to selectively block insertion of unauthorized objects into the apertures 62, thereby promoting improved patient safety.

Figure 3B:
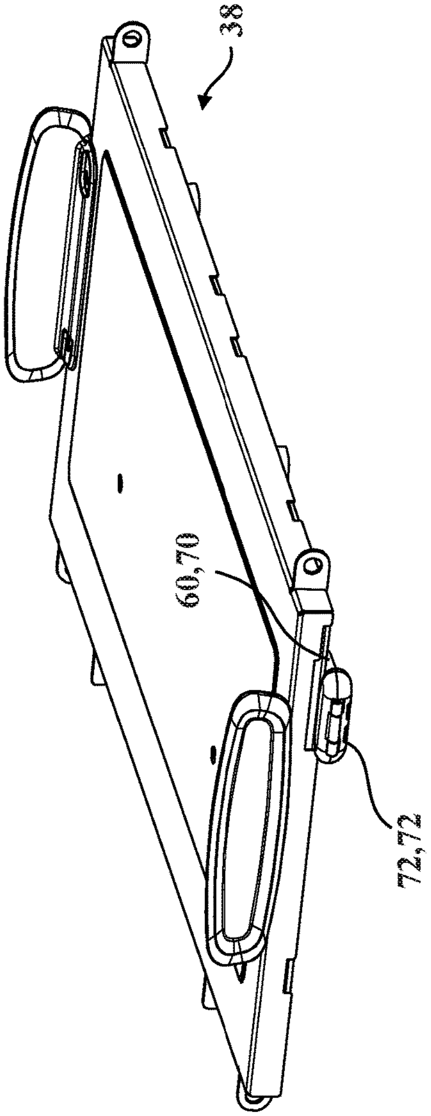
FIG. 3B is a perspective view of the portion of the patient support deck of FIG. 3A, wherein a cover is attached to the restraint mount.
Figure 4B:
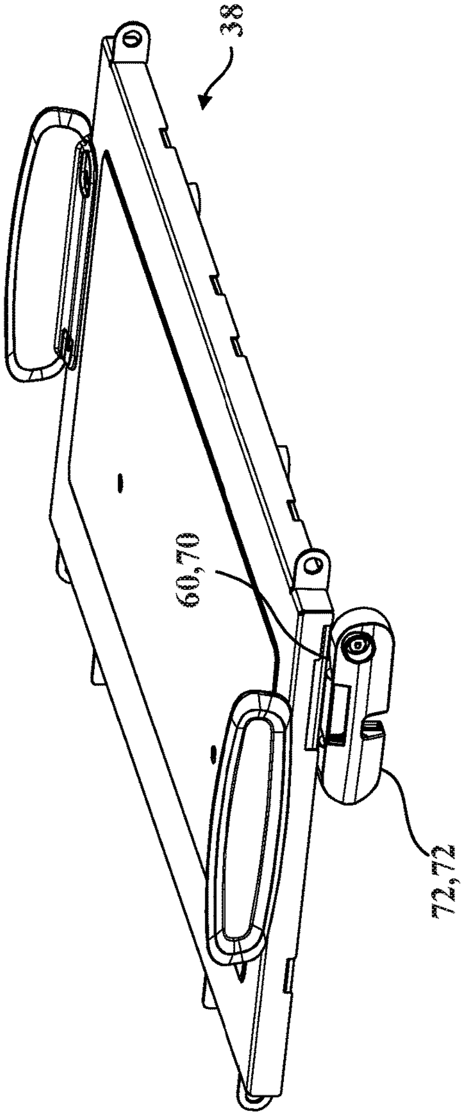
FIG. 4B is a perspective view of the portion of the patient support deck of FIG. 4A, wherein a cover is attached to the restraint mount of FIG. 4A.
Figure 5B:
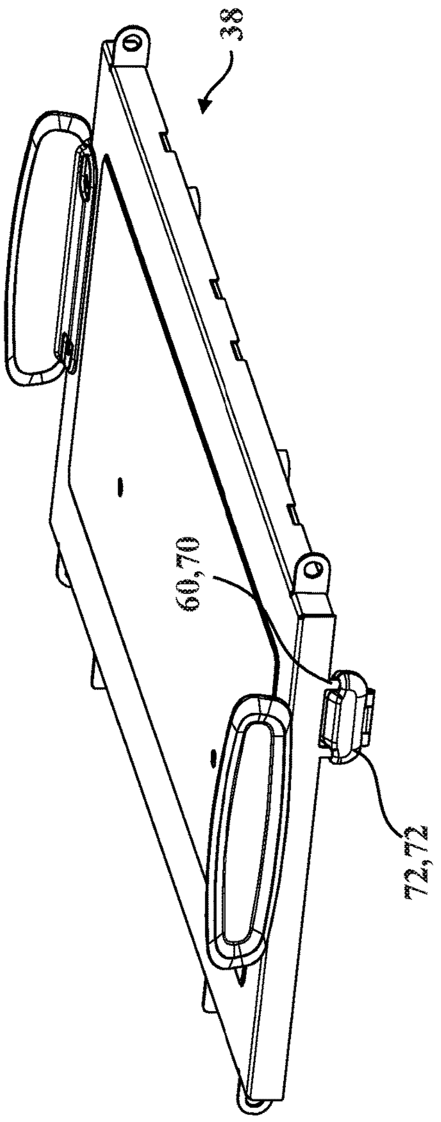
FIG. 5B is a perspective view of the portion of the patient support deck of FIG. 5A, wherein a cover is attached to the restraint mount of FIG. 5A.

Exemplary versions of covers 72 that are configured to selectively block insertion of unauthorized objects through an aperture 62 of a restraint mount 60 according to the present disclosure are shown in FIGS. 3B, 4B, and 5B, as well as in other drawings as noted above and as described in greater detail below. As shown, the covers 72 are each configured to attach to the patient support apparatus 30 adjacent to the aperture 62 to block access to the aperture 62 of the restraint mount 60. The cover 72 shown in FIGS. 3B and 5B is depicted as attaching to the aperture 62 of the straight rod restraint mount 64 and the integrated restraint mount 70 integrally formed with the patient support deck 38, respectively. The cover 72 shown in FIG. 4B is depicted as attaching to the aperture 62 of the bent rod restraint mount 66. In addition, other example covers 72 shown in FIGS. 17A-22B may be attached to bent rod restraint mounts 66 or other types of restraint mounts 60 as described in greater detail below.

Although some versions of the cover 72 are shown as being attached to the straight rod restraint mount 64 and the integrated restraint mount 70 integrally formed with the patient support deck 38, versions of the covers 72 may be attached to any suitable restraint mount 60. For instance, some versions of the cover 72 may be attached to the bent rod restraint mount 66 of FIG. 4A. Similarly, some versions of the cover 72 may be attached to any suitable restraint mount 60. Here too, some versions of the cover 72 may be attached to the straight rod restraint mount 64 of FIG. 3A, as well as to the integrated restraint mount 70 integrally formed with the patient support deck 38 of FIG. 5A. Other configurations are contemplated, and the forgoing represent illustrative, exemplary versions of how covers 72 according to the present disclosure may be utilized.

As noted above, one version of the cover 72 is shown in FIGS. 6A-9F. Referring specifically to FIGS. 8A-8C, the cover 72 may be attached to the patient support apparatus 30 to block access to the aperture 62 of the restraint mount 60. Referring to FIGS. 8D-8G, and as is described in greater detail below, various types and/or configurations of instruments 74 (e.g., a caregiver instrument 74) may be used to selectively detach the cover 72 from the patient support apparatus 30. As shown in FIG. 8D, in this version the instrument 74 includes an interface 76 with a first tab 78' and a second tab 78". However, as will be appreciated from the subsequent description below, the instrument 74 and/or interface 76 could be of various styles, types, and/or arrangements.

Figure 6A:
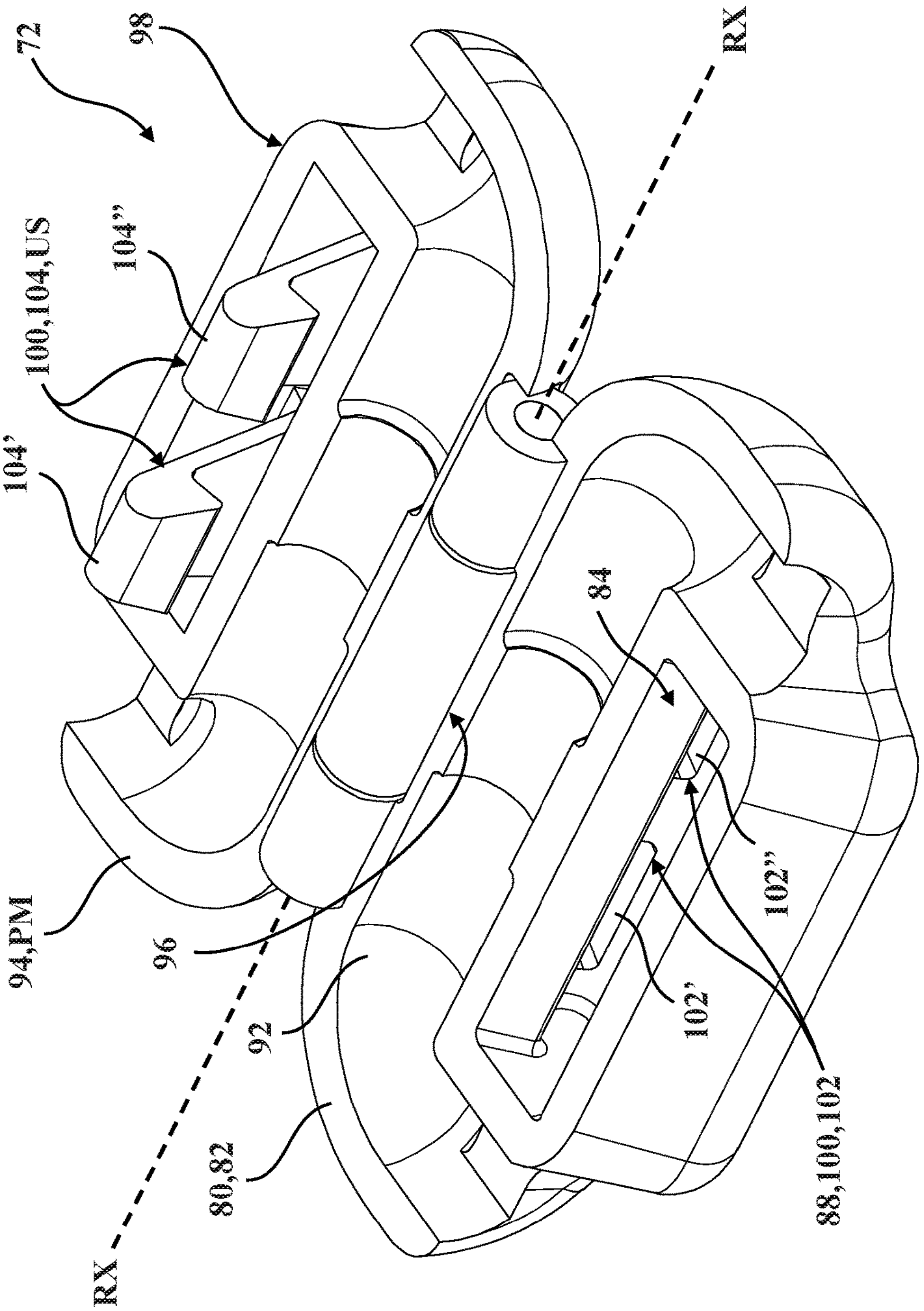
FIG. 6A is a perspective view of the cover of FIGS. 3B and 5B, the cover having a brace, a restrictor shown in a permit mode, and a lock mechanism with a keeper shown in an unlocked state.
Figure 6B:
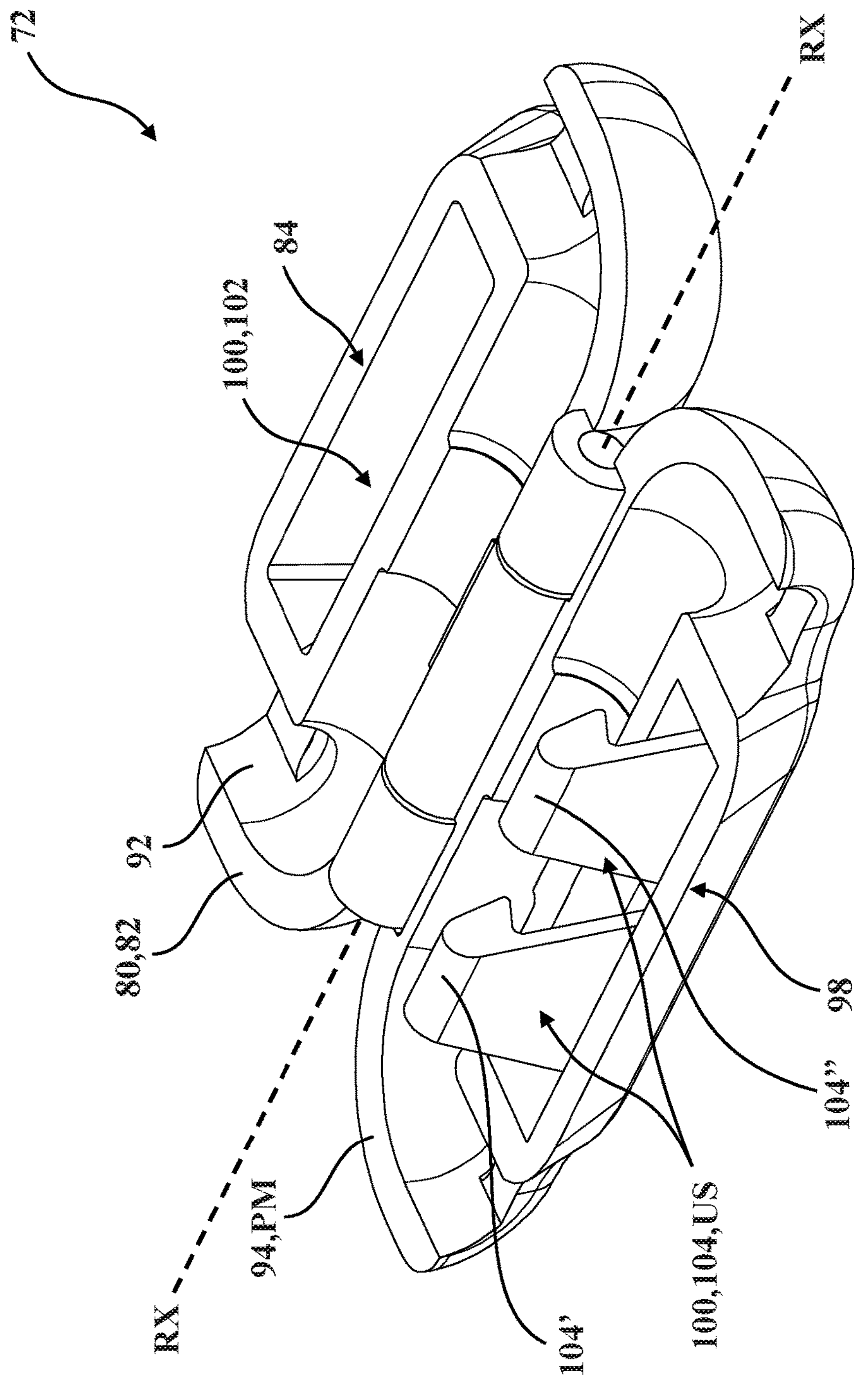
FIG. 6B is another perspective view of the cover of FIG. 6A.
Figure 7:
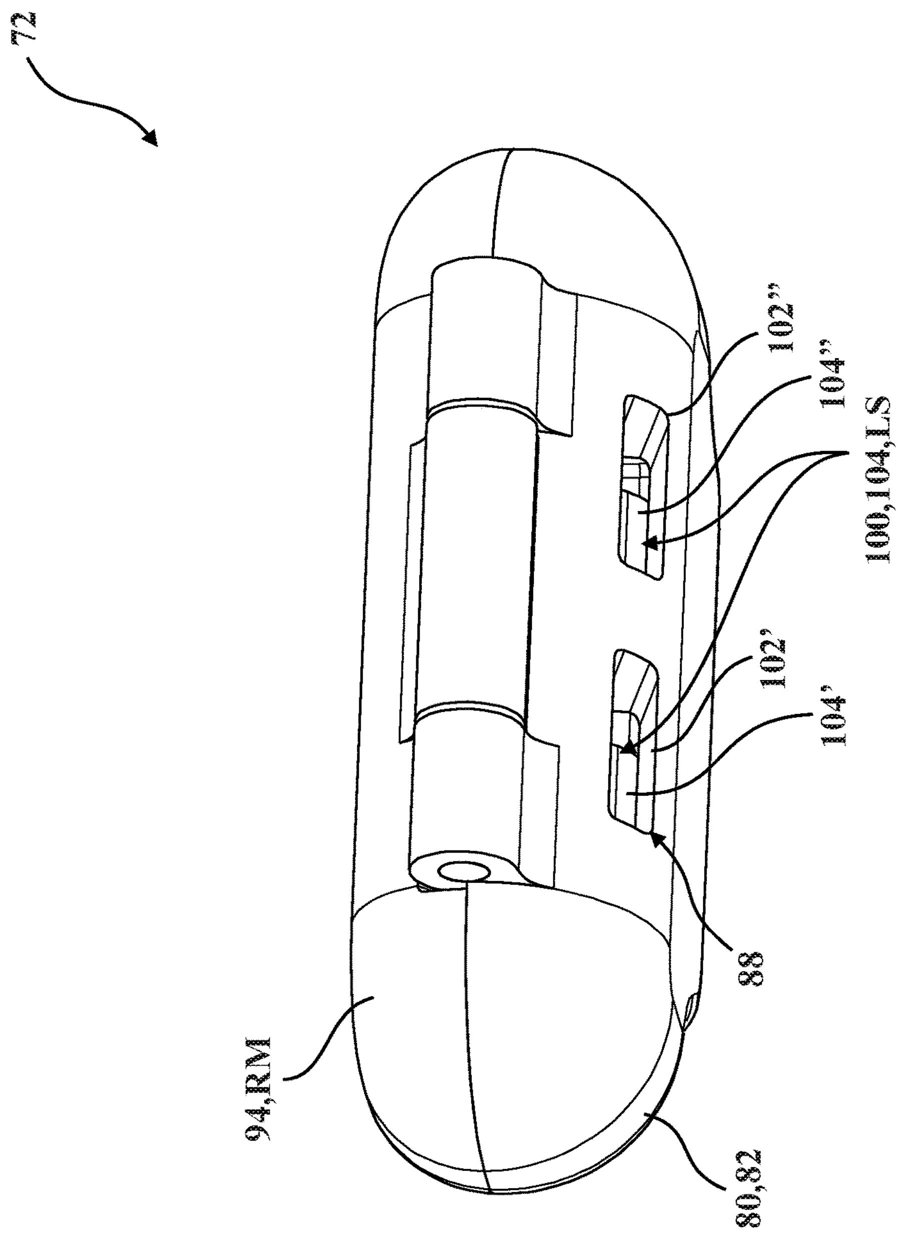
FIG. 7 is another perspective view of the cover of FIGS. 6A-6B, shown with the restrictor in a restrict mode maintained in a locked state by the keeper of the lock mechanism.

The illustrated cover 72 includes a brace 80, which is shown in FIGS. 6A-7. The brace 80 is configured for attaching to the patient support apparatus 30 adjacent to the aperture 62. For example, the brace 80 may be configured for attaching to a restraint mount 60, such as the straight rod restraint mount 64 shown in FIG. 3A, the bent rod restraint mount 66 shown in FIG. 4A, and/or the integrated restraint mount 70 integrally formed with the patient support deck 38 shown in FIG. 5A. Other configurations are contemplated.

Figure 9A:
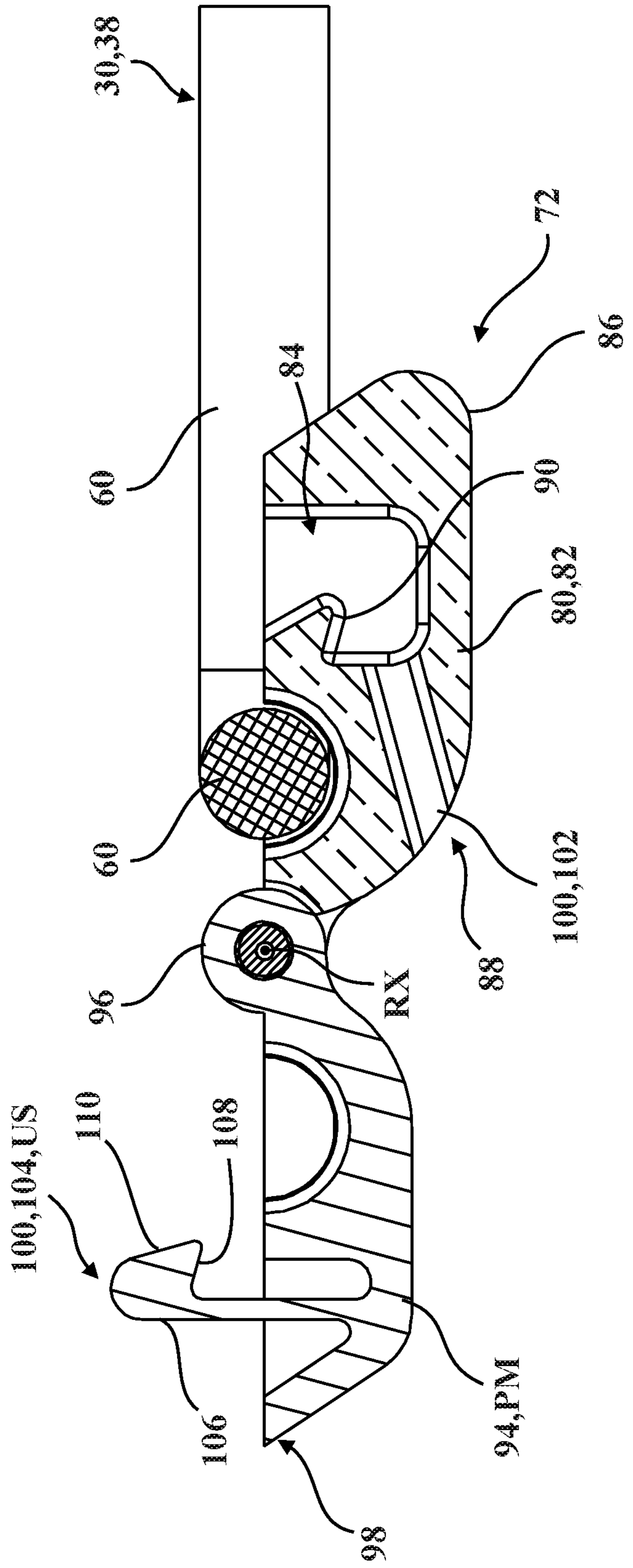
FIG. 9A is a partial sectional view of the cover and the restraint mount taken laterally through a portion of the keeper, with the cover arranged as depicted in FIG. 8B to illustrate attachment of the cover to the restraint mount with the restrictor in the permit mode.

Referring to FIG. 6A, the brace 80 includes a brace body 82 and the brace body 82 defines an interior 84. The brace body 82 and the interior 84 are also identified in FIG. 9A. As shown in FIG. 9A, the brace body 82 defines an outer brace surface 86 and a brace aperture 88, with the brace aperture 88 extending into communication with the interior 84. The brace 80 also includes an abutment surface 90, which is located within the interior 84. It will be appreciated that, depending on the specific configuration of the brace body 82, the location of the abutment surface 90 may vary. For example, in some instances, the abutment surface 90 may be located at least partially outside the interior 84.

The brace 80 may be configured to engage at least a portion of the restraint mount 60. For instance, the brace 80 may be shaped to receive at least a portion of the restraint mount 60, which allows the brace 80 to attach to the patient support apparatus 30. As shown in FIG. 6A, the brace 80 may include a restraint mount receptacle 92, which is shaped to receive a restraint mount 60 including a rounded structure, such as the straight rod restraint mount 64 of FIG. 3A or the bent rod restraint mount 66 of FIG. 4A. It should be noted that a shape of the restraint mount receptacle 92 need not correspond to a shape of the restraint mount 60 to which the brace 80 attaches to. For example, although the restraint mount receptacle 92 of FIG. 6A includes a rounded structure, the restraint mount receptacle 92 may receive a restraint mount 60 including a cuboidal structure, such as the integrated restraint mount 70 integrally formed with the patient support deck 38 of FIG. 5A. Furthermore, it should be noted that the restraint mount receptacle 92 may be include any suitable shape or size for receiving a restraint mount 60. The cover 72 also includes a restrictor 94, which is shown in FIGS. 6A-7. The restrictor 94 may be movably coupled to the brace 80 and arranged for operation between a permit mode PM (see FIG. 8B) where access to the aperture 62 of the restraint mount 60 is at least partially permitted, and a restrict mode RM (see FIG. 8C) where the access to the aperture 62 is blocked.

Figure 8A:
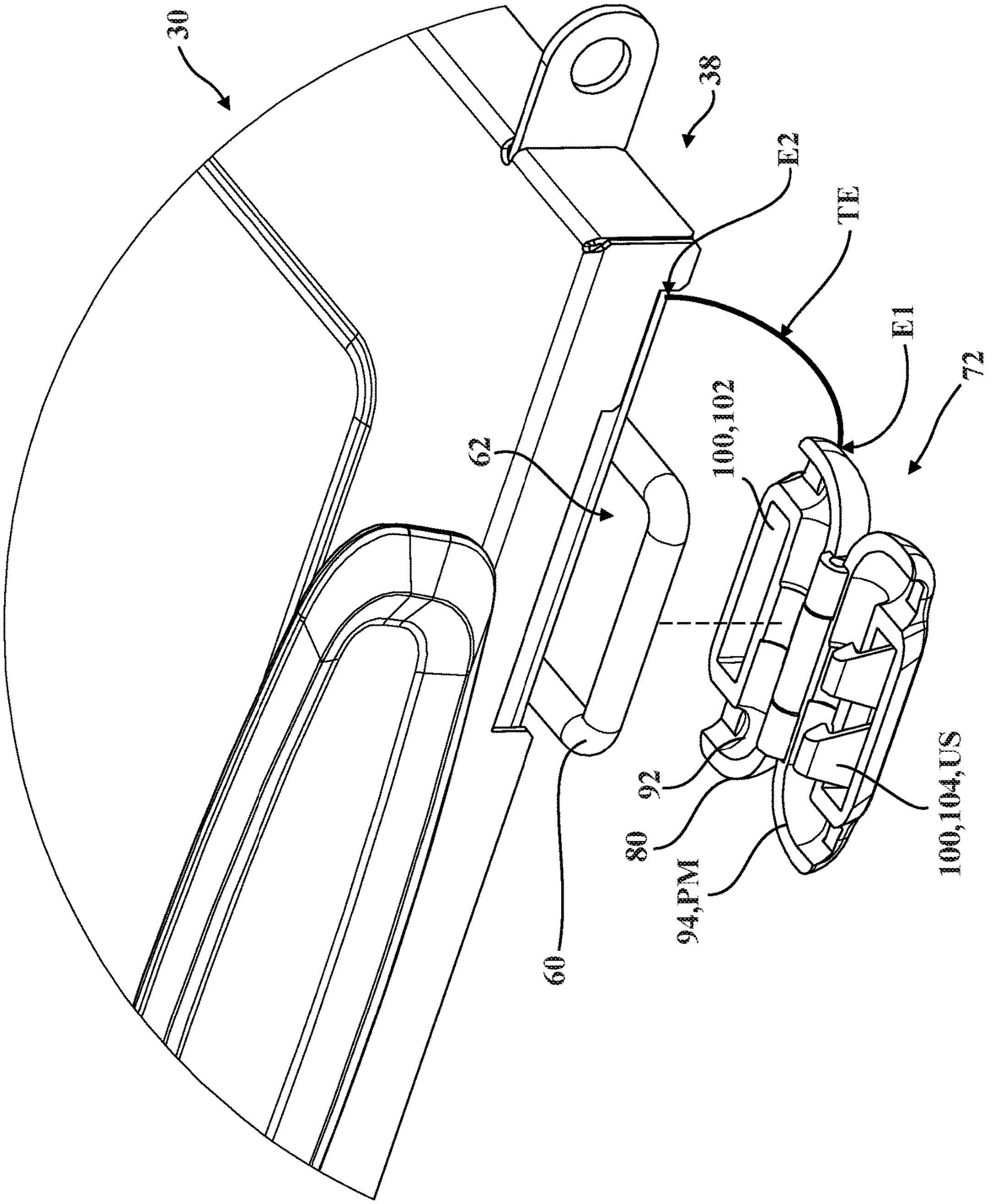
FIG. 8A is a partial perspective view of the patient support apparatus and cover of FIG. 3B, shown with the cover disposed adjacent to the restraint mount and arranged with the restrictor in the permit mode.
Figure 8B:
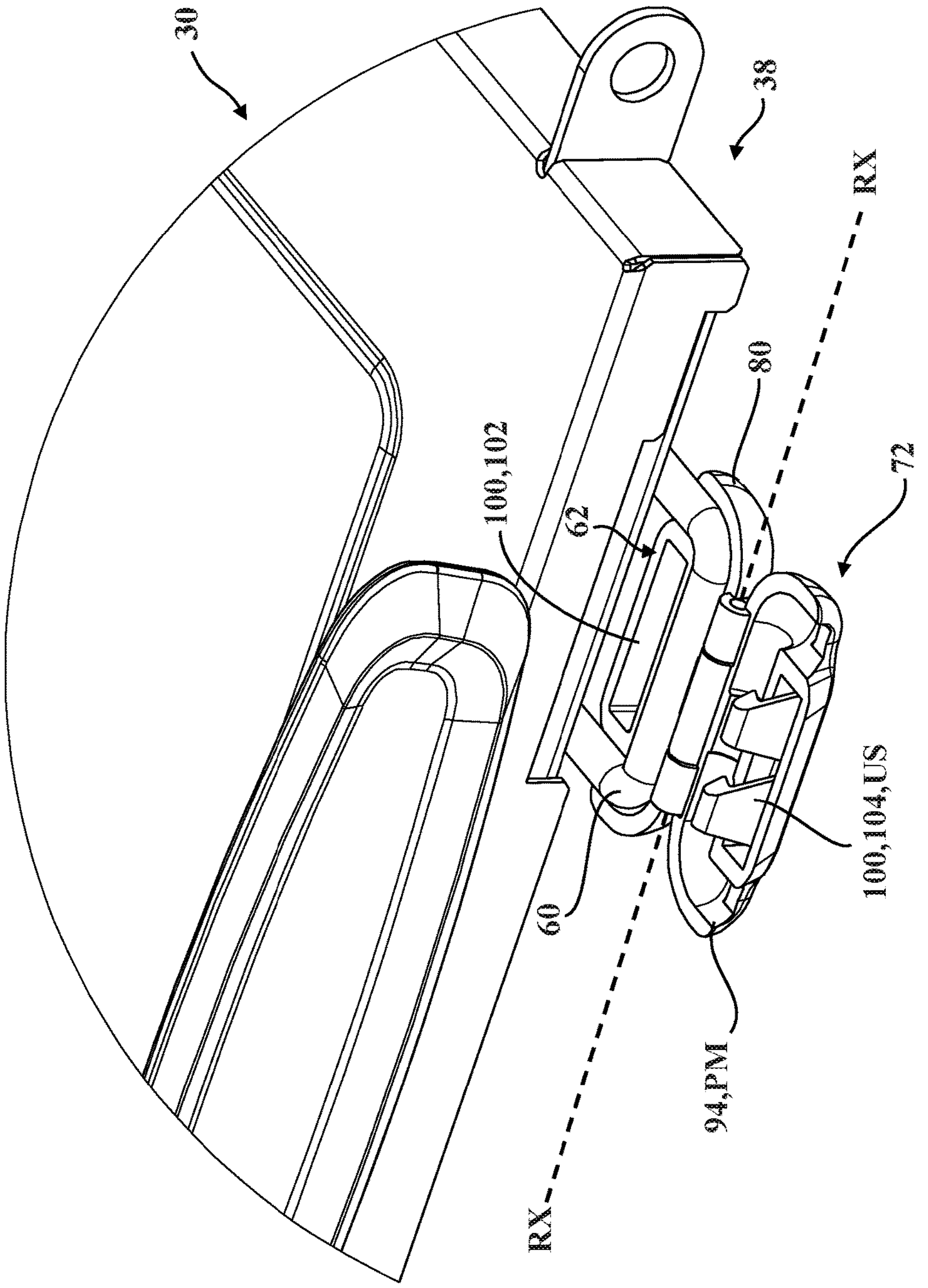
FIG. 8B is another partial perspective view of the patient support apparatus and cover of FIG. 8A, shown with the cover seated on the restraint mount and arranged with the restrictor in the permit mode.
Figure 8C:
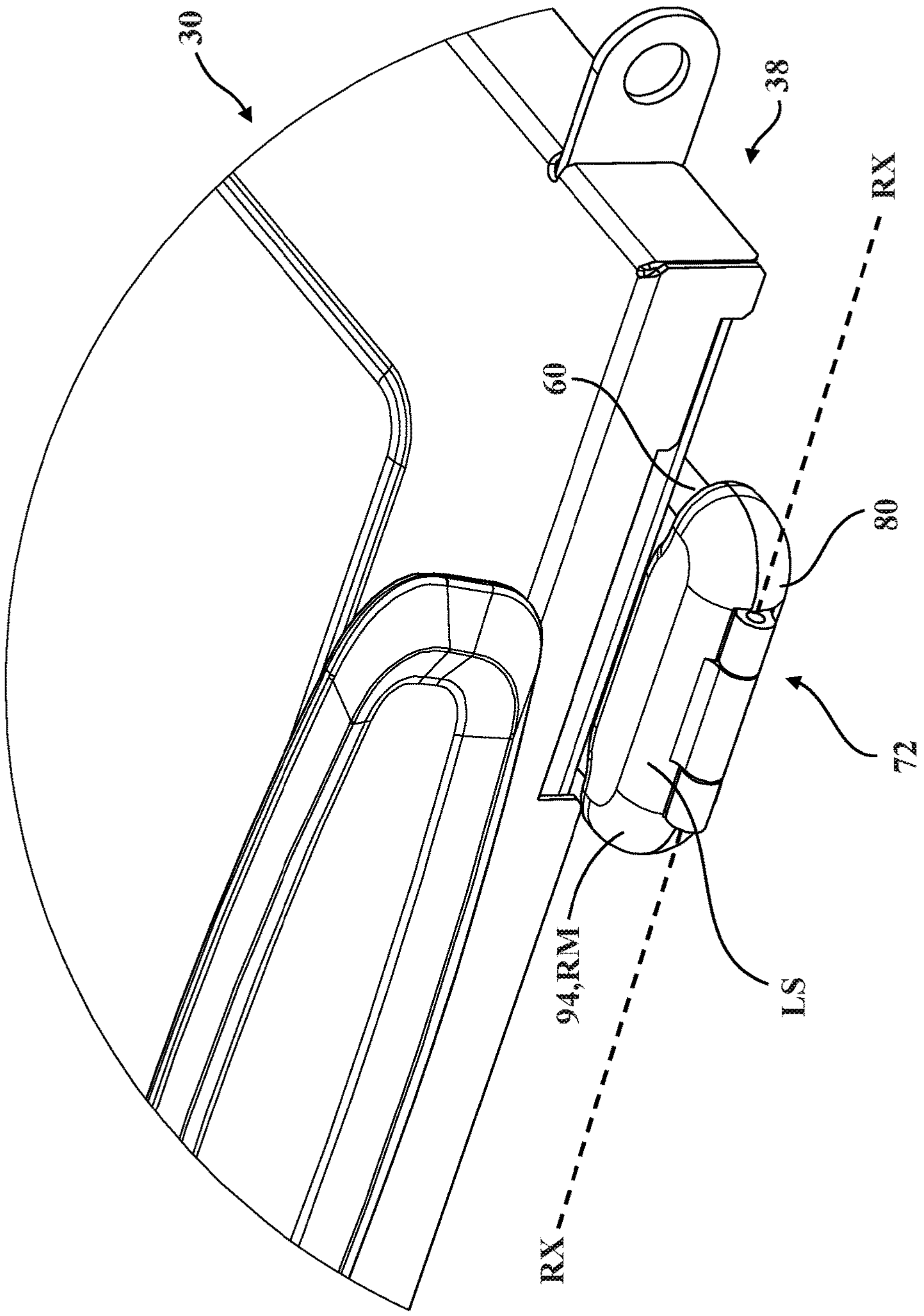
FIG. 8C is another partial perspective view of the patient support apparatus and cover of FIGS. 8A-8B, shown with the cover seated on the restraint mount and arranged with the restrictor in the restrict mode that is maintained in the locked state by the keeper of the lock mechanism.

The process of initially seating this version of the brace 80 to the restraint mount 60 is illustrated by FIGS. 8A and 8B. In FIG. 8A, the brace 80 is not attached to the patient support apparatus 30. In FIG. 8B, the brace 80 is moved adjacent to the aperture 62 and attached to the patient support deck 38 of the patient support apparatus 30 via the restraint mount 60 by placing the straight rod 64 into the restraint mount receptacle 92. The process of moving the restrictor 94 between the permit mode PM and the restrict mode RM for this version of the cover 72 is illustrated by FIGS. 8B-8C. In FIG. 8B, the restrictor 94 is disposed in the permit mode PM and is arranged relative to the brace 80 to at least partially permit access to the aperture 62 of the restraint mount 60 (e.g., by removing the brace 80 from the aperture 62). Put differently, in the permit mode PM, the aperture 62 is at least partially accessible to a caregiver or patient, whether or not the brace 80 is disposed in the aperture 62, because the brace 80 can be readily removed from the aperture 62 (e.g., without requiring use of the instrument 74 as described in greater detail below). When operating in the permit mode PM, the restraint end RE of the patient restraint PR may be inserted through the aperture 62 (see, for example, FIGS. 2, 8G, and 11D; depicted schematically). In FIG. 8C, the restrictor 94 is disposed in the restrict mode RM and is arranged relative to the brace 80 to block access to the aperture 62 of the restraint mount 60. In the restrict mode RM, the brace 80 and at least a portion of the restrictor 94 may cooperate to block access to the restraint mount 60. As such, the patient restraint PR (or other objects) may not be inserted through the aperture 62 during operation in the restrict mode RM with the cover 72 disposed in engagement with the restraint mount 60.

In some versions, the restrictor 94 may be pivotably coupled to the brace 80 to allow for movement between the permit mode PM and the restrict mode RM. As shown in FIG. 6A, the restrictor 94 may be pivotably coupled to the brace 80 for movement relative to the brace 80 at a first end 96 of the restrictor 94 about a restrictor axis RX. As such, the restrictor 94 may move about the restrictor axis RX between the permit mode PM and the restrict mode RM. In some versions, pivoting about the restrictor axis RX may be achieved via a pin connection (not shown in detail) between the restrictor 94 and the brace 80. However, it will be appreciated that pivoting, or other types of relative movement, between the restrictor 94 and the brace 80 may be achieved in other ways. By way of non-limiting example, the restrictor 94 and the brace 80 may be operatively attached together using a living hinge (not shown). Other configurations are contemplated.

The cover 72 also includes a lock mechanism 100 which is best depicted in FIGS. 6A-6B. The lock mechanism 100 may be interposed between the brace 80 and the restrictor 94. The lock mechanism 100 includes a receiver 102, which is defined by the brace aperture 88 of the brace 80 in this version (see FIG. 6A). The lock mechanism 100 also includes a keeper 104 arranged at or otherwise adjacent to a second end 98 of the restrictor 94. Referring to FIG. 9A, in this version, the keeper 104 is operatively attached to the restrictor 94 and includes a resilient finger 106 defining a retention face 108 and a release face 110. In this version, the keeper 104 is defined by or otherwise includes a first keeper 104' and a second keeper 104" (see FIGS. 6A-6B) which are independently movable.

The receiver 102 is configured to receive the interface 76 of the instrument 74. For example, the receiver 102 is shown receiving the interface 76 in FIG. 9D by receiving a tab 78 of the interface 76. As such, the receiver 102 may be shaped to receive a tab 78 of the interface 76. In instances where the receiver 102 includes a first receiver 102' and a second receiver 102", and the interface 76 includes a first tab 78' and a second tab 78", the first receiver 102' may be shaped to receive the first tab 78' and the second receiver 102" may be shaped to receive the second tab 78".

Figure 9B:
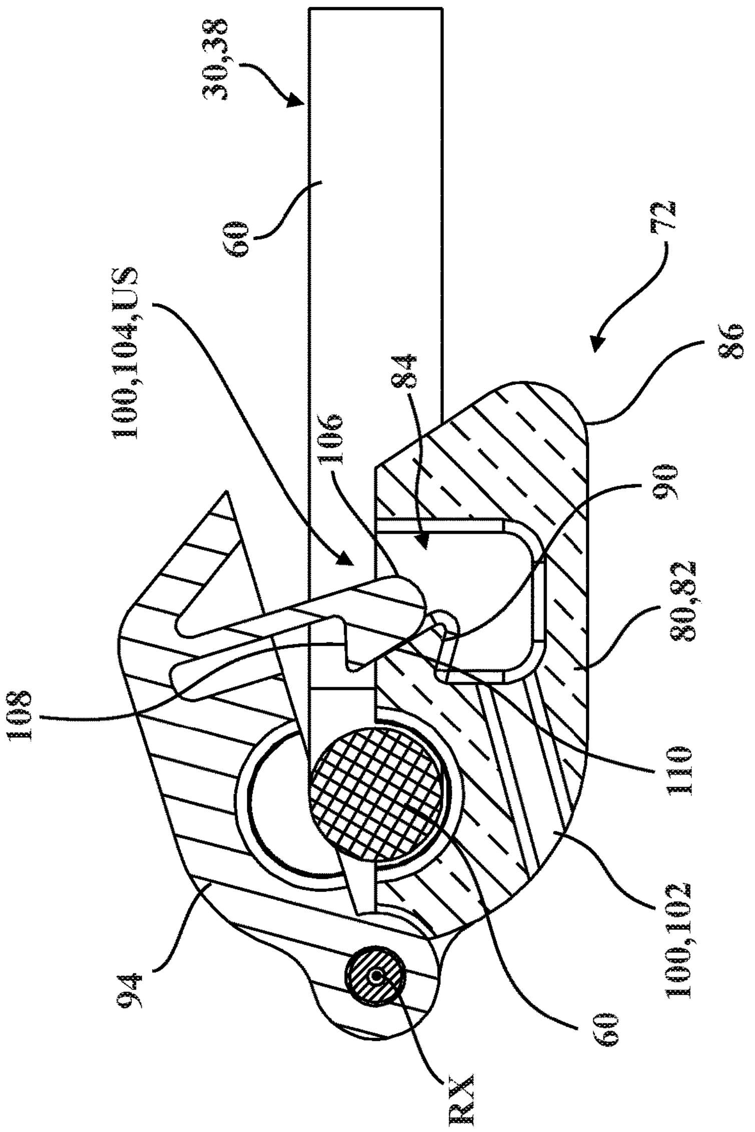
FIG. 9B is another partial sectional view of the cover and the restraint mount of FIG. 9A, with the cover arranged to illustrate the process of moving the restrictor from the permit mode toward the restrict mode and to illustrate the process of moving the keeper from the unlocked state towards the locked state.
Figure 9C:
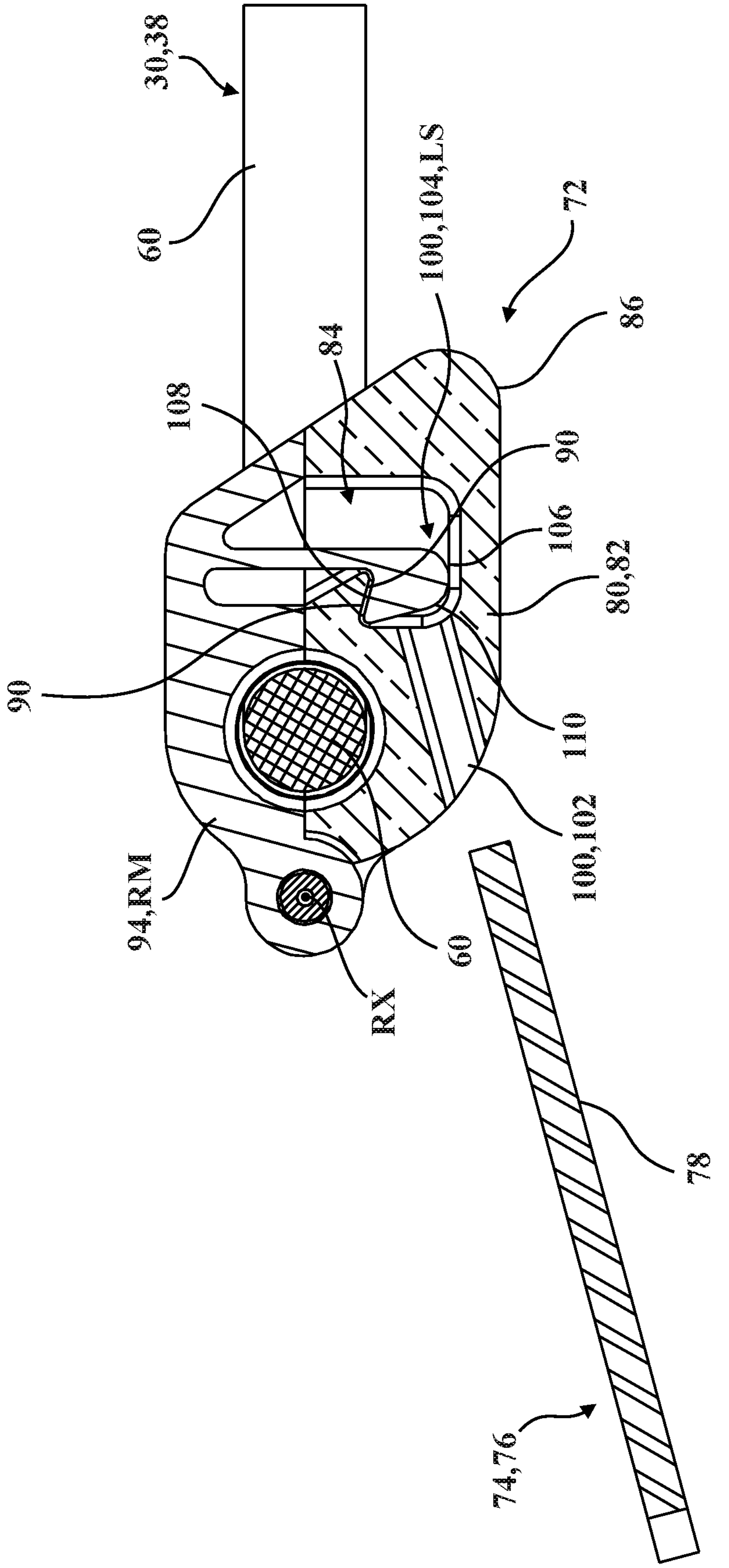
FIG. 9C is another partial sectional view of the cover and the restraint mount of FIGS. 9A-9B, shown with the cover arranged as depicted in FIG. 8D to illustrate operation of the restrictor in the restrict mode and operation of the keeper in the locked state prior to engagement of the instrument with the receiver.

The keeper 104 is configured to move between an unlocked state US and a locked state LS. The process of moving the keeper 104 from the unlocked state US to the locked state LS is illustrated by FIGS. 8B and 8C. The process of moving the keeper 104 from the unlocked state US to the locked state LS is also illustrated by FIGS. 9A-9C. While the keeper 104 is in the unlocked state US, movement of the restrictor 94 is permitted to change an operation of the restrictor 94 between the permit mode PM and the restrict mode RM. With reference to FIGS. 9A-9B, the restrictor 94 may move about the restrictor axis RX relative to the brace 80 while in the unlocked state US, with further movement of the restrictor 94 towards the brace 80 resulting in movement of the keeper 104 as described in greater detail below. With reference to FIGS. 9A and 9B, in this version, movement of the restrictor 94 also moves the keeper 104 relative to the receiver 102. As such, movement of the restrictor 94 from the permit mode PM toward the restrict mode RM also moves the keeper 104 toward the locked state LS.

While the keeper 104 is in the locked state LS, the keeper 104 inhibits movement of the restrictor 94 in order to maintain the restrictor 94 in the restrict mode RM. As shown in FIG. 9C, engagement between the keeper 104 and the receiver 102 in the locked state LS inhibits pivoting movement of the restrictor 94 about the restrictor axis RX. Specifically, during operation in the locked state LS, the resilient finger 106 is disposed at least partially within the interior 84 and the engagement is defined by contact of the retention face 108 of the resilient finger 106 with the abutment surface 90 of the brace body 82. In instances where the keeper 104 includes a first keeper 104' and a second keeper 104", the first and second keepers 104', 104" cooperate to inhibit movement of the restrictor 94 relative to the brace 80 in the restrict mode RM.

Figure 8D:
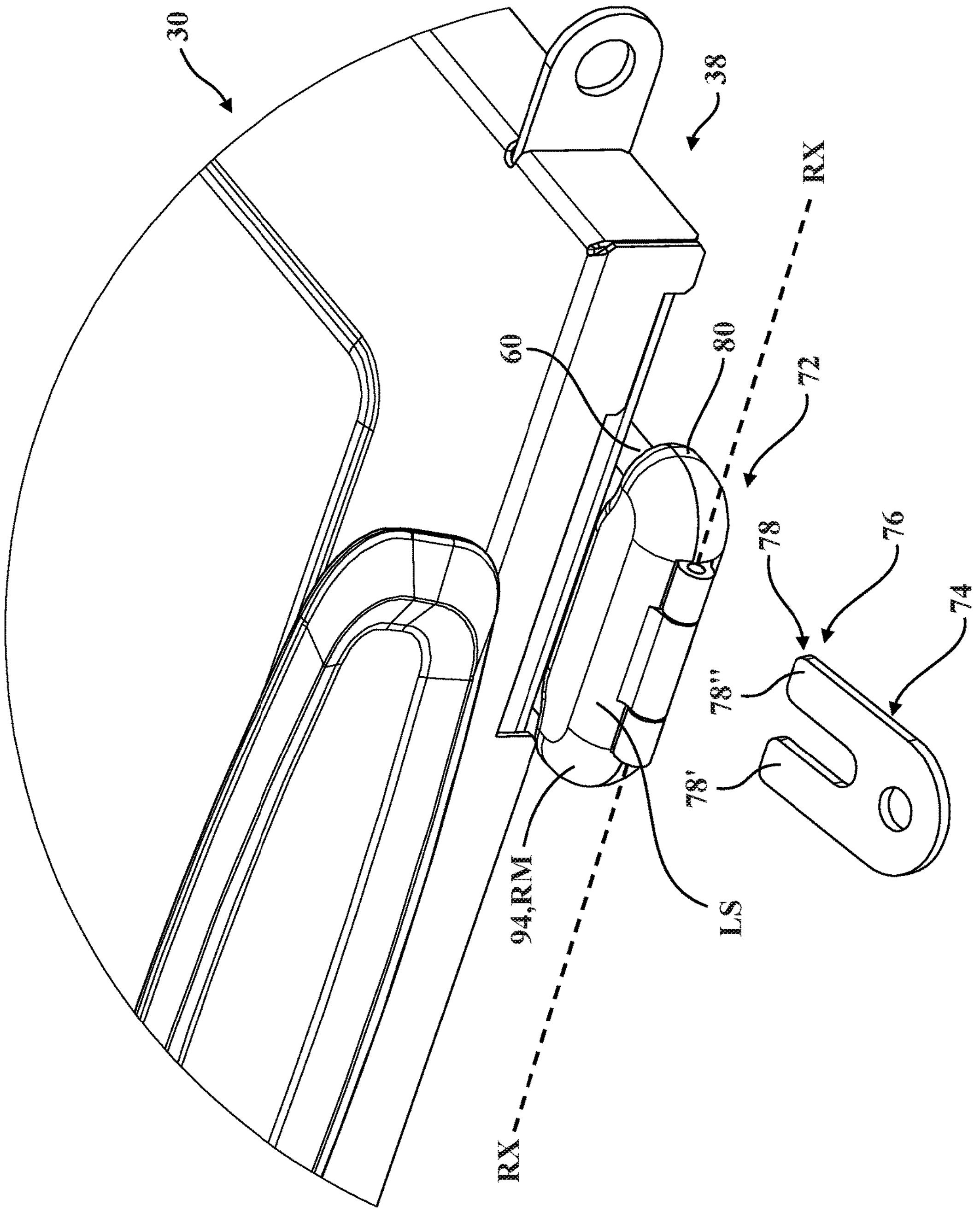
FIG. 8D is another partial perspective view of the patient support apparatus and cover of FIGS. 8A-8C, shown with the cover seated on the restraint mount and arranged with the restrictor in the restrict mode that is maintained in the locked state by the keeper of the lock mechanism, and shown with an instrument positioned adjacent to a receiver of the lock mechanism.
Figure 8E:
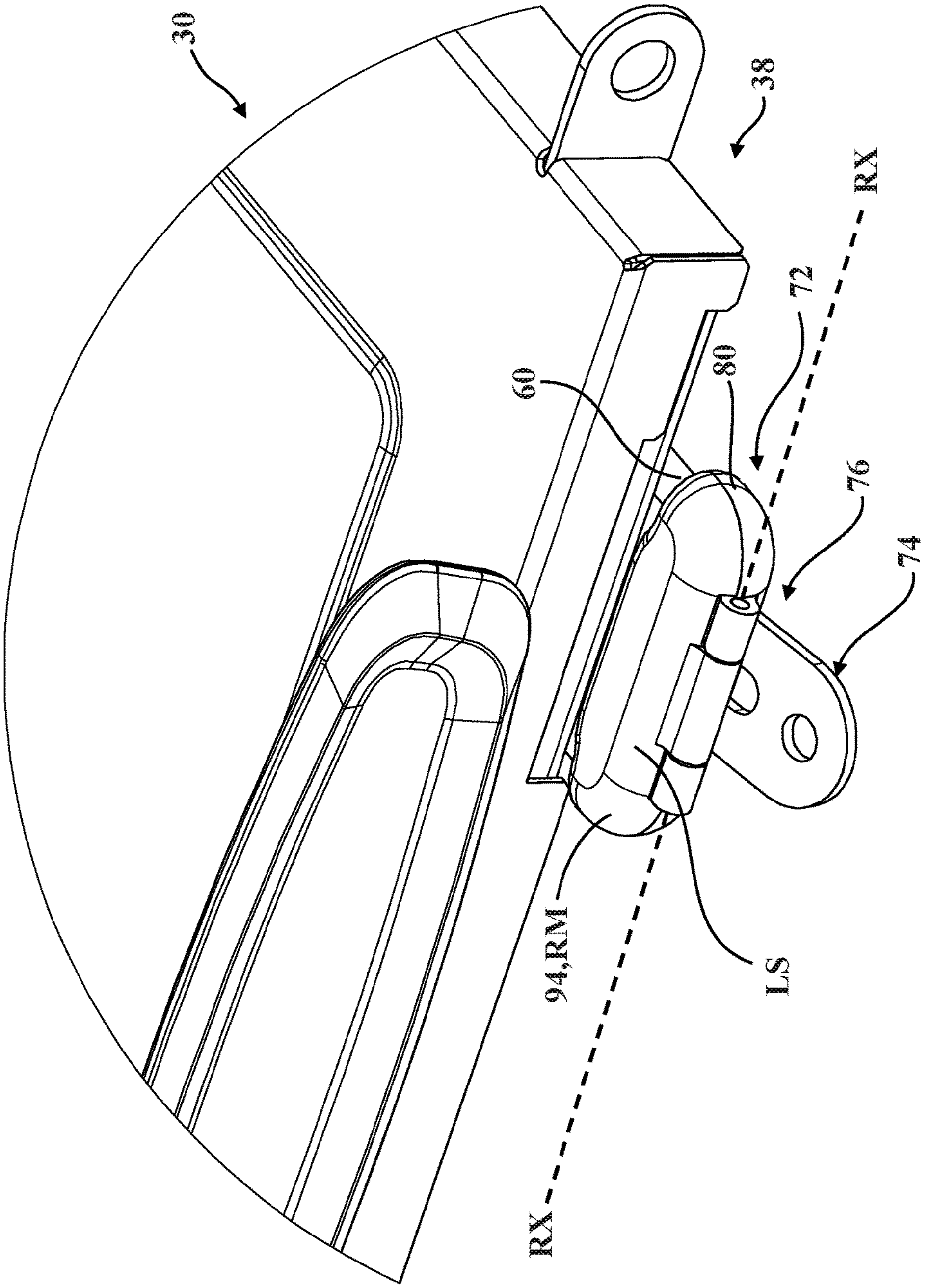
FIG. 8E is another partial perspective view of the patient support apparatus and cover of FIGS. 8A-8D, shown with the cover seated on the restraint mount and with the instrument positioned in the receiver of the lock mechanism to move the keeper to an unlocked state.
Figure 8F:
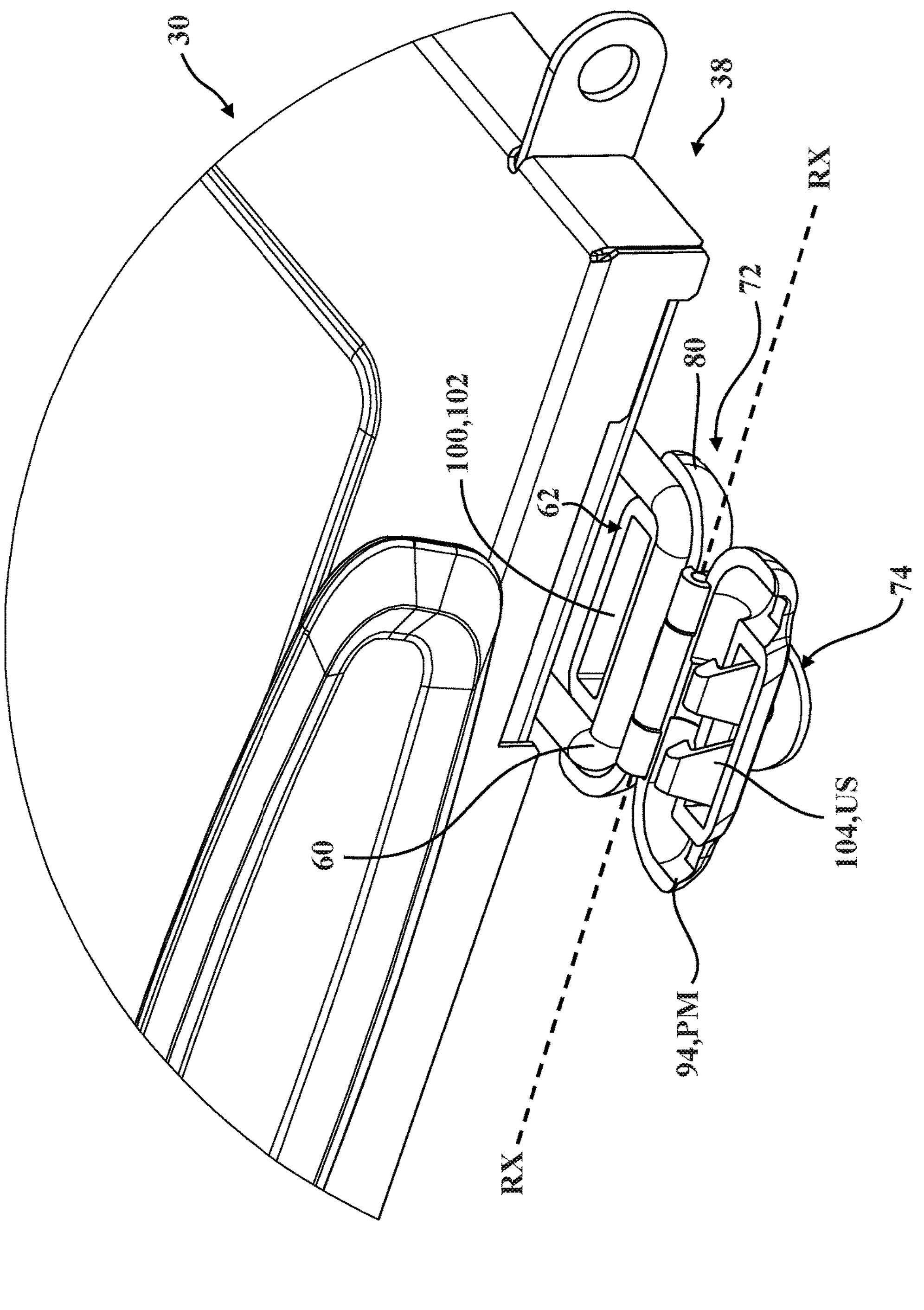
FIG. 8F is another partial perspective view of the patient support apparatus and cover of FIGS. 8A-8E, shown with the cover seated on the restraint mount and with the restrictor having moved to the permit mode in response to engagement of the instrument with the lock mechanism to facilitate removal of the cover from the restraint mount.
Figure 8G:
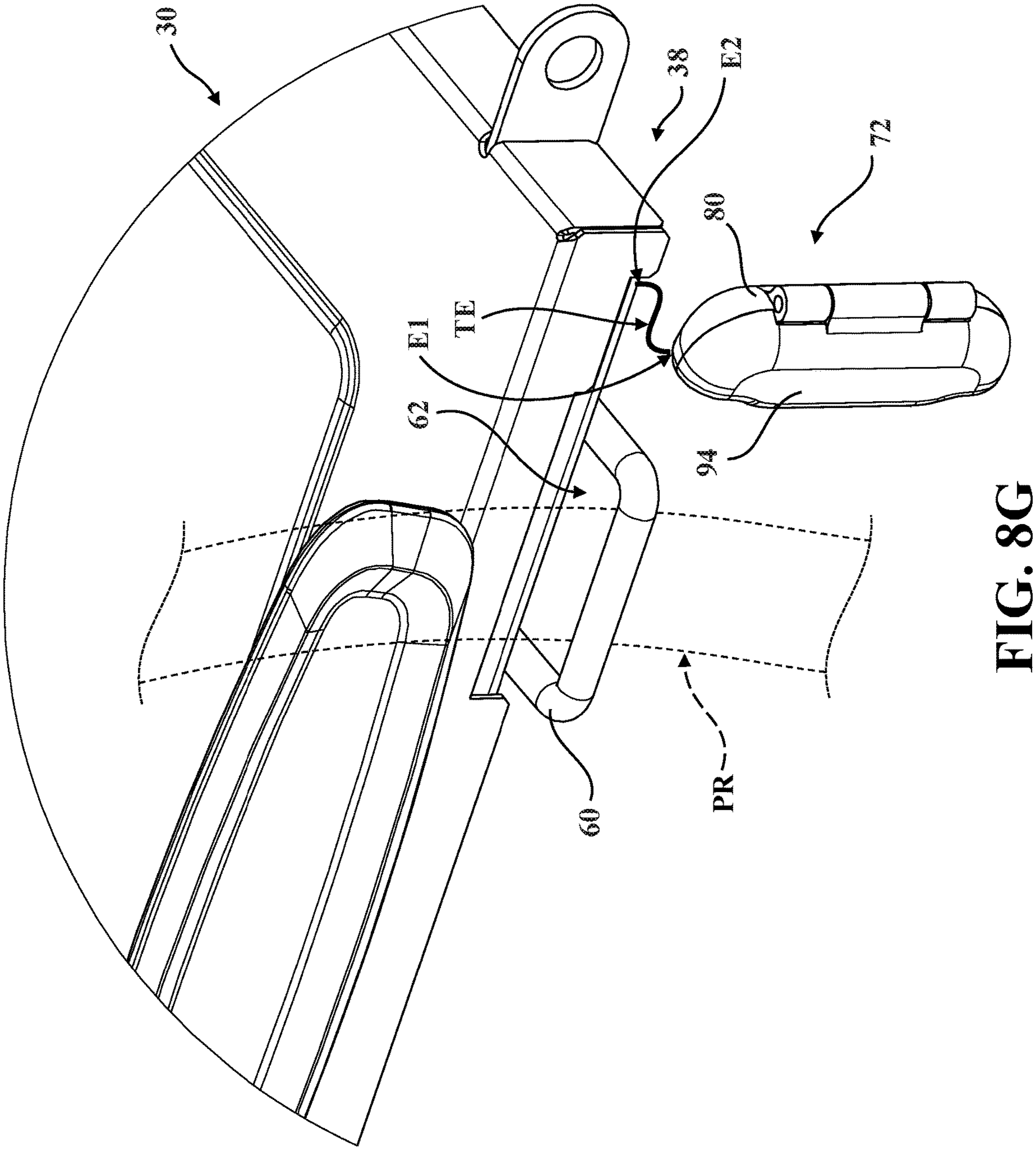
FIG. 8G is another partial perspective view of the patient support apparatus and cover of FIGS. 8A-8F, shown with the cover removed from the restraint mount and with a patient restraint passing through the restraint mount.
Figure 9D:
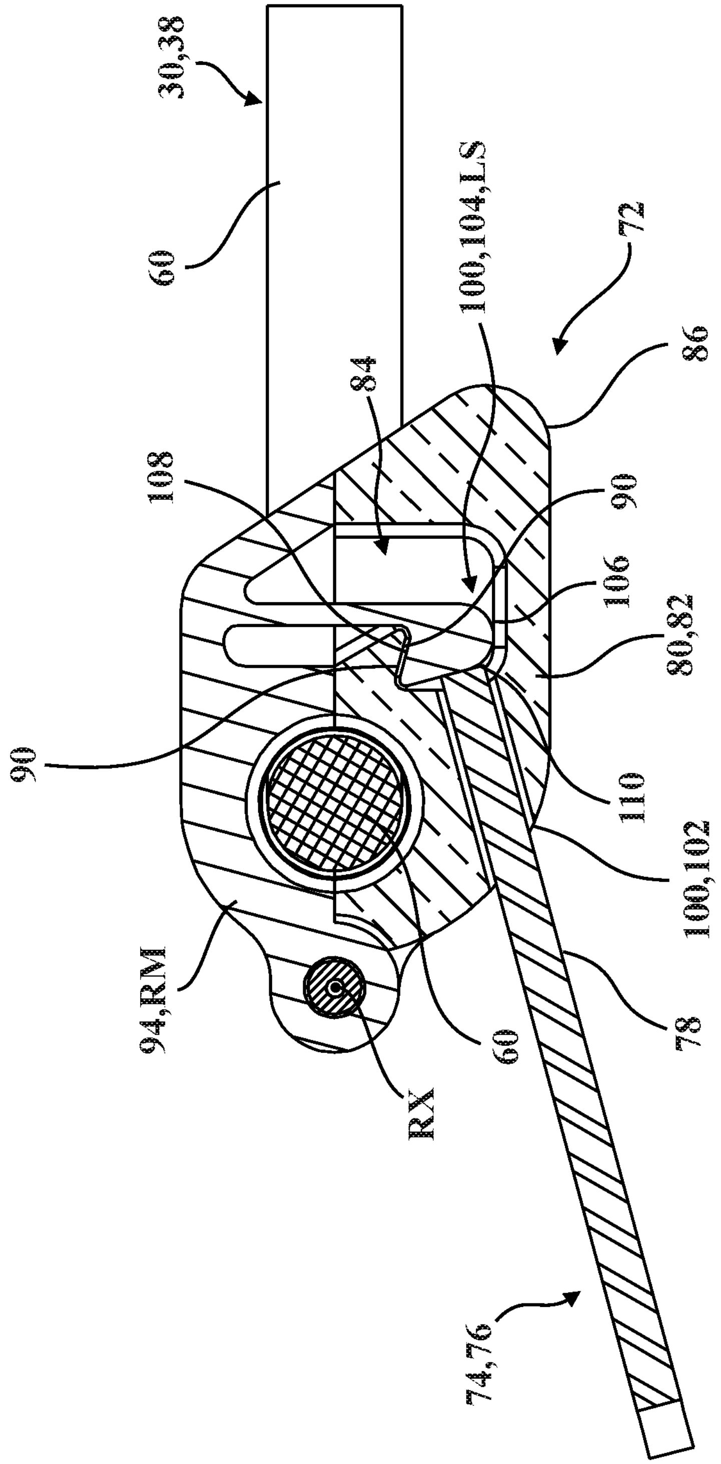
FIG. 9D is another partial sectional view of the cover, the restraint mount, and the instrument of FIG. 9C, shown with the instrument inserted into the receiver and abutting the keeper to illustrate the process of moving the keeper from the locked state towards the unlocked state.

The instrument 74 shown in FIG. 8D may be used to move the keeper 104 from the locked state LS to the unlocked state US. To this end, a caregiver may use the instrument 74 to move the keeper 104 from the locked state LS to the unlocked state US in order to detach the cover 72 from the patient support apparatus 30. As shown in FIGS. 8E and 8F, selective engagement between the interface 76 of the instrument 74 and the cover 72 moves the keeper 104 from the locked state LS to the unlocked state US. The cover 72 may then be detached from the patient support apparatus 30, as shown in FIG. 8G. Prior to this selective engagement occurring, the keeper 104 is in communication with the receiver 102. Here, as shown in FIG. 9C, the keeper 104 is disposed adjacent to the receiver 102 and the release face 110 of the resilient finger 106 is arranged adjacent to the receiver 102 during the locked state LS. The selective engagement noted above is then initiated by movement of the interface 76 along the receiver 102, which is shown in FIG. 9D. Because the keeper 104 is in communication with the receiver 102, movement of the interface 76 (e.g., the tabs 78) along the receiver 102 moves the interface 76 into abutment with the keeper 104, which is also shown in FIG. 9D. In this version, during abutment between the interface 76 and the keeper 104, the interface 76 abuts the release face 110 of the resilient finger 106. This abutment brings the retention face 108 out of contact with the abutment surface 90 of the brace body 82 and disengages the resilient finger 106 from the brace body 82. As a result, the keeper 104 moves from the locked state LS to the unlocked state US, shown in FIG. 9E, and the resilient finger 106 can then be moved out of the interior 84, as shown in FIG. 9F, to place the restrictor 94 in the permit mode PM.

As noted above, the keeper 104 may include a first keeper 104' and a second keeper 104" (see FIGS. 6A-6B), the receiver 102 may include a first receiver 102' and a second receiver 102" (see FIG. 7), and the interface 76 may include a first tab 78' and a second tab 78" (see FIG. 8D). In such instances, the first and second keepers 104', 104" move from respective locked states LS to respective unlocked states US in response to selective engagement occurring simultaneously between the first tab 78' and the first receiver 102' and between the second tab 78" and the second receiver 102".

Figure 9E:
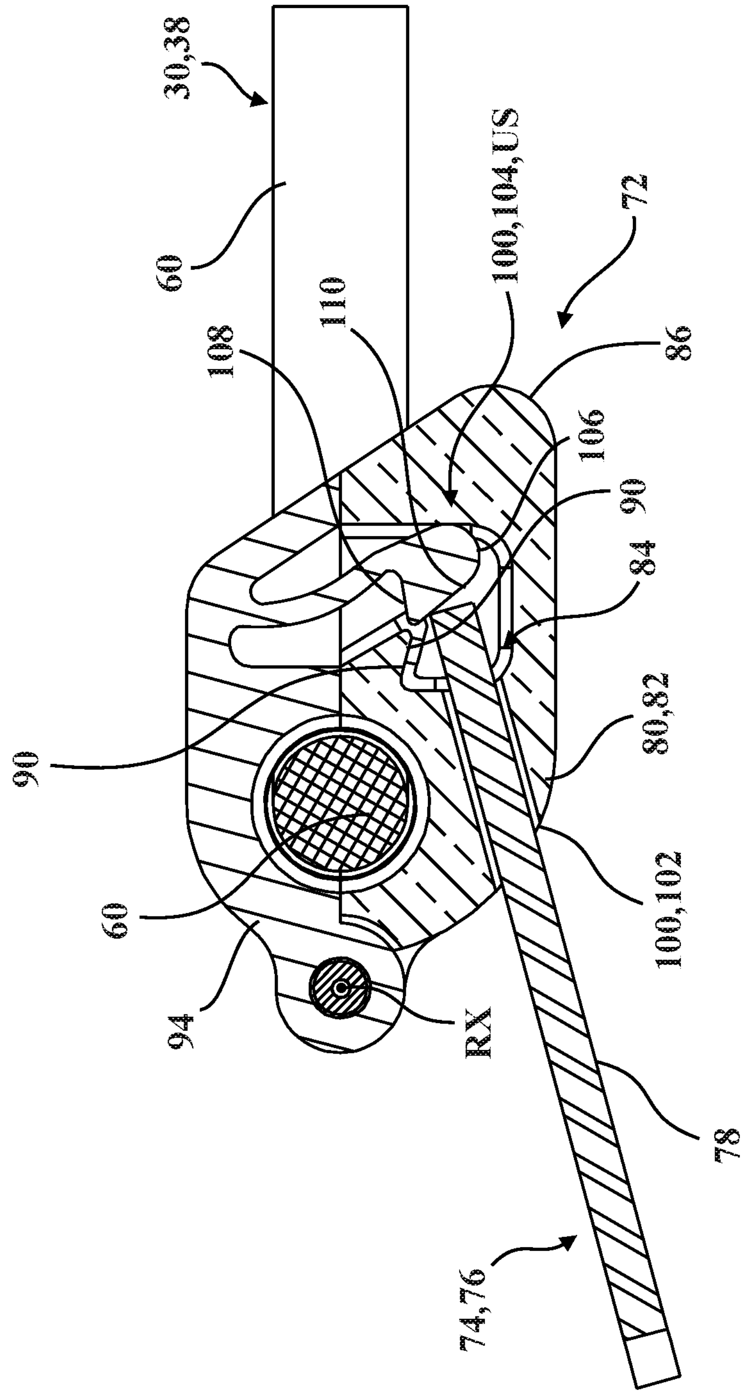
FIG. 9E is another partial sectional view of the cover, the restraint mount, and the instrument of FIG. 9D, shown with the instrument having moved the keeper into the unlocked state to facilitate moving the restrictor from the restrict mode to the permit mode.
Figure 9F:
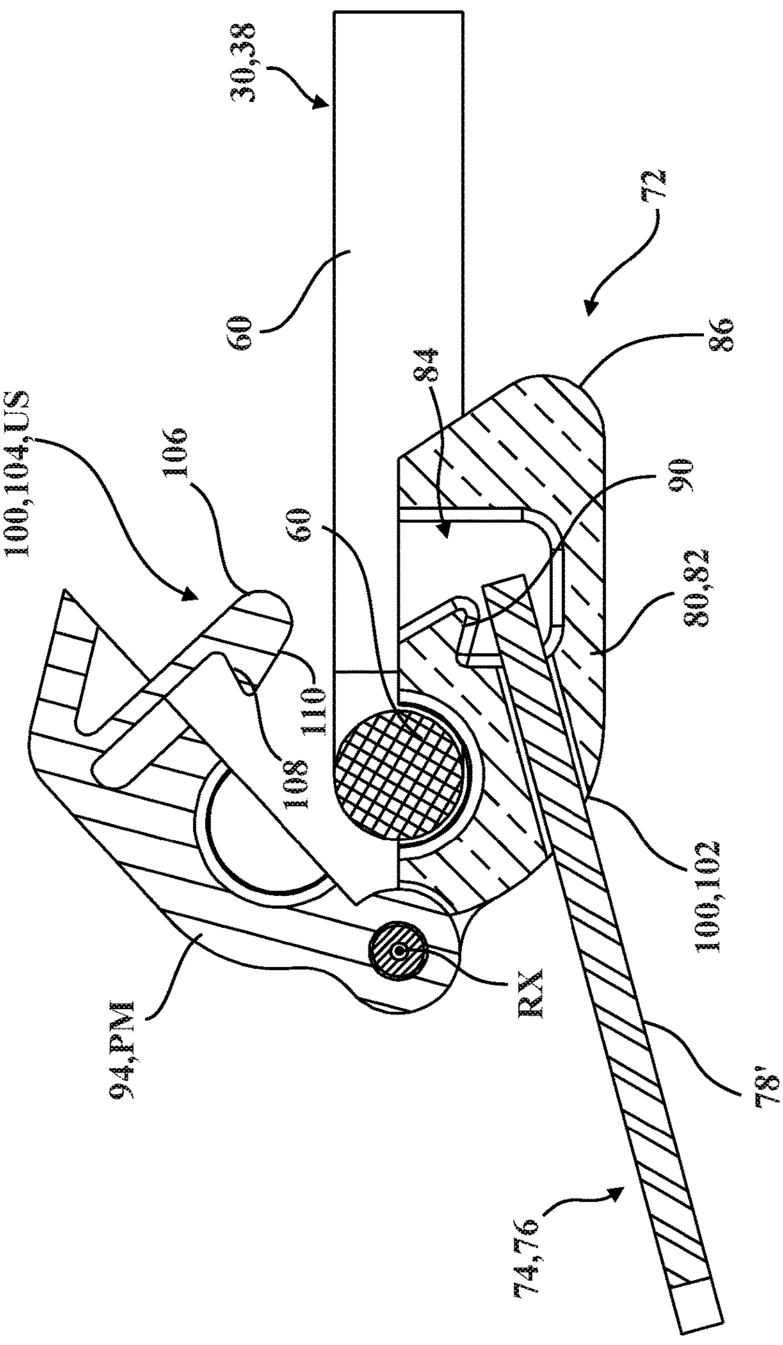
FIG. 9F is another partial sectional view of the cover, the restraint mount, and the instrument of FIG. 9E, shown with the restrictor having moved out of the restrict mode to facilitate removal of the cover from the restraint mount in the permit state.

In some instances, selective engagement between the first tab 78' and the first receiver 102' and selective engagement between the second tab 78" and the second receiver 102" may function similarly to the previously described selective engagement between the interface 76 and the receiver 102 (see FIGS. 9D and 9E). For example, prior to the selective engagement occurring, the first keeper 104' is disposed adjacent to the first receiver 102' and the second keeper 104" is disposed adjacent to the second receiver 102" in the locked state LS. As such, the selective engagement between the first tab 78' and the first receiver 102' may be defined as movement of the first tab 78' along the first receiver 102' and into abutment with the first keeper 104' to move the first keeper 104' from the locked state LS to the unlocked state US. Furthermore, the selective engagement between the second tab 78" and the second receiver 102" may be defined as movement of the second tab 78" along the second receiver 102" and into abutment with the second keeper 104" to move the second keeper 104" from the locked state LS to the unlocked state US.

In some versions, the cover 72 may be tethered to the patient support apparatus 30. For example, a tether TE (see FIGS. 8A and 8G; depicted schematically) may be attached to the patient support apparatus 30 to limit movement of the cover 72 away from the restraint mount 60 in the permit mode PM as shown in FIG. 8A or when the cover 72 is detached from the patient support apparatus 30 as shown in FIG. 8G. The tether TE may include a first tether end E1 operatively attached to one of the brace 80 and the restrictor 94 (or another portion of the cover 72), and a second tether end E2 for attaching to the patient support apparatus 30 (e.g., to the intermediate frame 36). In some versions, the tether TE may include or otherwise be realized by a cable, cord, strap, and the like. Other configurations are contemplated.

It will be appreciated that the components of the cover 72 may include any suitable structure, size, and/or shape for selectively blocking insertion of unauthorized objects through an aperture 62 of a restraint mount 60. For instance, while the brace body 82 of the cover 72 includes a rounded structure in some versions, in other instances, the brace body 82 may include a cuboidal structure. As another example, while the keeper 104 of cover 72 is integrally formed with the restrictor 94 of cover 72 in some versions, in other instances, the keeper 104 and the restrictor 94 may be separate components. Additionally, it will be appreciated that certain components of the cover 72 may vary in quantity and/or arrangement. For example, in some instances, the cover 72 may include a greater or fewer number of keepers 104 and/or receivers 102 (e.g., as is described in greater detail below in connection with FIGS. 17A-19D). Additionally, it will be appreciated that the instrument 74 and interface 76 may be of other styles, types, and/or configurations. For example, while some versions of the instrument 74 may include or otherwise be defined by a rounded structure, in other instances the instrument 74 may include an angular structure. As another example, the interface 76 may include various quantities of tabs or other structural features. Other configurations are contemplated.

As noted above, another version of the cover 72 is shown in FIGS. 10A-12F. Unless otherwise indicated, for the purposes of clarity and consistency, the components and structural features of the version of the cover 72 described above (e.g., in connection with FIGS. 6A-9F) that are the same as or that otherwise correspond to the version of the cover 72 of FIGS. 10A-12F are provided with the same reference numerals throughout the drawings and in the following description.

Referring to FIGS. 10A-12F, this version of the cover 72 and the corresponding instrument 74 (see FIGS. 11B-11C) are provided with a different arrangement and configuration of components in comparison to the versions described in connection with FIGS. 6A-9F. While the specific differences will be described in greater detail below, here too in this version the cover 72 may be attached to the patient support apparatus 30 and employs the restrictor 94 to selectively block access to the aperture 62 of the restraint mount 60 in order to prevent unauthorized objects from being passed through the aperture 62 of the restraint mount 60. While the version of the cover 72 described above in connection with FIGS. 6A-9F may be removed entirely from the aperture 62 of the restraint mount 60 after movement of the keeper 104 out of the unlocked state LS allows the restrictor 94 to move to the permit mode PM, in the version of the cover 72 of FIGS. 10A-12 the brace 80 can remain operatively attached to the patient support apparatus 30 and the restrictor 94 may be moved between the restrict mode RM and the permit mode PA via cooperation of the interface 76 of the instrument 74 with the keeper 104 of the lock mechanism 100. To this end, and as is described in greater detail below, the interface 76 of the instrument 74 includes a key 112 that effects changes in operation of the lock mechanism 100. However, other configurations are contemplated.

Figure 10A:
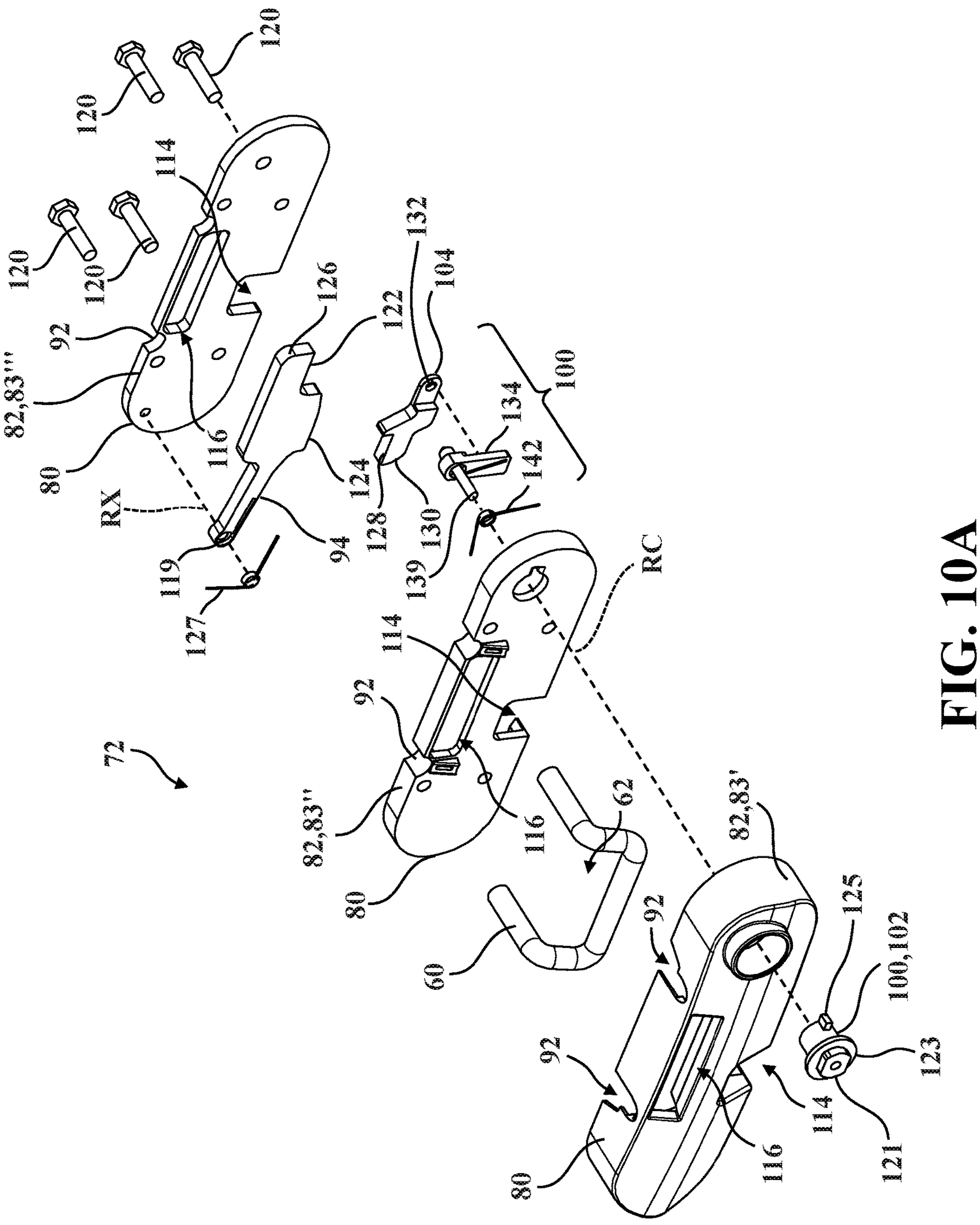
FIG. 10A is an exploded perspective view of the cover of FIG. 4B shown adjacent to a portion of the restraint mount of FIG. 4A, the cover having a restrictor and a lock mechanism with a keeper.

As shown best in FIG. 10A, in this version, the brace body 82 of the brace 80 includes first, second, and third brace body parts 83', 83", 83'" which cooperate to facilitate operation of the cover 72 and secure the cover 72 to the restraint mount 60 of the patient support apparatus 30 adjacent to the aperture 62. The brace 80 may be configured for attaching to a restraint mount 60, such as the straight rod restraint mount 64 shown in FIG. 3A, the bent rod restraint mount 66 shown in FIG. 4A, and/or the integrated restraint mount 70 integrally formed with the patient support deck 38 shown in FIG. 5A. Other configurations are contemplated.

The first, second, and third brace body parts 83', 83", 83'" each define a respective relief 114 which, in the illustrated versions, are realized as notches, apertures, or other formations that are shaped and arranged to facilitate selective access by the caregiver to the restrictor 94 in order to, among other things, move the restrictor 94 out of the permit mode PM and into the restrict mode RM as described in greater detail below. In the illustrated version, the first, second, and third brace body parts 83', 83", 83'" also each define a respective brace strap aperture 116 which is generally arranged adjacent to (or otherwise at least partially within) the aperture 62 of the restraint mount 60 when the cover 72 is secured to the patient support apparatus 30. Furthermore, the first, second, and third brace body parts 83', 83", 83'" may each define a portion of the restraint mount receptacle 92 as shown in FIG. 10A to facilitate engagement to and/or alignment with the restraint mount 60. It should be noted that a shape of the restraint mount receptacle 92 need not correspond to a shape of the restraint mount 60 to which the brace 80 attaches to. For example, although the restraint mount receptacle 92 of FIG. 10A includes or otherwise defines a generally rounded shape, the restraint mount receptacle 92 may receive a restraint mount 60 including a cuboidal structure, such as the integrated restraint mount 70 integrally formed with the patient support deck 38 of FIG. 5A. Furthermore, it should be noted that the restraint mount receptacle 92 may be include any suitable shape or size for receiving a restraint mount 60, and the first, second, and third brace body parts 83', 83", 83'" may have configurations different from each other.

Figure 10B:
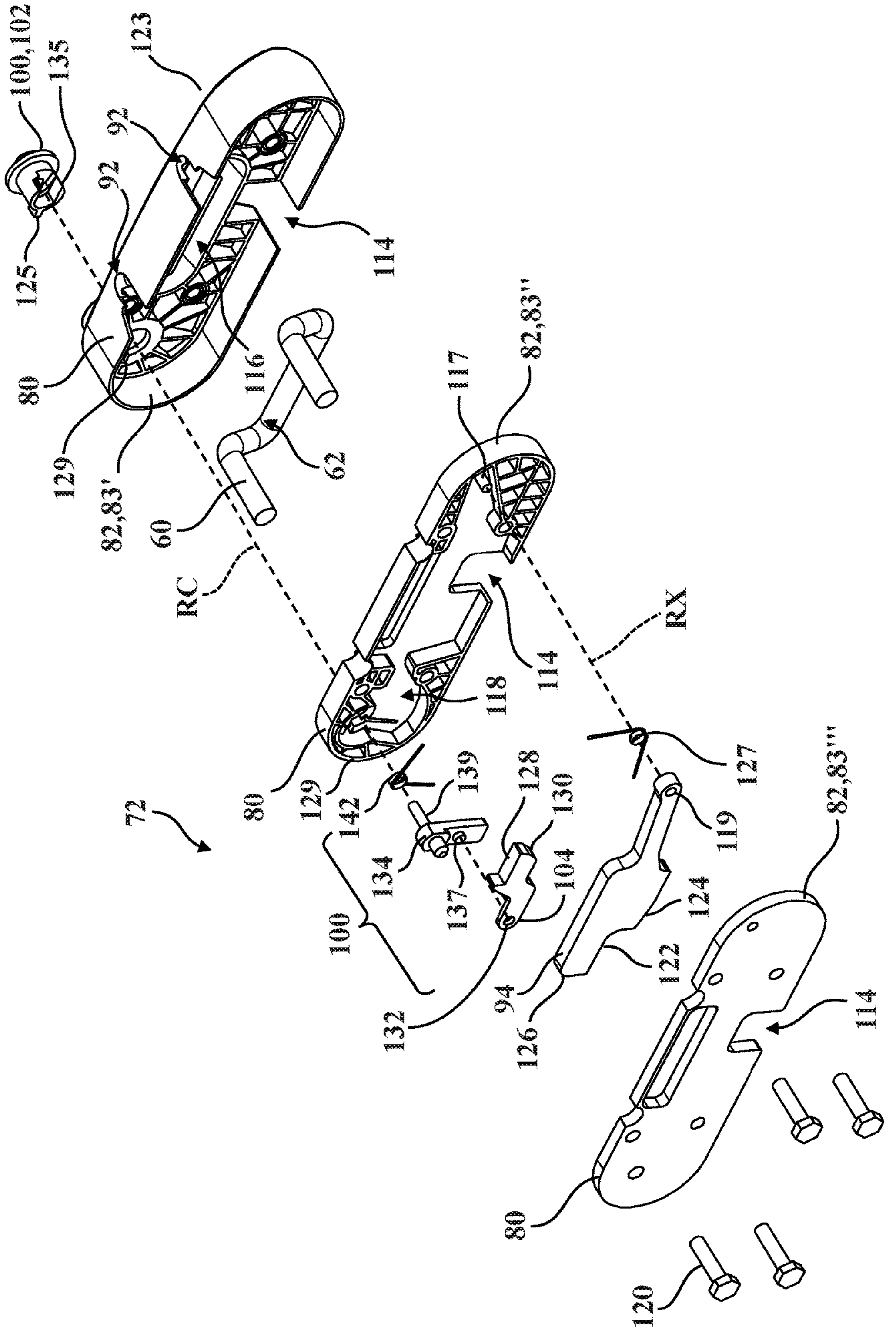
FIG. 10B is another exploded perspective view of the cover of FIG. 10A.

As is depicted in FIGS. 10A-10B, the first brace body part 83' is formed as a shell extending around other components of the cover 72. The second brace body part 83" defines a guide 118 (see FIG. 10B) which, as is described in greater detail below, is configured to support the keeper 104 for movement between the locked state LS and the unlocked state US. In this version, fasteners 120 are employed to couple the first, second, and third brace body parts 83', 83", 83''' together and thereby secure the cover 72 around the restraint mount 60 seated in the restraint mount receptacle 92 between the first and second brace body parts 83', 83" of the brace 80.

Figure 11A:
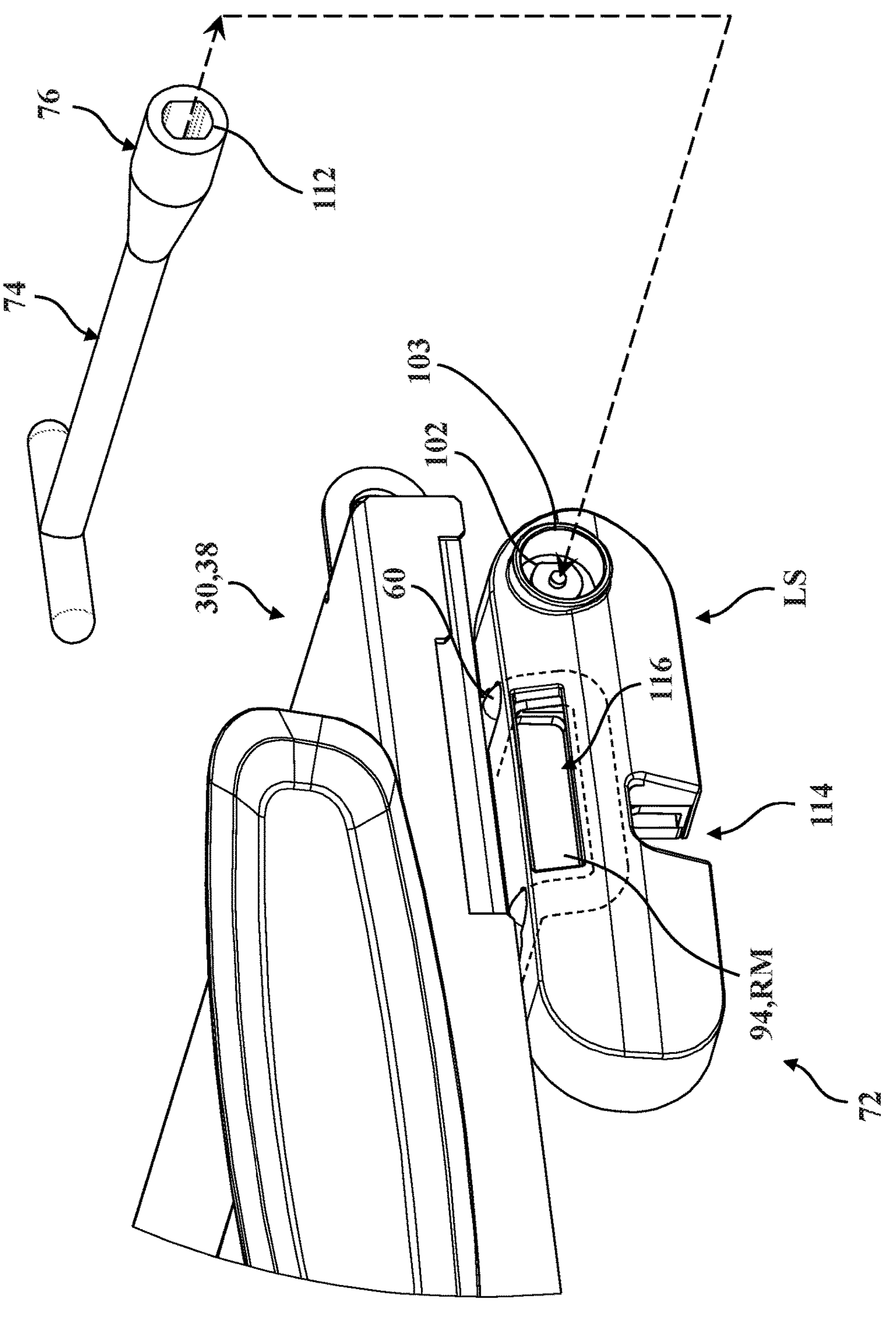
FIG. 11A is a partial perspective view of the patient support apparatus and cover of FIG. 4B, shown with an instrument arranged adjacent to a receiver of the lock mechanism to illustrate moving the keeper from a locked state to an unlocked state to facilitate moving the restrictor from a restrict mode to a permit mode.
Figure 11B:
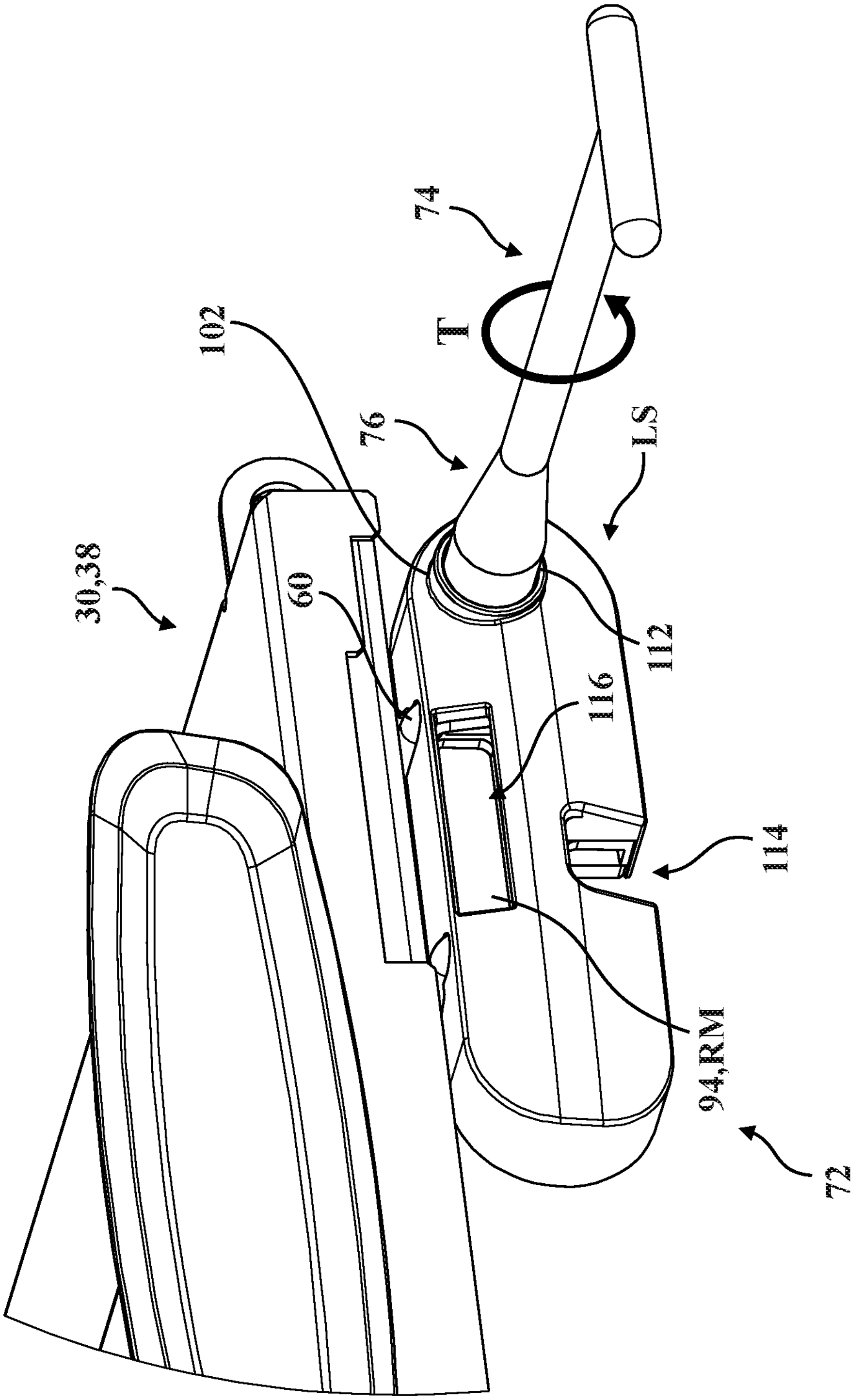
FIG. 11B is another partial perspective view of the patient support apparatus and cover of FIG. 11A, shown with the instrument inserted into the receiver of the lock mechanism to illustrate moving the keeper from the locked state to the unlocked state to facilitate moving the restrictor from the restrict mode to the permit mode.
Figure 11C:
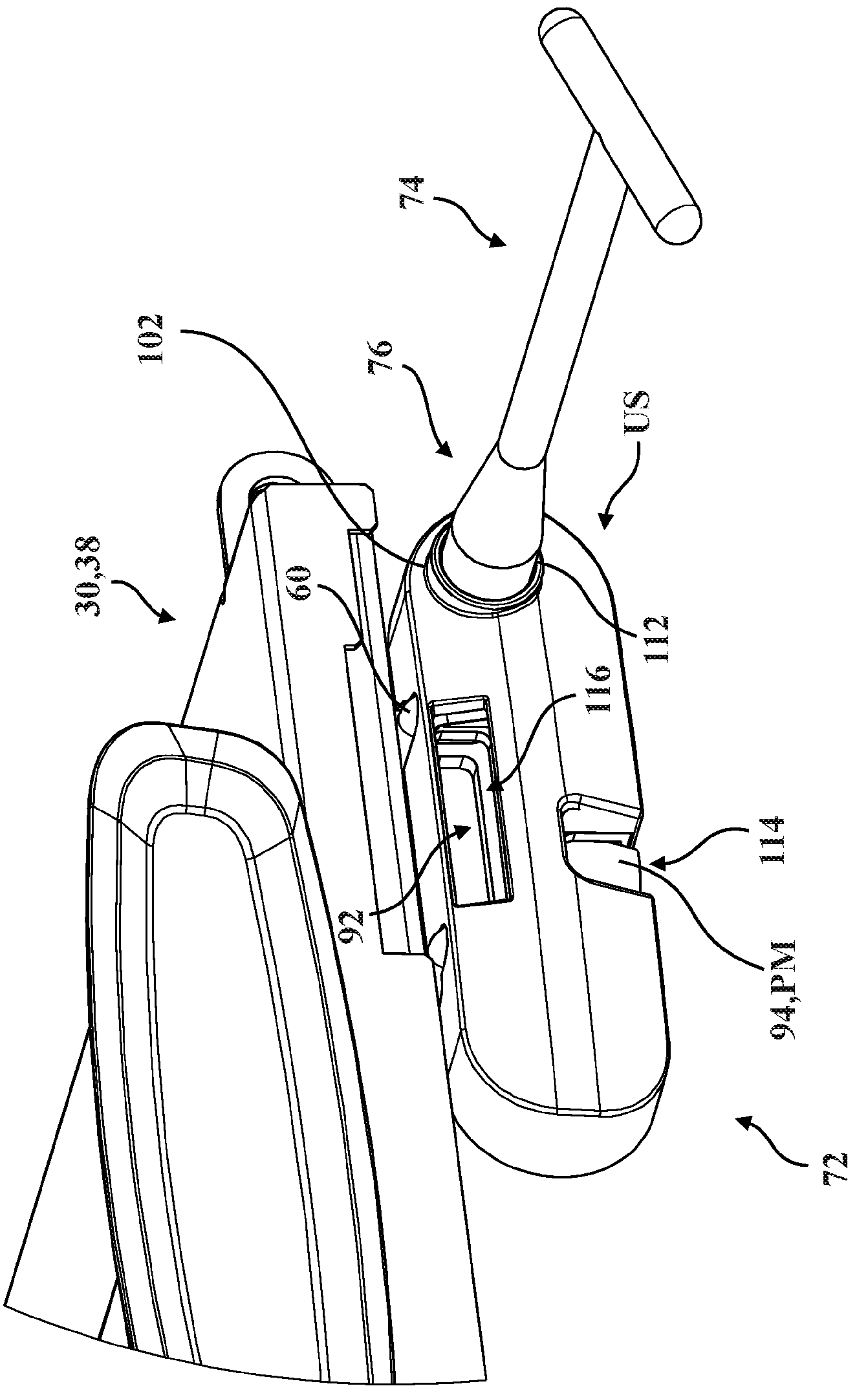
FIG. 11C is another partial perspective view of the patient support apparatus and cover of FIGS. 11A-11B, shown with the instrument in the receiver of the lock mechanism having been moved and unlocked to place the restrictor in the permit mode.

In this version, the restrictor 94 defines a catch face 122, an extension 124 spaced from the catch face 122, and a release surface 126, each of which are described in greater detail below. The extension 124 is arranged for user engagement to facilitate moving the restrictor 94 out of the permit mode PM, as is described in greater below. The restrictor 94 is operable in the restrict mode RM (see FIGS. 11A and 12A) where access to the aperture 62 of the restraint mount 60 is blocked, and the permit mode PM (see FIGS. 11C and 12C) where the access to the aperture 62 is at least partially permitted. Referring to FIG. 11A, during operation in the restrict mode RM, at least a portion of the restrictor 94 is arranged to block access to the brace strap aperture 116 to block access to both the brace strap aperture 116 and to the aperture 62 of the restraint mount 60. As such, objects may not be inserted through the aperture 62 during operation in the restrict mode RM. Referring to FIG. 11C, during operation in the permit mode PM, the brace strap aperture 116 is arranged adjacent to the aperture 62 of the restraint mount 60, and the restraint end RE of the patient restraint PR may be inserted through the aperture 62 (see, for example, FIGS. 2, 8G, and 11D; depicted schematically).

The restrictor 94 is movably coupled to the brace 80 to move between the restrict mode RM and the permit mode PM. More specifically, in this version, as is illustrated in the exploded views of FIGS. 10A-10B (see also FIGS. 12A-12B), the restrictor 94 is pivotably coupled to the brace 80 for movement relative to the brace 80 about the restrictor axis RX. In some versions, the cover 72 may include a restrictor biasing element 127 (see FIGS. 10A-10B) arranged between the restrictor 94 and the brace 80 so as to urge the restrictor 94 towards the permit mode PM. Here, the restrictor biasing element is realized as a torsion spring that is arranged to be partially disposed in a pocket formed in the restrictor 94 (see FIG. 10A; not shown in detail), and is supported about a projection 117 extending from the third brace body part 83''' of the brace 80 along the restrictor axis RX (see FIG. 10B) which is also arranged to engage a projection bore 119 of the restrictor 94 to support the restrictor 94 for pivoting movement about the restrictor axis RX. However, it will be appreciated that other configurations are contemplated.

The lock mechanism 100 is interposed between the brace 80 and the restrictor 94 as noted above. Here, the receiver 102 of the lock mechanism 100 extends through a port 103 defined in the first brace body part 83', and is configured to removably receive the key 112 of the interface 76 of the instrument 74 (see FIG. 11A). The receiver 102 has a keyed profile 121 (see FIG. 10A) that corresponds to the shape of the key 112 of the instrument 74 (see FIG. 11A) and. In this version, the receiver 102 is pivotably coupled to the brace 80 (see FIGS. 10A-10B and 12A-12B) for movement about a receiver axis RC. To this end, the receiver 102 includes a flange 123 which limits axial movement along the receiver axis RC (see FIG. 10A), and a tooth 125 to retain the receiver 102 and facilitate assembly of the cover 73 by passing through a tooth slot 129 (see FIG. 10B) formed in the first brace body part 83' and subsequently being rotated (not shown in detail). Once assembled, the receiver 102 may move about the receiver axis RC between a first receiver position RP1 (see FIG. 12A) and a second receiver position RP2 (see FIG. 12B). The receiver 102 may be configured to move between the first receiver position RP1 and the second receiver position RP2 in response to selective engagement between the key 112 of the interface 76 of the instrument 74 and the keyed profile 121 of the receiver 102, as described in greater detail below The process of moving the keeper 104 from the locked state LS to the unlocked state US with the instrument 74 is illustrated by FIGS. 11A-11C, although the keeper 104 is not shown in those drawing views (see FIGS. 12A-12B, which depict movement of the keeper 104 from the locked state LS to the unlocked state US). During operation of the keeper 104 in the locked state LS, the keeper 104 inhibits movement of the restrictor 94 in order to maintain operation of the restrictor 94 in the restrict mode RM. To this end, and as is best depicted in FIGS. 10A-10B, in this version the keeper 104 defines a retention face 128, a transition surface 130, and a pivot bore 132.

Figure 12A:
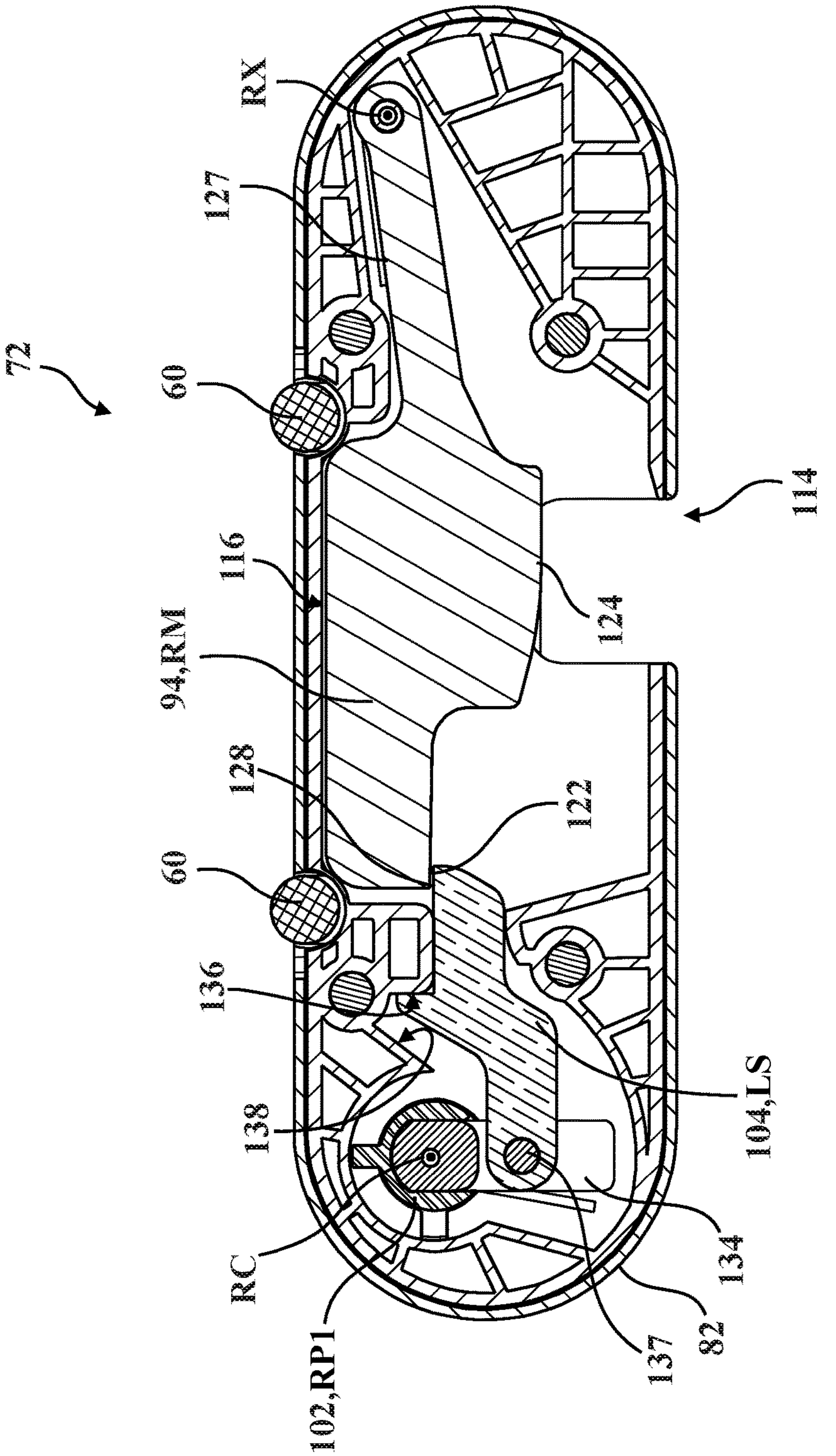
FIG. 12A is a partial sectional view of the cover and the restraint mount taken longitudinally through a portion of the keeper, with the cover arranged as depicted in FIG. 11A to illustrate operation with the restrictor in the restrict mode maintained by the keeper of the lock mechanism in the locked state.

As shown in FIG. 12A, the retention face 128 of the keeper 104 contacts the catch face 122 of the restrictor 94 during operation in the locked state LS to inhibit movement of the restrictor 94 relative to the brace 80 in the locked state LS. Here, the contact between the catch face 122 and the retention face 128 may prevent a caregiver from moving the restrictor 94 from the restrict mode RM. Here too, it will be appreciated that contact between the catch face 122 and the retention face 128 may prevent the restrictor biasing element 127 from urging the restrictor 94 towards the permit mode PM.

Figure 12B:
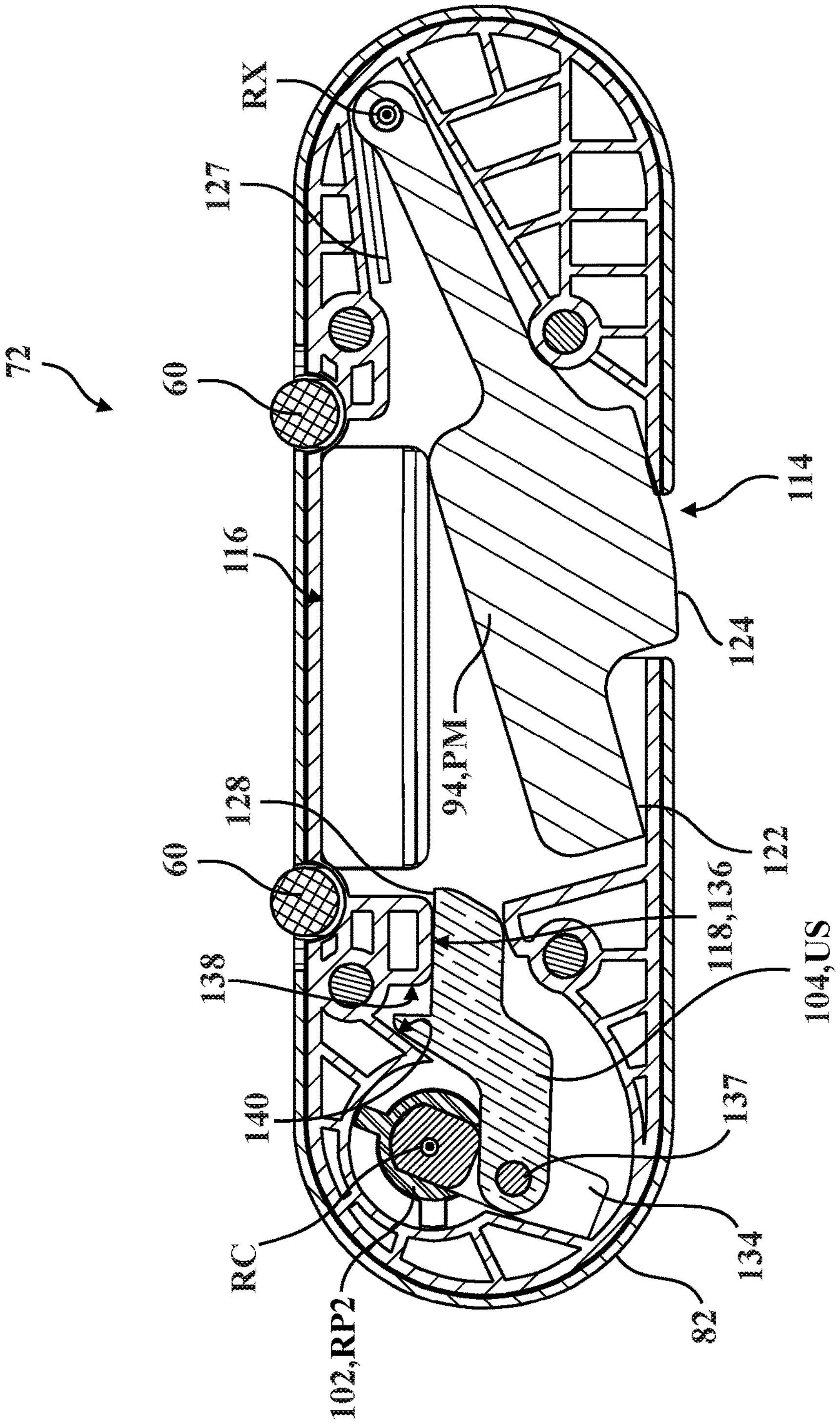
FIG. 12B is another partial sectional view of the cover and the restraint mount of FIG. 12A, with the cover arranged as depicted in FIG. 11C to illustrate movement of the restrictor to the permit mode in response to movement of the keeper to the unlocked state.

In this version, the lock mechanism 100 also includes a link 134 defining a pivot mount 137 (see FIG. 10B) which is seated in the pivot bore 132 of the keeper 104 to define a pivoting connection between the keeper 104 and the link 134. As is best shown in FIGS. 12A-12B, the link 134 is configured for operable attachment to the receiver 102 for concurrent movement about the receiver axis RC. To this end, the receiver 102 defines a link seat 135 into which the link 134 is disposed (see FIG. 10B). Here, the keeper 104 is pivotably coupled to the pivot mount 137 of the link 134 along an axis that is offset from the receiver axis RC, and the link 134 is pivotably coupled to the receiver 102 along the receiver axis RC such that pivoting movement of the receiver 102 from the first receiver position RP1 to the second receiver position RP2 about the receiver axis RC translates into sliding movement of the keeper 104 from the locked state LS to the unlocked state US.

In the illustrated version, a keeper biasing element 142 is interposed between the second brace body part 83" of the brace body 82 and the keeper 104 (see FIGS. 10A-10B) to urge the keeper 104 toward the locked state LS. Here, the keeper biasing element 142 is realized as a torsion spring that is arranged to be partially disposed in pockets formed in the second brace body part 83" (see FIG. 10B; not shown in detail) and in the link 134 (see FIG. 10A; not shown in detail), and is supported about a pilot 139 extending from the link 134 along the receiver axis RC which is also arranged to engage a pilot bore (not shown in detail) of the receiver 102. However, it will be appreciated that other configurations are contemplated. The keeper biasing element 142 is coupled to the receiver 102 via the link 134, and engages against the second brace body part 83" to urge the receiver 102 towards the first receiver position RP1. As such, the keeper 104 returns to the locked state LS in response to the keeper biasing element 142 moving the receiver 102 from the second receiver position RP2 (see FIG. 12B) to the first receiver position RP1 (see FIG. 12C).

During operation of the keeper 104 in the unlocked state US, movement of the restrictor 94 changes operation of the restrictor 94 from the restrict mode RM to the permit mode PM. With reference to FIG. 12B, the restrictor 94 may move about the restrictor axis RX relative to the brace 80 while in the unlocked state US. In the unlocked state US, the catch face 122 does not contact the retention face 128, and the restrictor biasing element 127 may thus urge the restrictor 94 towards the permit mode PM.

Figure 11D:
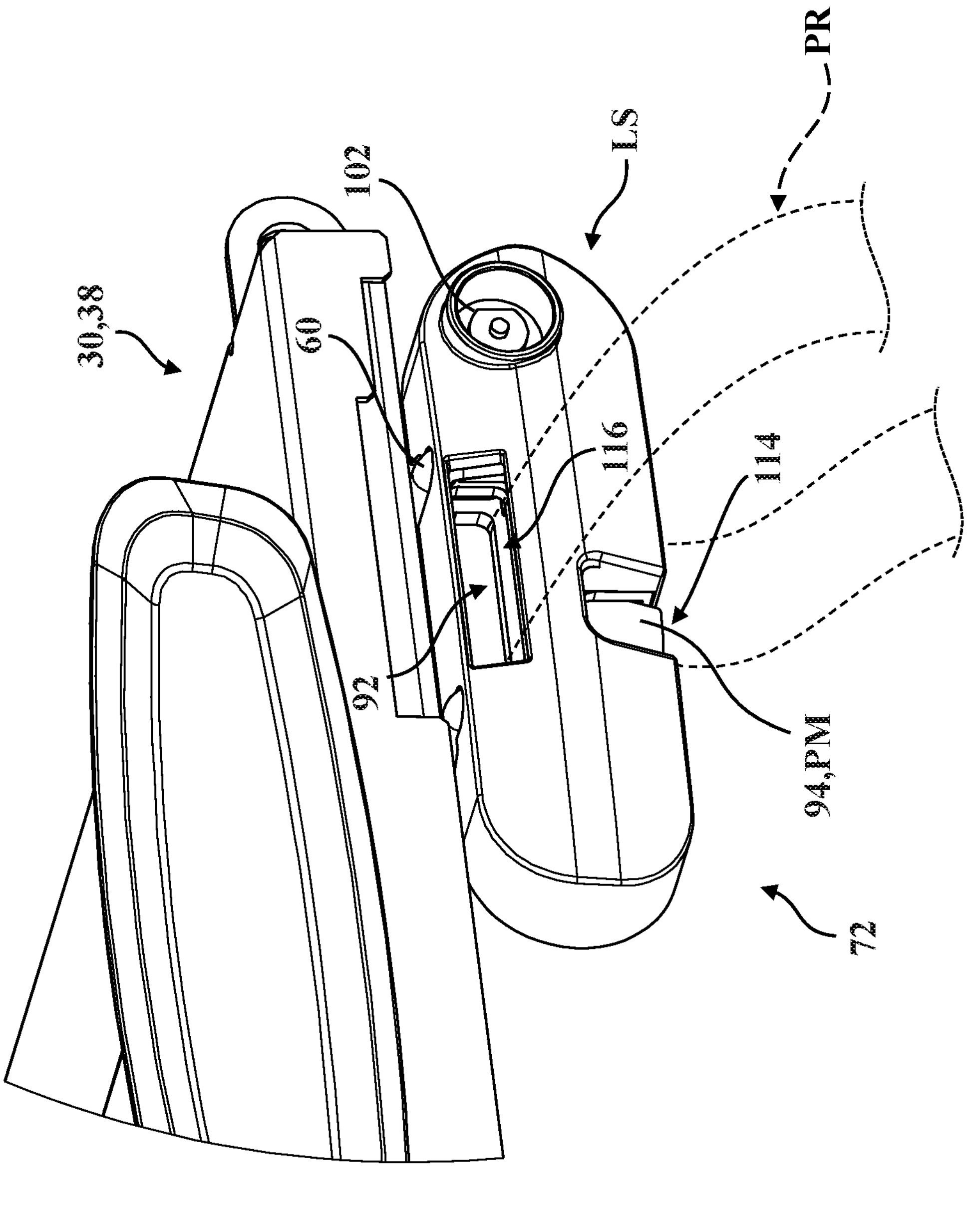
FIG. 11D is another partial perspective view of the patient support apparatus and cover of FIGS. 11A-11C, shown with the restrictor in the permit mode and with a patient restraint passing through the restraint mount.

The instrument 74 shown in FIG. 11A may be used to move the keeper 104 from the locked state LS to the unlocked state US as noted above. Here, a caregiver may use the instrument 74 to move the keeper 104 from the locked state LS to the unlocked state US to permit access to the aperture 62 of the restraint mount 60. As shown in FIGS. 11B-11C, selective engagement between the interface 76 of the instrument 74 and the receiver 102 moves the keeper 104 from the locked state LS to the unlocked state US. In instances where the restrictor 94 operated in the restrict mode RM during operation in the locked state LS (see FIG. 11B), the restrictor 94 moves from the restrict mode RM to the permit mode PM in response to the keeper 104 moving from the locked state LS to the unlocked state US. The aperture 62 of the restraint mount 60 may then be accessed as shown in FIG. 11D. The selective engagement between the interface 76 and the receiver 102 noted above is illustrated in FIG. 11B, whereby the key 112 of the interface 76 is axially inserted into engagement with the receiver 102 and is then rotated such that rotational torque T is applied to the receiver 102 from the interface 76. The rotational torque T may originate from a caregiver or any other suitable source. For example, a caregiver may rotate the instrument 74, which rotates the interface 76 and applies the rotational torque T to the receiver 102. In response to the application of rotational torque T, the keeper 104 from the locked state LS to the unlocked state US by moving the receiver 102 moving from the first receiver position RP1 (see FIG. 12A) to the second receiver position RP2 (see FIG. 12B) described above. FIG. 12A illustrates the cover 72 prior to the selective engagement occurring and shows the receiver 102 in the first receiver position RP1 and the keeper 104 in the locked state LS. FIG. 12B illustrates the cover 72 after the selective engagement occurs and shows the receiver 102 in the second receiver position RP2 and the keeper 104 in the unlocked state US.

As noted above, in some versions, the cover 72 may include a guide 118 configured to support the keeper 104 for movement between the locked state LS and the unlocked state US. In the illustrated version, the guide 118 is formed as a part of the second brace body part 83", but could be realized or otherwise defined by other components of the cover 72. In some versions, the guide 118 may include or otherwise define a first surface 136 arranged to slidably engage a portion of the keeper 104 in order to facilitate movement of the keeper 104 during changes in operation between the locked state LS and the unlocked state US. The guide 118 may also include or otherwise define a second surface 138, which may contact a portion of the keeper 104 during operation in the locked state LS to limit movement of the keeper 104 further towards the aperture 116 (see FIG. 12A). The guide 118 may also include a third surface 140 which may contact a portion of the keeper 104 during operation in the unlocked state US to limit movement of the keeper 104 further away from the aperture (see FIG. 12B). It will be appreciated that other surfaces of the guide 118 may be arranged to limit or otherwise control movement of the keeper 104. Other configurations are contemplated.

Movement of the keeper 104 as a result of the selective engagement between the interface 76 and the receiver 102 may also cause the restrictor 94 to move. Specifically, if the restrictor 94 is in the restrict mode RM during operation in the locked state LS, the restrictor 94 moves from the restrict mode RM to the permit mode PM in response to the selective engagement occurring. For example, in FIG. 12A, the restrictor 94 is depicted in the restrict mode RM prior to the selective engagement occurring. The keeper 104 inhibits movement of the restrictor 94 as the catch face 122 of the restrictor 94 and the retention face 128 of the keeper 104 are in contact with one another. As such, the keeper 104 maintains operation of the restrictor 94 in the restrict mode RM. Referring to FIG. 12B, after the selective engagement noted above occurs, there exists an absence of contact between the catch face 122 and the retention face 128 and the restrictor 94 moves to the permit mode PM. Here, the restrictor biasing element 127 may urge the restrictor 94 towards the permit mode PM when the keeper is disposed in the unlocked state US due to a lack of contact between the catch face 122 and the retention face 128. In versions which do not include the restrictor biasing element 127, weight of the restrictor 94 may move the restrictor to the permit mode PM.

Figure 12C:
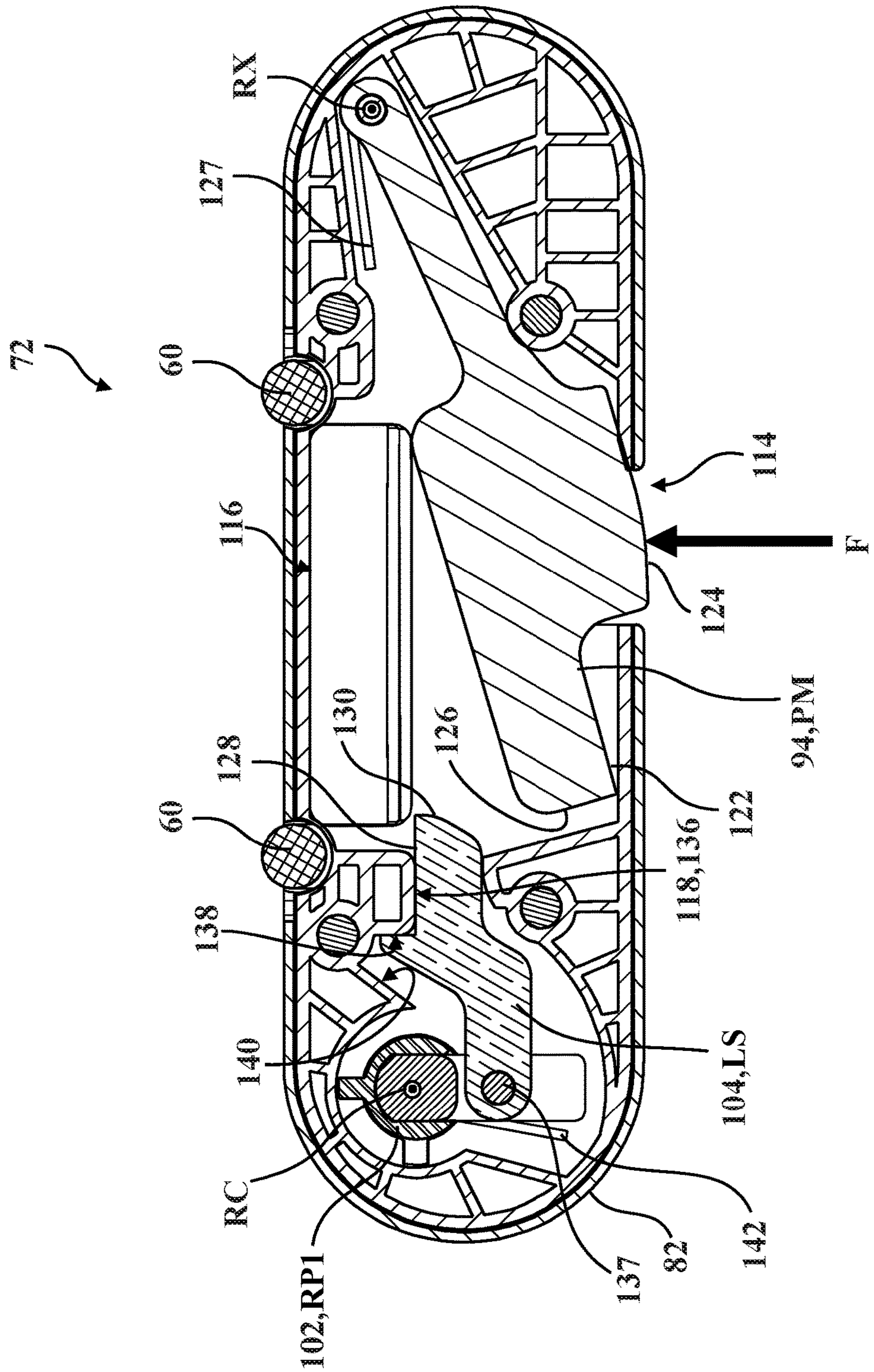
FIG. 12C is another partial sectional view of the cover and the restraint mount of FIGS. 12A-12B, with the cover arranged as depicted in FIG. 11D to illustrate operation of the restrictor in the permit mode with the keeper in the locked state.

During an absence of engagement between the receiver 102 and the interface 76 of the instrument 74 (e.g., illustrated by comparing FIG. 12B to FIG. 12C), the keeper 104 returns to the locked state LS depicted in FIG. 12C via the keeper biasing element 142, which urges the receiver 102 towards the first receiver position RP1. As such, the keeper 104 returns to the locked state LS in response to the keeper biasing element 142 moving the receiver 102 from the second receiver position RP2 (see FIG. 12B) to the first receiver position RP1 (see FIG. 12C).

In this version, the process of moving the restrictor 94 from the permit mode PM to the restrict mode RM is illustrated by FIGS. 12C-12F. In FIG. 12C, the restrictor 94 is shown operating in the permit mode PM and the relief 114 of the brace body 82 is arranged adjacent to the extension 124 of the restrictor 94. Here, the relief 114 is shaped to permit user engagement with the extension 124. A caregiver may apply a force F to move the restrictor 94 from the permit mode PM to the restrict mode RM. As is depicted sequentially by FIGS. 12C-12E, the keeper 104 can be returned to the locked state LS in response to force F applied to the extension 124 of the restrictor 94. For versions of the cover 72 which utilize the restrictor biasing element 127, it will be appreciated that the restrictor 94 is urged towards the permit mode PM in absence of contact between the catch face 122 and the retention face 128, and force F which overcomes force from the restrictor biasing element 127 moves the restrictor 94 toward the restrict mode RM.

Figure 12D:
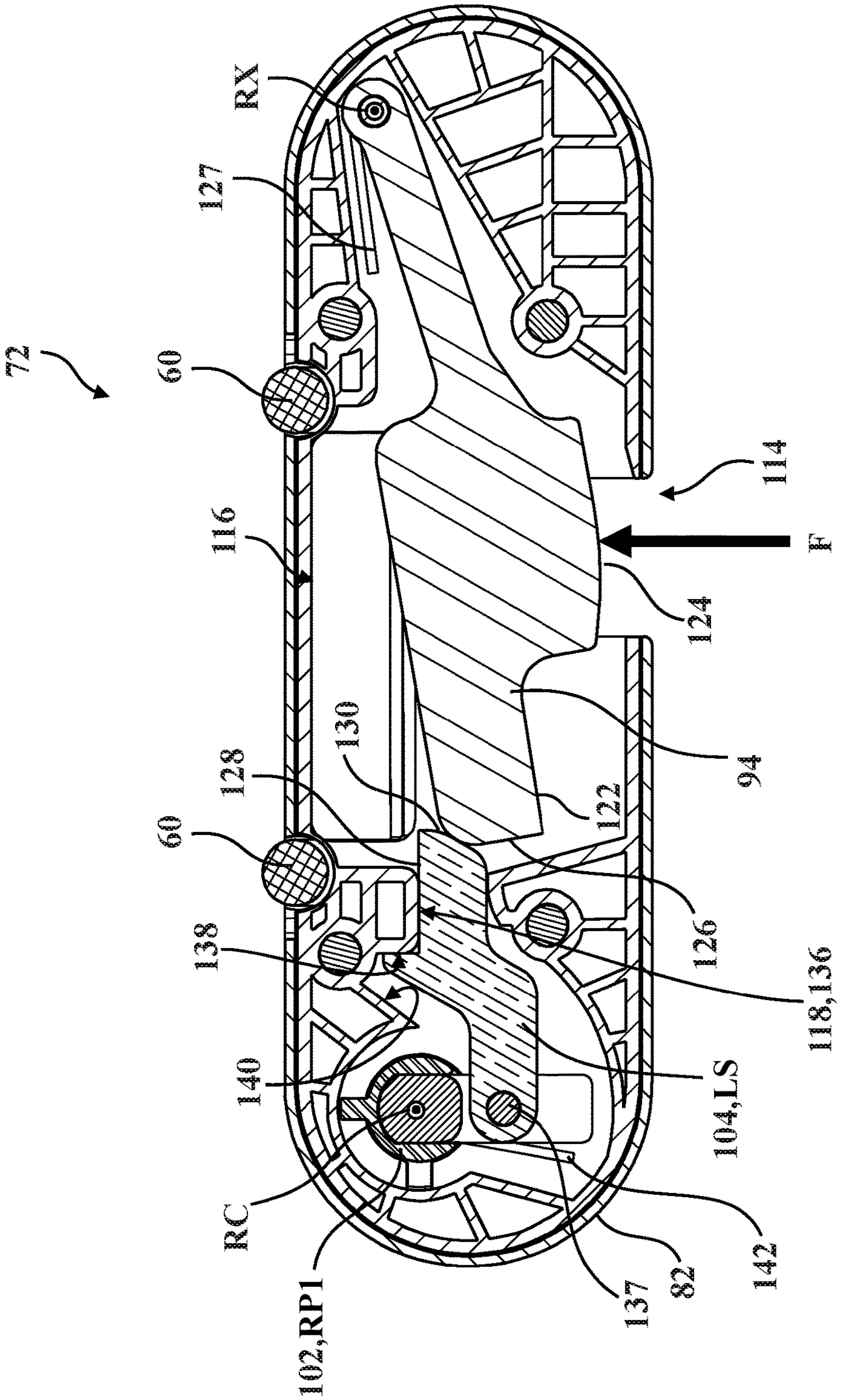
FIG. 12D is another partial sectional view of the cover and the restraint mount of FIGS. 12A-12C, depicting movement of the restrictor away from the permit mode and towards the restrict mode in response to applied force.
Figure 12E:
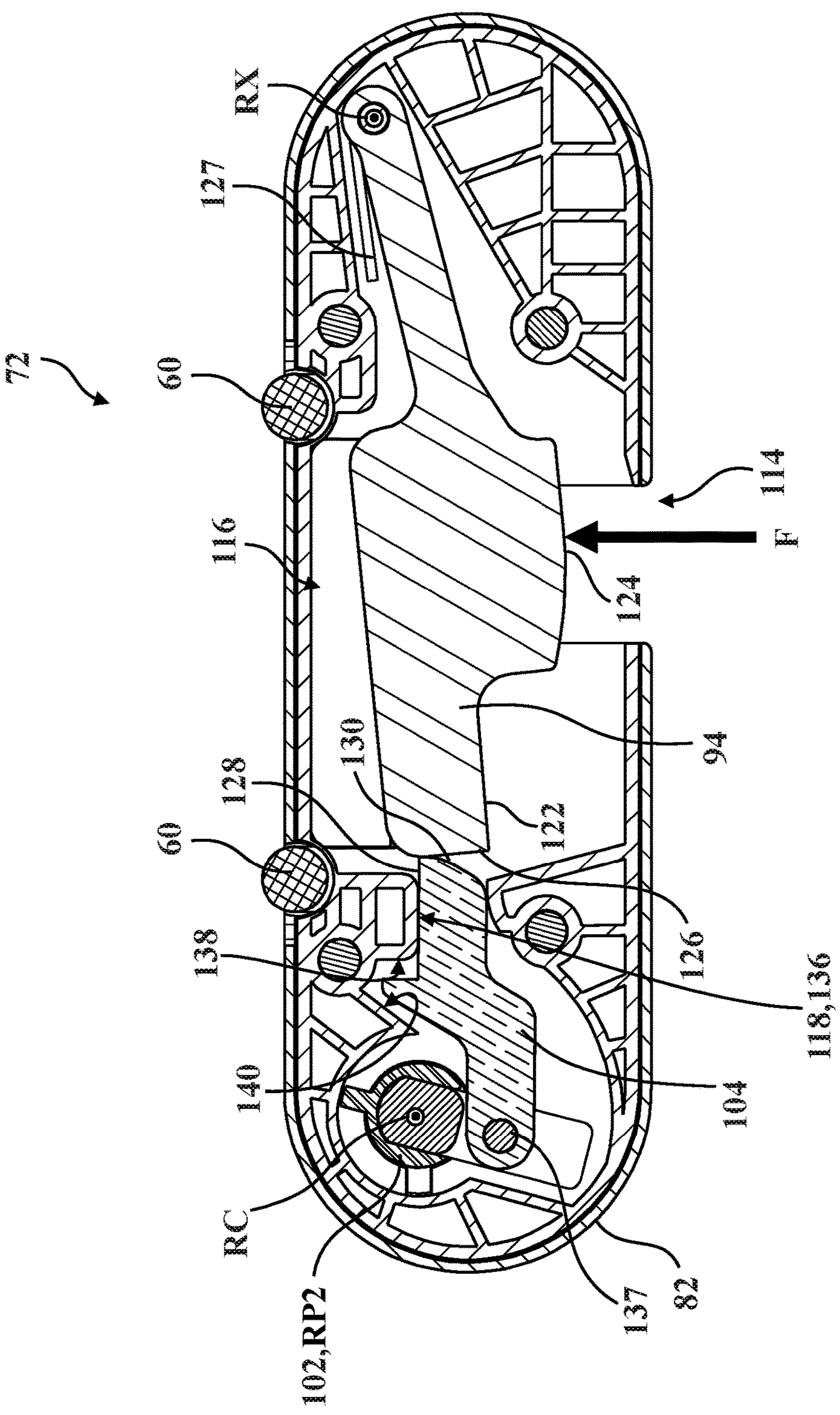
FIG. 12E is another partial sectional view of the cover and the restraint mount of FIGS. 12A-12D, depicting further movement of the restrictor away from the permit mode and towards the restrict mode in response to applied force.
Figure 12F:
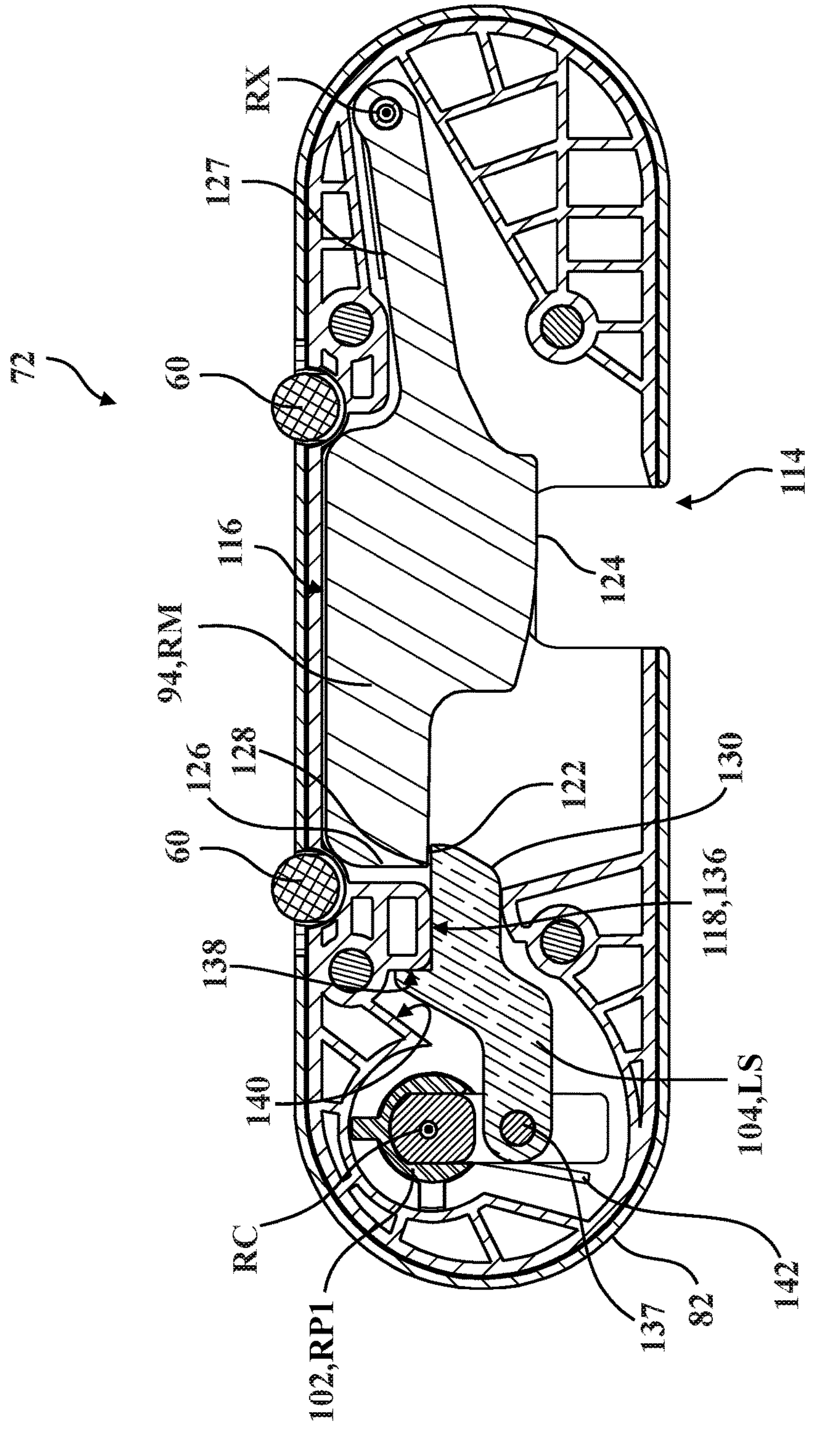
FIG. 12F is another partial sectional view of the cover and the restraint mount of FIGS. 12A-12D, depicting operation of the restrictor in the restrict mode in response to applied force.

As the restrictor 94 moves from the permit mode PM to the restrict mode RM, the restrictor 94 contacts the keeper 104 and urges the keeper 104 from the locked state LS toward the unlocked state US. Referring to FIG. 12C, the release surface 126 of the restrictor 94 is arranged in spaced relation from the transition surface 130 of the keeper 104 while the restrictor 94 is in the permit mode PM (and when the keeper 104 is in the restrict mode RM). However, movement of the restrictor 94 from the permit mode PM toward the restrict mode RM brings the release surface 126 into engagement with the transition surface 130, as shown in FIG. 12D. The engagement of the release surface 126 and the transition surface 130 urges the keeper 104 from the locked state LS to the unlocked state US, as shown in FIG.

12E. The keeper 104 is urged from the locked state LS to the unlocked state US until subsequent disengagement between the release surface 126 and the transition surface 130. This disengagement, shown in FIG. 12F, permits the keeper 104 to move to the locked state LS and retain the restrictor 94 in the restrict mode RM.

It will be appreciated that various configurations and arrangements of components could be employed by the cover 72 consistent with the scope of the present disclosure for selectively blocking insertion of unauthorized objects through apertures 62 of restraint mounts 60 of patient support apparatuses 30. Additionally, it should be noted that various configurations of the instrument 74 and/or interface 76 are contemplated. For example, while the illustrated instrument 74 includes a T-handle and the key 112 of the interface 76 is realized with a female profile, in other instances the instrument 74 may include screwdriver handle and the interface 76 may include a male profile. Other configurations are contemplated.

As noted above, another version of the cover 72 is shown in FIGS. 13A-14B. Unless otherwise indicated, for the purposes of clarity and consistency, the components and structural features of the version of the cover 72 described above (e.g., in connection with FIGS. 10A-12F) that are the same as or that otherwise correspond to the version of the cover 72 of FIGS. 13A-14B are provided with the same reference numerals throughout the drawings and in the following description.

Referring to FIGS. 13A-14B, this version of the cover 72 is similar to the version of the cover 72 described above in connection with FIGS. 10A-12F. While the specific differences will be described in greater detail below, here too in this version the cover 72 may be attached to the patient support apparatus 30 and employs the restrictor 94 to selectively block access to the aperture 62 of the restraint mount 60 in order to prevent unauthorized objects from being passed through the aperture 62 of the restraint mount 60.

Figure 13A:
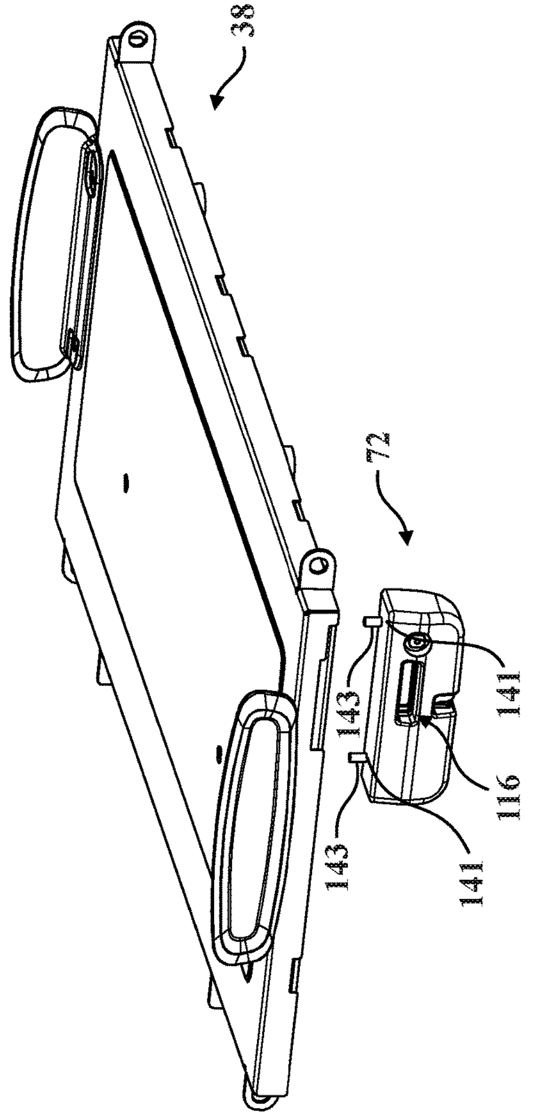
FIG. 13A is a perspective view of a cover spaced from the patient support deck of the patient support apparatus of FIG. 1.
Figure 13B:
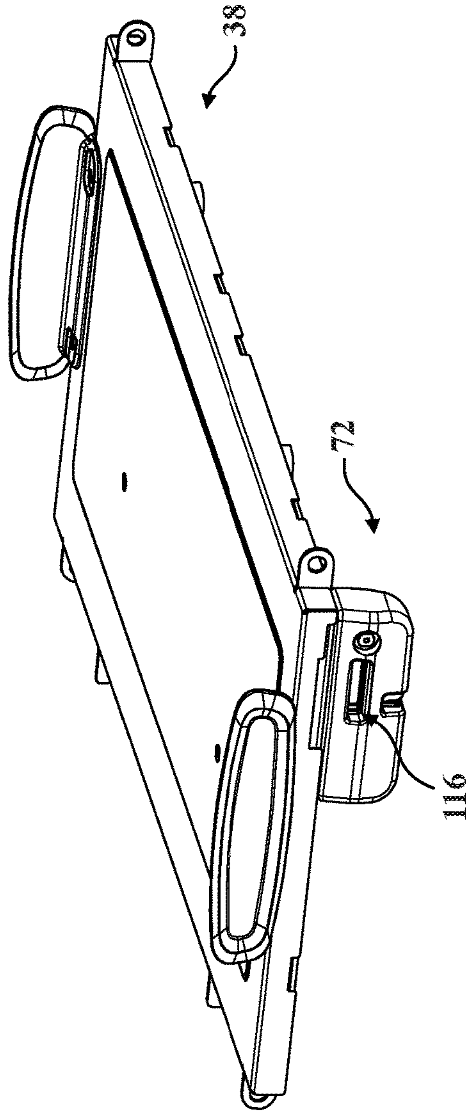
FIG. 13B is another perspective view of the cover and the patient support deck of FIG. 13A, shown with the cover coupled to the patient support deck.
Figure 14A:
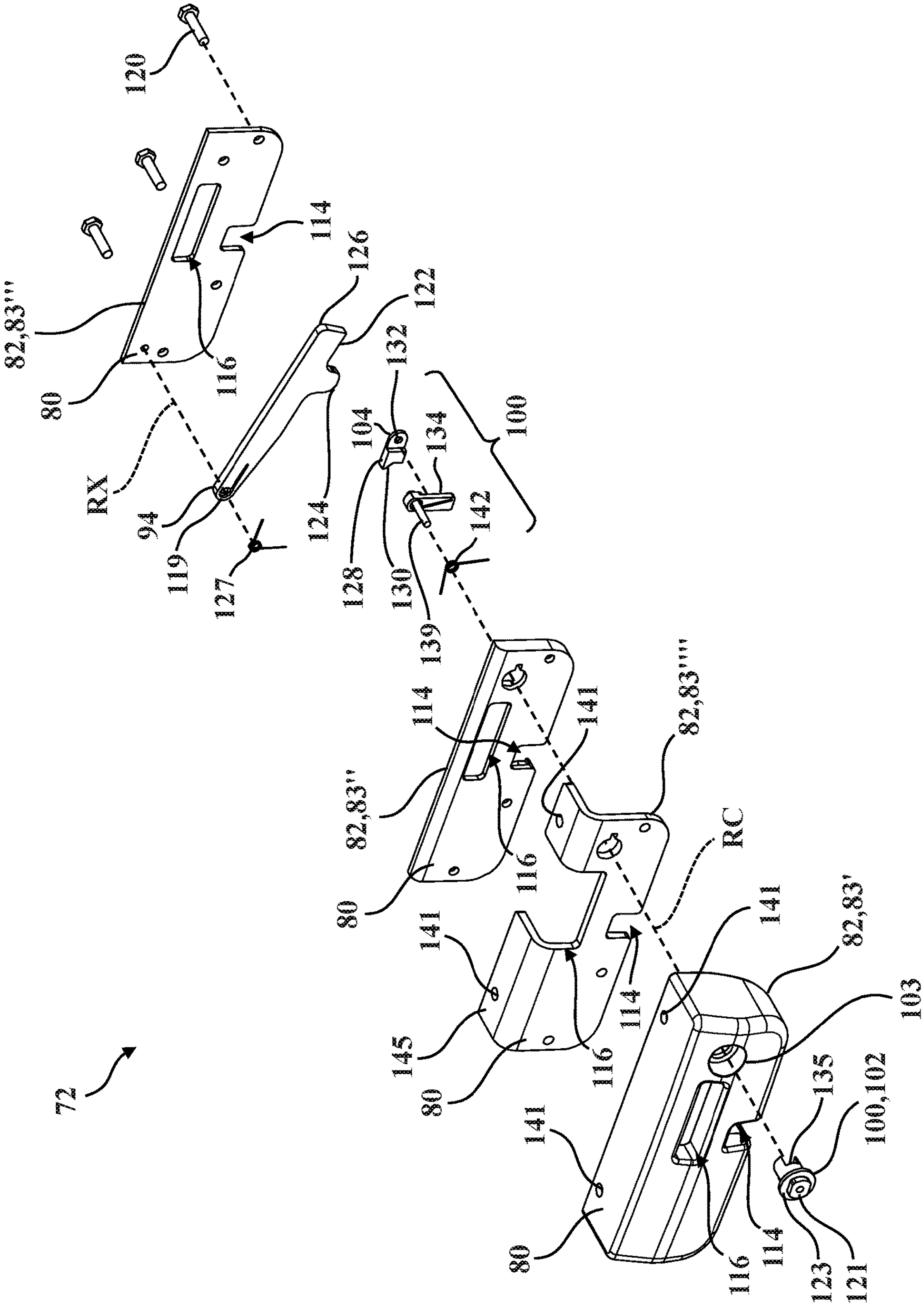
FIG. 14A is an exploded perspective view of the cover of FIGS. 13A-13B.
Figure 14B:
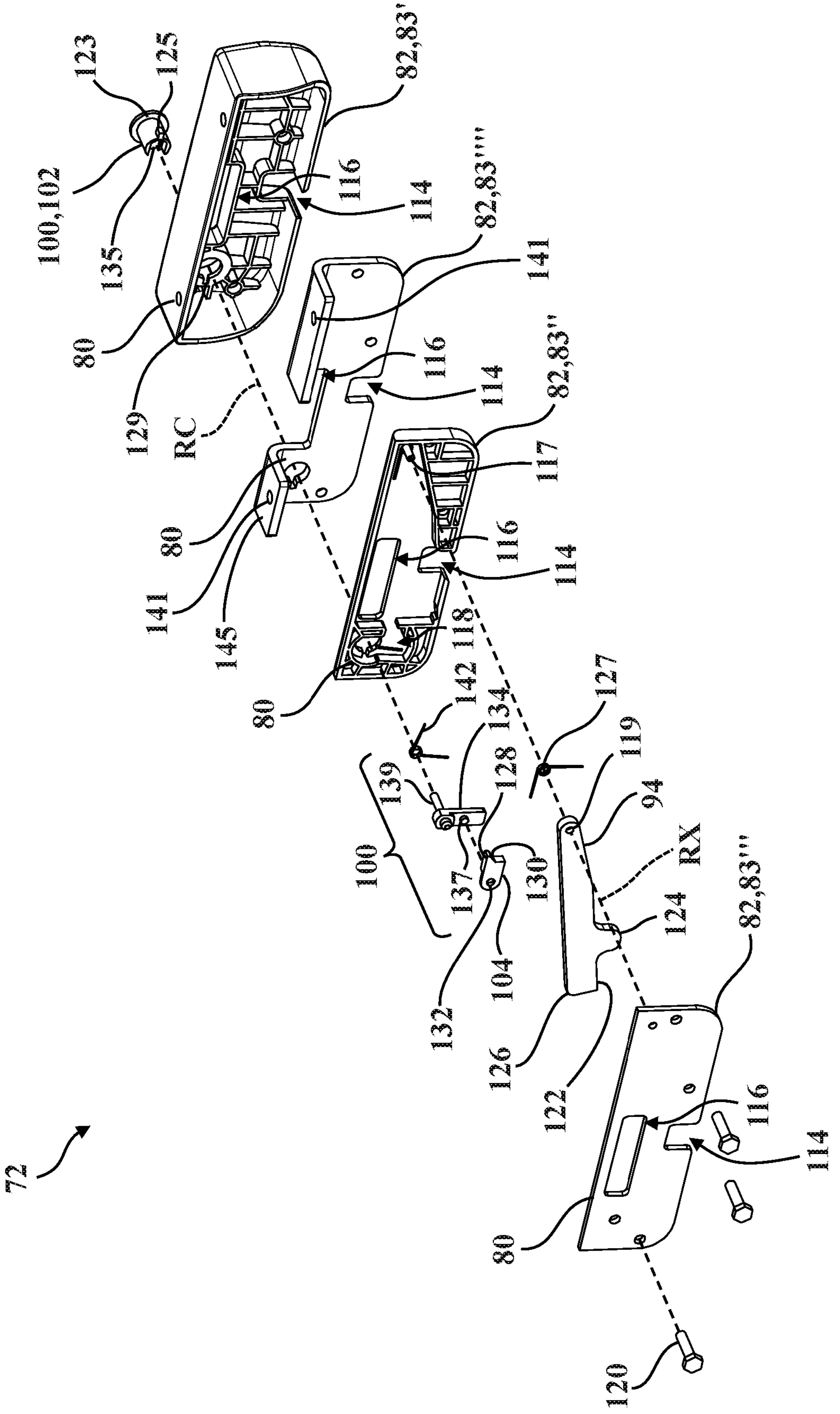
FIG. 14B is another exploded perspective view of the cover of FIG. 14A.

In this version, the cover 72 is configured to be secured to section of the patient support deck 38 in order to define a restraint mount 60 of the patient support apparatus 30, rather than to operatively attach to an existing restraint mount 60 of the patient support apparatus 30. As shown in FIG. 13A, in this version, the brace body 82 of the brace 80 includes a fourth brace body part 83"" which has a bent region 145 defining fastener mounts 141 (see FIGS. 14A-14B) arranged to receive fasteners 143 (see FIGS. 13A-13B) for securing the cover 72 to the patient support apparatus 30. Here, it will be appreciated that, in instances where the patient support apparatus 30 does not include or otherwise define the restraint mount 60 and/or the aperture 62, the cover 72 may be secured to the patient support apparatus 30 such that the brace strap aperture 116 of the cover 72 serves as the aperture 62. Additionally, it should be noted that the cover 72 includes the brace 80, the restrictor 94, the lock mechanism 100, the receiver 102, and the keeper 104 shown in FIGS. 14A-14B which are substantially similar to the components described above in connection with FIGS. 10A-10B.

Figure 15:
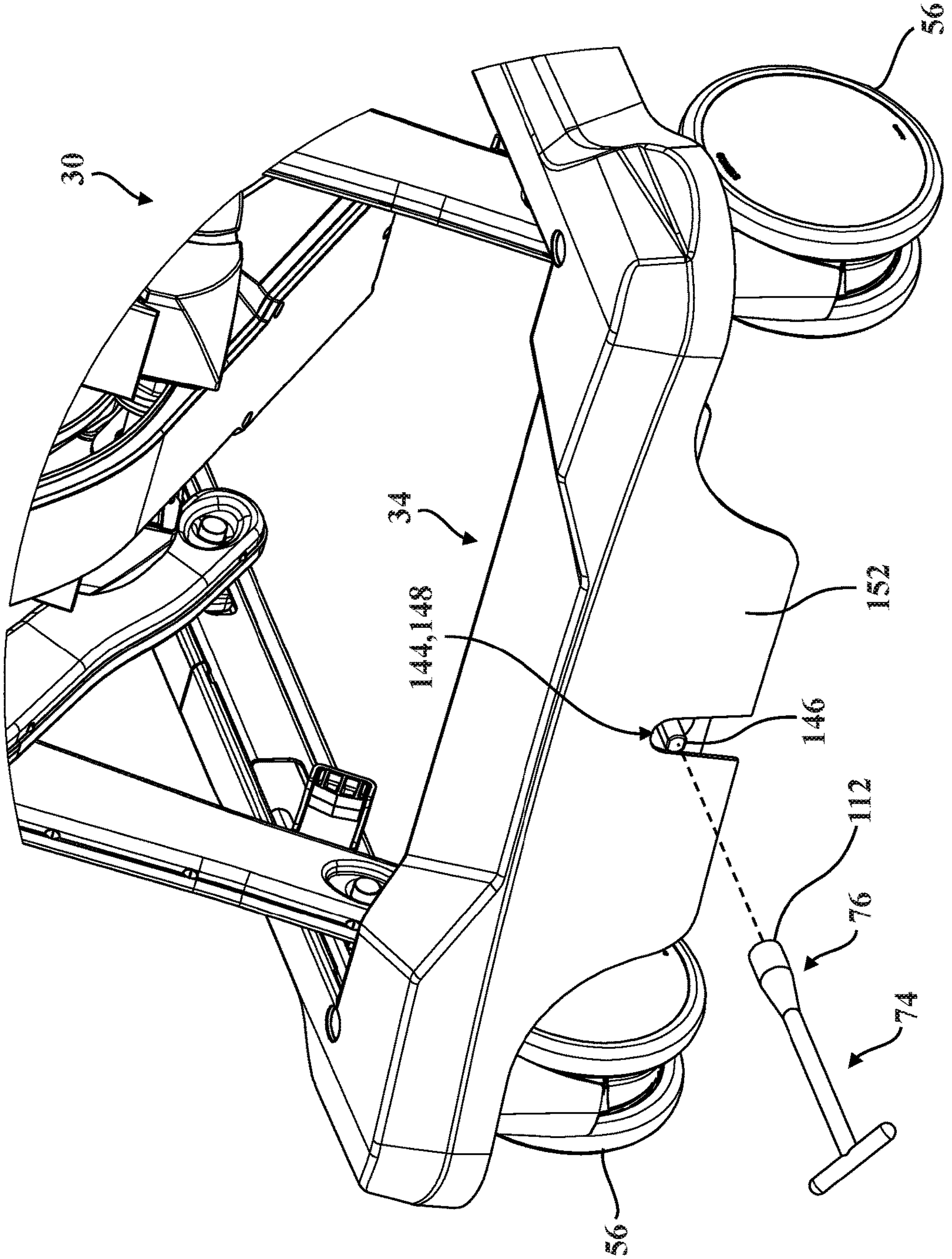
FIG. 15 is a partial perspective view of a base of the patient support apparatus of FIG. 1 shown with an instrument arranged adjacent to an apparatus device.

As will be appreciated from the subsequent description below, the instrument 74 illustrated and described herein in connection with the versions of the cover 72 of FIGS. 10A-14B may be used with other functions of the patient support apparatus 30. With reference to FIG. 15, in some versions, the patient support apparatus may 30 include one or more apparatus devices 144. The apparatus device 144 may be configured to control one or more functions associated with operation of the patient support apparatus 30, including without limitation one or more of: brakes, steer lock mechanisms, auxiliary wheel systems, lift systems, deck articulation, side rail articulation, component or barrier removal, and the like. The apparatus device 144 may be configured to control certain functions associated with operation of the patient support apparatus 30 between a first apparatus mode M1 and a second apparatus mode M2 different from the first apparatus mode M1, defined such as by changes in state, position, mode, activation, and the like. In some versions, the apparatus device 144 may include an apparatus receiver 146 shaped to receive the interface 76 of the instrument 74. For example, the apparatus receiver 146 may be shaped to receive the key 112 of the interface 76 of the instrument 74 (see FIG. 15). As such, selective engagement between the interface 76 of the instrument 74 and the apparatus receiver 146 (e.g., axial engagement and the application of rotational torque) can be employed to effect changes operation of the apparatus device 144, as well as to facilitate changing operation of the cover 72 between the permit mode PM and the restrict mode RM as described above.

Figure 16:
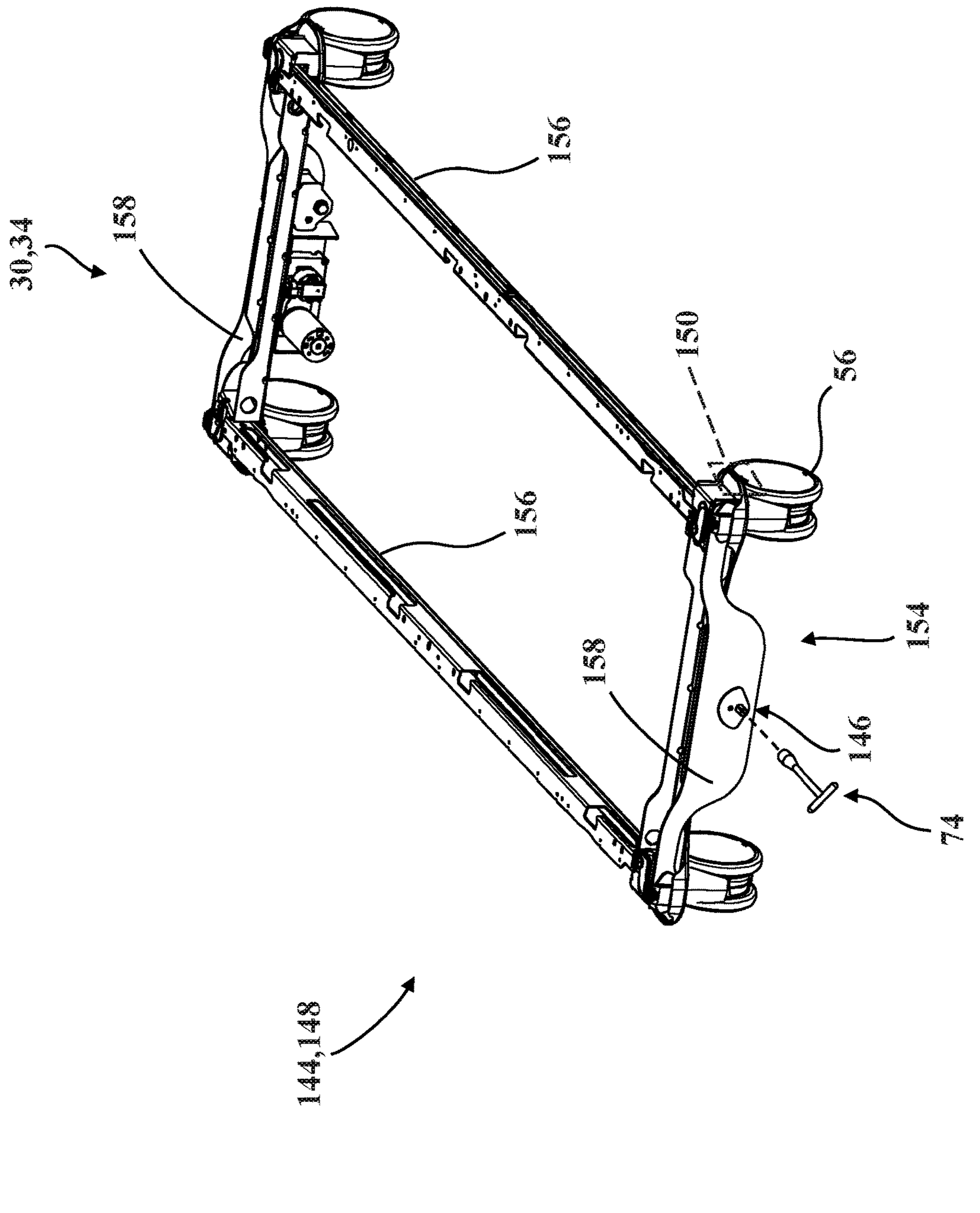
FIG. 16 is a perspective view depicting portions of the base, the apparatus device, and the instrument of FIG. 15.

In some versions, the apparatus device 144 may comprise a braking device 148, as generally depicted=in FIG. 16. The braking device 148 may enable a user, such as a caregiver, to selectively engage or disengage a brake 150 associated with one or more of the wheels 56. Here, in the first apparatus mode M1, the braking device 148 engages the brake 150 to place the brake 150 in a braked state whereby the brake 150 acts to inhibit movement of one or more wheels 56 such that rotation of the wheels 56 is restricted. In the second apparatus mode M2, the braking device 148 disengages the brake 150 to place the brake 150 in a released state to release from braking one or more wheels 56 to permit rotation of the wheels 56. It will be appreciated that various configurations, types, and arrangements of apparatus devices 144 are contemplated other than the braking device 148.

While the apparatus receiver 146 may be disposed in various locations about the patient support apparatus 30, in the instance of FIGS. 15-16 where the apparatus device 144 is embodied as the braking device 148, the apparatus receiver 146 is located proximal to the braking device 148 on the base 34. Here, the patient support apparatus 30 includes a shroud 152 coupled to the base 34, and the apparatus receiver 146 is at least partially concealed by the shroud 152 (e.g., with the apparatus receiver 146 extending outwardly from under the shroud 152 or otherwise arranged such that the shroud 152 partially or fully conceals the apparatus receiver 146 when viewed from above). However, it should be noted that other locations of the apparatus receiver 146 are contemplated. It will be appreciated that the ability to operate the braking device 148 and/or other apparatus devices 144 of the patient support apparatus 30 using the same instrument 74 that is configured to remove the cover 72 affords opportunities for improved patient and caregiver safety and helps discourage or otherwise prevent tampering with the patient support apparatus 30.

The patient support apparatus 30 is shown in FIG. 16 with the intermediate frame 36 and the patient support deck 38 removed for illustrative purposes. It should be appreciated that in the version shown, each of the wheels 56 may have an associated brake 150, but in some versions, fewer than all the wheels 56 may have an associated brake 150, e.g., only one, two, or three of the four wheels 56 have an associated brake 150. In some versions, the braking device 148 may include a plurality of brakes 150 (e.g., two, three, four, etc.)

arranged to brake the wheels 56. The braking device 148 includes a linkage 154 that is operatively coupled to the brake 150 and the apparatus receiver 146 is coupled to the linkage 154. The linkage 154 is configured to move in response to actuation via the apparatus receiver 146 to move the brake 150 between the braked state and the released state.

As shown in FIG. 16, the linkage 154 includes a pair of first links 156. In some versions, each of the first links 156 includes an elongated shaft having a hexagonal cross-sectional shape. The first links 156 may also be referred to as hex shafts. The first links 156 extend longitudinally from the head end to the foot end of the patient support apparatus 30. The first links 156 are rotatably supported by the base 34 for rotation about their axes. For example, the first links 156 may be rotatably supported in a caster housing or other bracket of the base 34 via bushings, bearings, or the like. The linkage 154 includes a pair of second links 158 arranged laterally at each of the head end and foot end. The second links 158 are supported by the base 34 to slide laterally relative to the base 34. Each of the second links 158 is operatively coupled to both the first links 156 such that movement of either of the second links 158 results in corresponding movement of both the first links 156 and movement of the other of the second links 158. In other words, the first links 156 and the second links 158 are operatively interconnected such that movement of any one of the links 156, 158 causes movement of the other links 156, 158. For instance, movement of one of the second links 158 via the apparatus receiver 146 functions to slide that second link 158 thereby rotating both the first links 156 to operate the brakes 150. In some versions, the braking device 148 may be similar to as is described in International Patent Application Publication No. WO 2021138176 A1, entitled “Patient Transport Apparatus With Electro-Mechanical Braking System,” the disclosure of which is hereby incorporated by reference in its entirety. However, other configurations are contemplated.

As noted above, another version of the cover 72 is shown in FIGS. 17A-19D. Unless otherwise indicated, for the purposes of clarity and consistency, the components and structural features of the versions of the cover 72 described above (e.g., in connection with FIGS. 6A-9F) that are the same as or that otherwise correspond to the version of the cover 72 of FIGS. 17A-19D are provided with the same reference numerals throughout the drawings and in the following description.

Referring to FIGS. 17A-19D, this version of the cover 72 and the corresponding instrument 74 (see FIG. 18C) are similar to the version of the cover 72 described above in connection with FIGS. 6A-9F. While the specific differences will be described in greater detail below, here too in this version the cover 72 may be attached to the patient support apparatus 30 and employs the restrictor 94 to selectively block access to the aperture 62 of the restraint mount 60 in order to prevent unauthorized objects from being passed through the aperture 62 of the restraint mount 60.

Figure 17A:
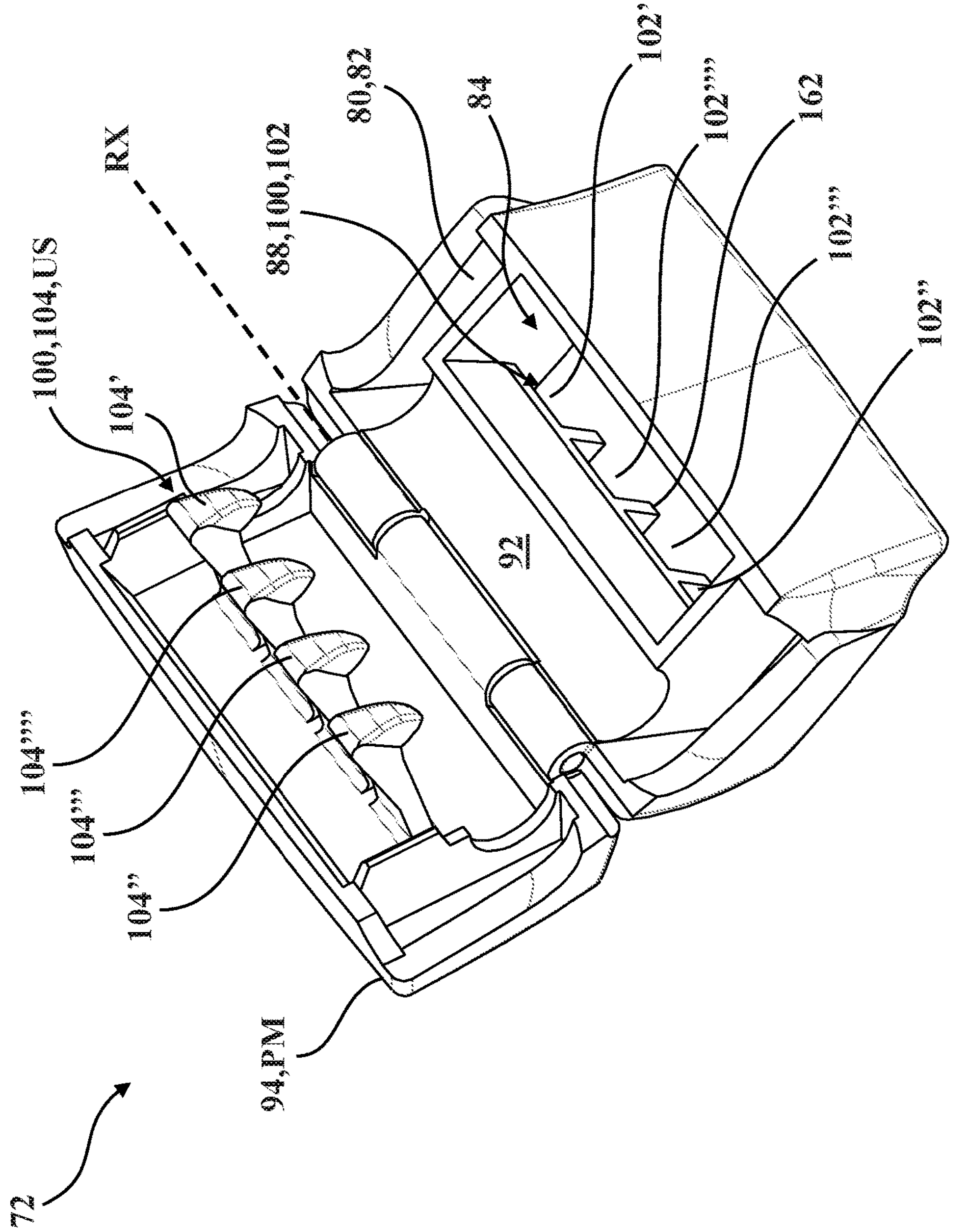
FIG. 17A is a perspective view of another version of the cover of FIG. 6A, the cover having a brace, a restrictor shown in a permit mode, and a lock mechanism with a keeper shown in an unlocked state.
Figure 17B:
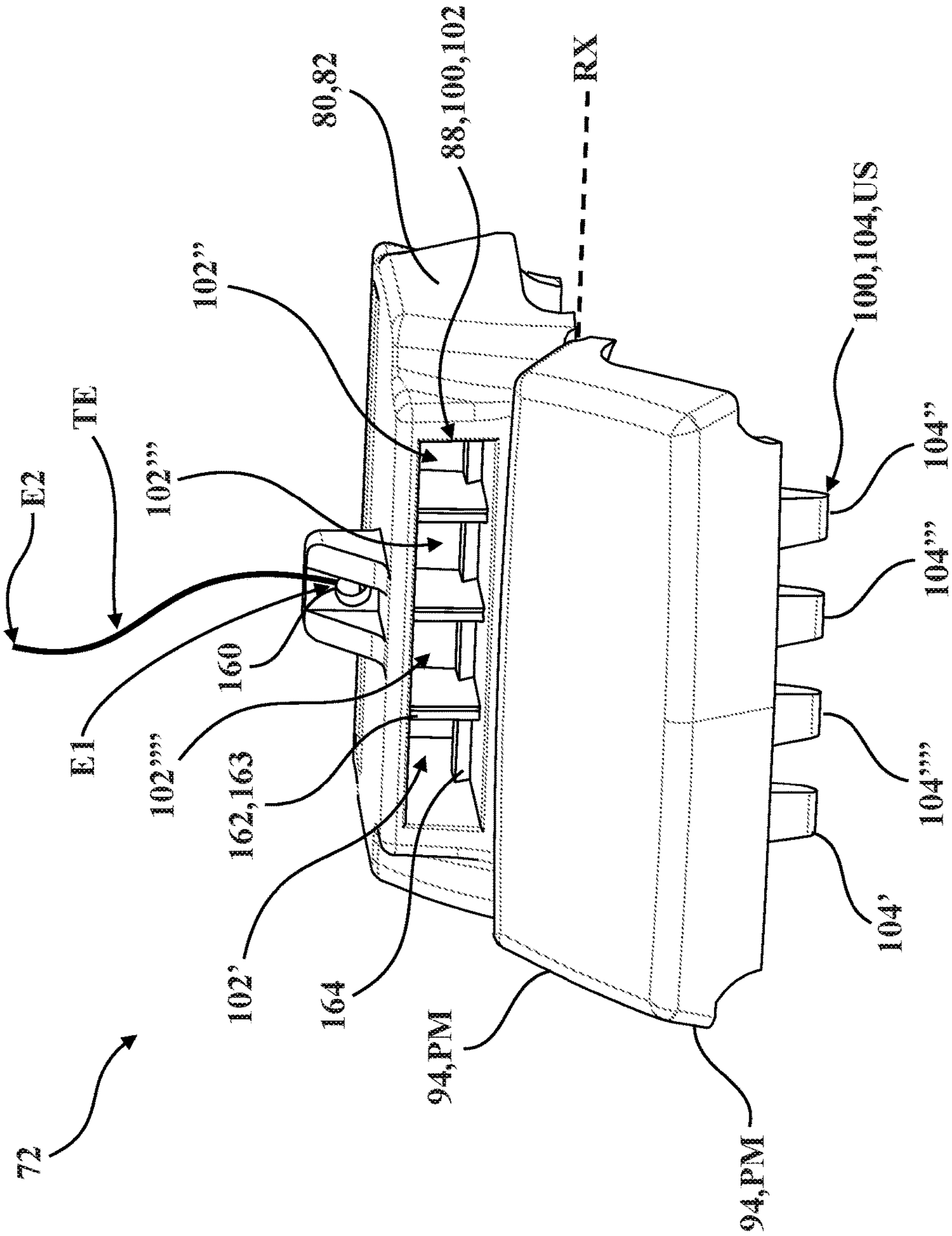
FIG. 17B is another perspective view of the cover of FIG. 17A.

As shown in FIG. 17B, in this version the cover 72 includes a tether mount 160 formed on the brace 80 to which the tether TE may be secured (not shown in detail; see also FIGS. 8A and 8G). As shown in FIG. 17A, in this version, the keeper 104 of the lock mechanism 100 is arranged on the restrictor 94 and is defined by or otherwise includes first, second, third, and fourth keepers 104', 104", 104'", 104"" which are realized as independently movable resilient fingers 106 that each define respective retention faces 108 and release faces 110. The receiver 102 of the lock mechanism 100 is similarly defined by the brace aperture 88 of the brace 80 in this version. Here, the receiver 102 is defined by or otherwise includes first, second, third, and fourth receivers 102', 102", 102'", 102"" formed in the brace body 82 of the brace 80 adjacent to respective abutment surfaces 90 which are arranged to abut corresponding retention faces 108 during operation in the restrict mode RM (see FIG. 19B).

In this version, the interface 76 of the instrument 74 includes first, second, third, and fourth tabs 78', 78", 78'", 78"" (see FIG. 18C) shaped and arranged to receive the first, second, third, and fourth receivers 102', 102", 102'", 102"" to facilitate engagement with the first, second, third, and fourth keepers 104', 104", 104'", 104"". It will be appreciated that this configuration affords significant tamper resistance, in that a total of four keepers 104 need to be simultaneously engaged with external objects in order to take the cover 72 out of the restrict mode RM in an absence of access to the instrument 74 depicted in FIG. 18C. Put differently, this configuration makes removal of the cover 72 extremely difficult for patients or other persons without access to the instrument 74. Furthermore, in this version, the configuration of the first, second, third, and fourth keepers 104', 104", 104'", 104"" along with the arrangement of the retention faces 108 and the abutment surfaces 90 during operation in the restrict mode RM and in the locked state LS results in increased engagement force acting between the retention faces 108 and the abutment surfaces 90 when attempts are made to forcibly remove the cover 72, such as by trying to force an object between the brace 80 and the restrictor 94 along arrow T depicted in FIG. 19B.

As is best shown in FIG. 17A, the first, second, third, and fourth receivers 102', 102", 102'", 102"" are delineated from each other into separate “channels” by ribs 162 which define rib catches 163 (see FIG. 17B). Here too, as is best depicted in FIG. 17B (see also FIGS. 19A-19C), dead catches 164 are arranged in each of the first, second, third, and fourth receivers 102', 102", 102'", 102"". The rib catches 163 and the dead catches 164 have notched profiles and are shaped and arranged to further promote tamper resistance by “hanging up” on unauthorized objects (e.g., tools, pens, and the like) in attempts to engage against the release faces 110 of the first, second, third, and fourth keepers 104', 104", 104'", 104"". Here too, the first, second, third, and fourth keepers 104', 104", 104'", 104"" are chamfered and employ release faces 110 that are provided with tapered profiles shaped so that unauthorized objects (e.g., tools, pens, and the like) will “glance off” either below or to the sides. Here in this version the first, second, third, and fourth tabs 78', 78", 78'", 78"" each include a respective distal notch 166 defining a notch face 168 which is spaced from the distal end of the tab 78 and is shaped to afford clearance relative to the dead catches 164 while also permitting engagement with the release faces 110 of the first, second, third, and fourth keepers 104', 104", 104'", 104"".

Figure 18A:
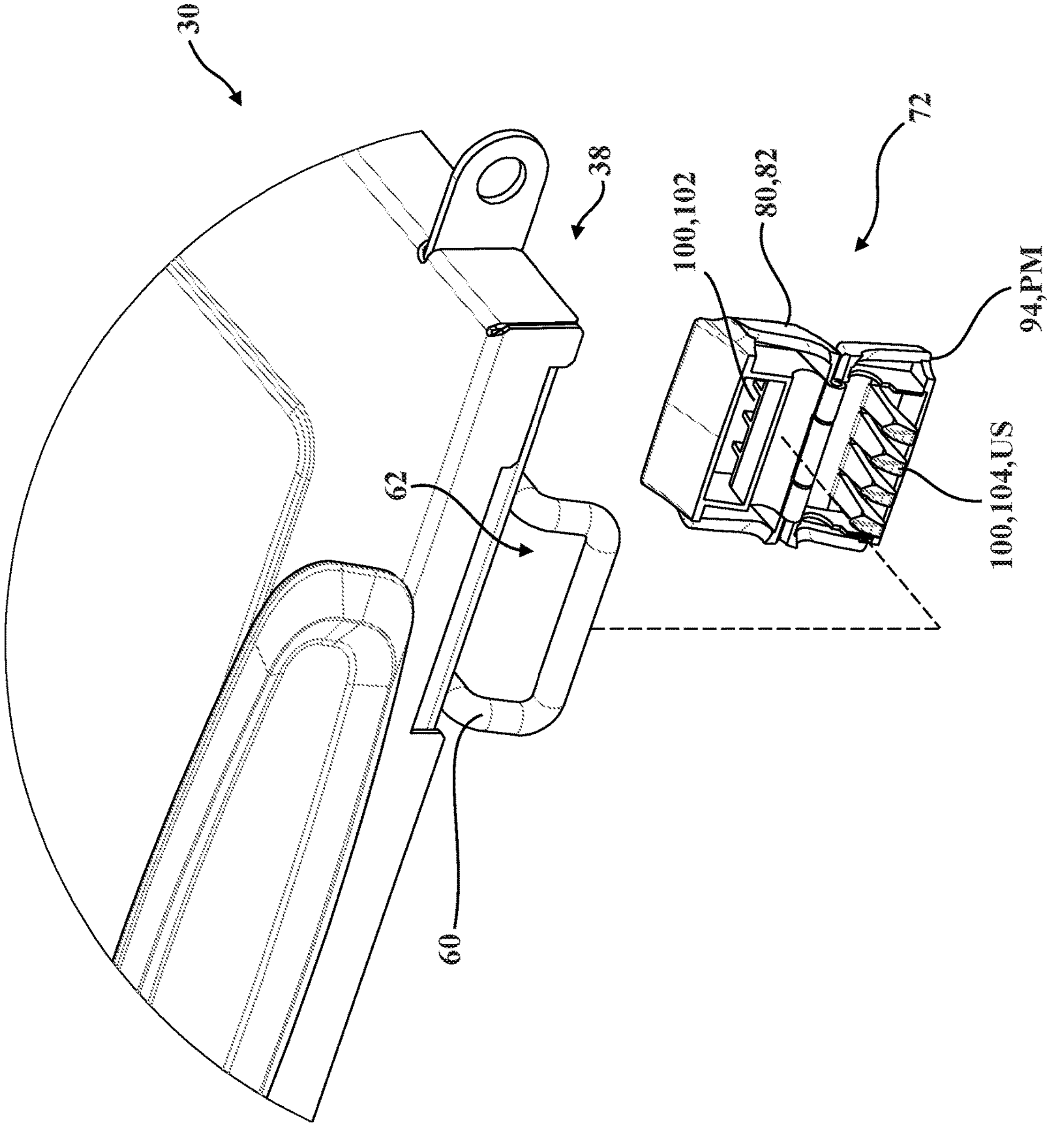
FIG. 18A is a partial perspective view of a patient support apparatus and the cover of FIGS. 17A-17B, shown with the cover disposed adjacent to a restraint mount and arranged with the restrictor in the permit mode.
Figure 18B:
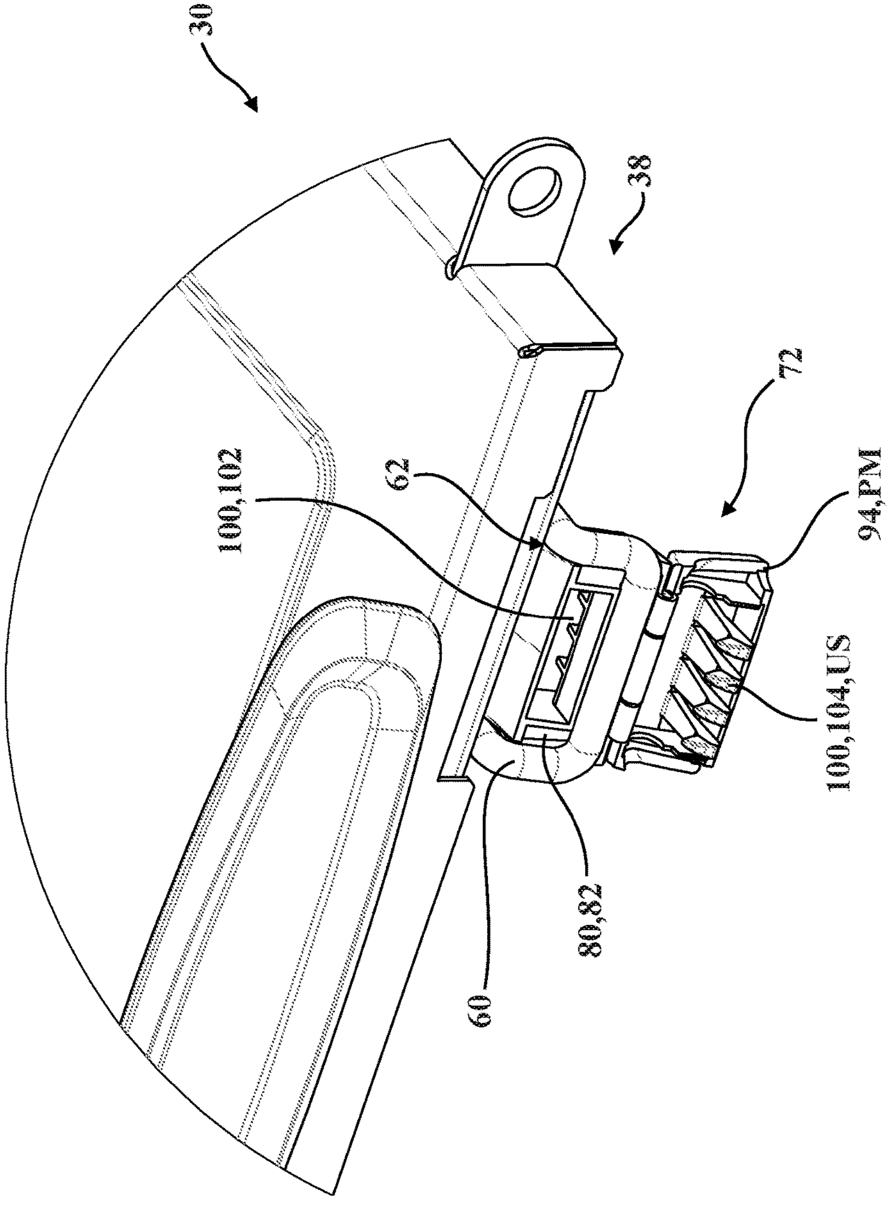
FIG. 18B is another partial perspective view of the patient support apparatus and cover of FIG. 18A, shown with the cover seated on the restraint mount and arranged with the restrictor in the permit mode.
Figure 18C:
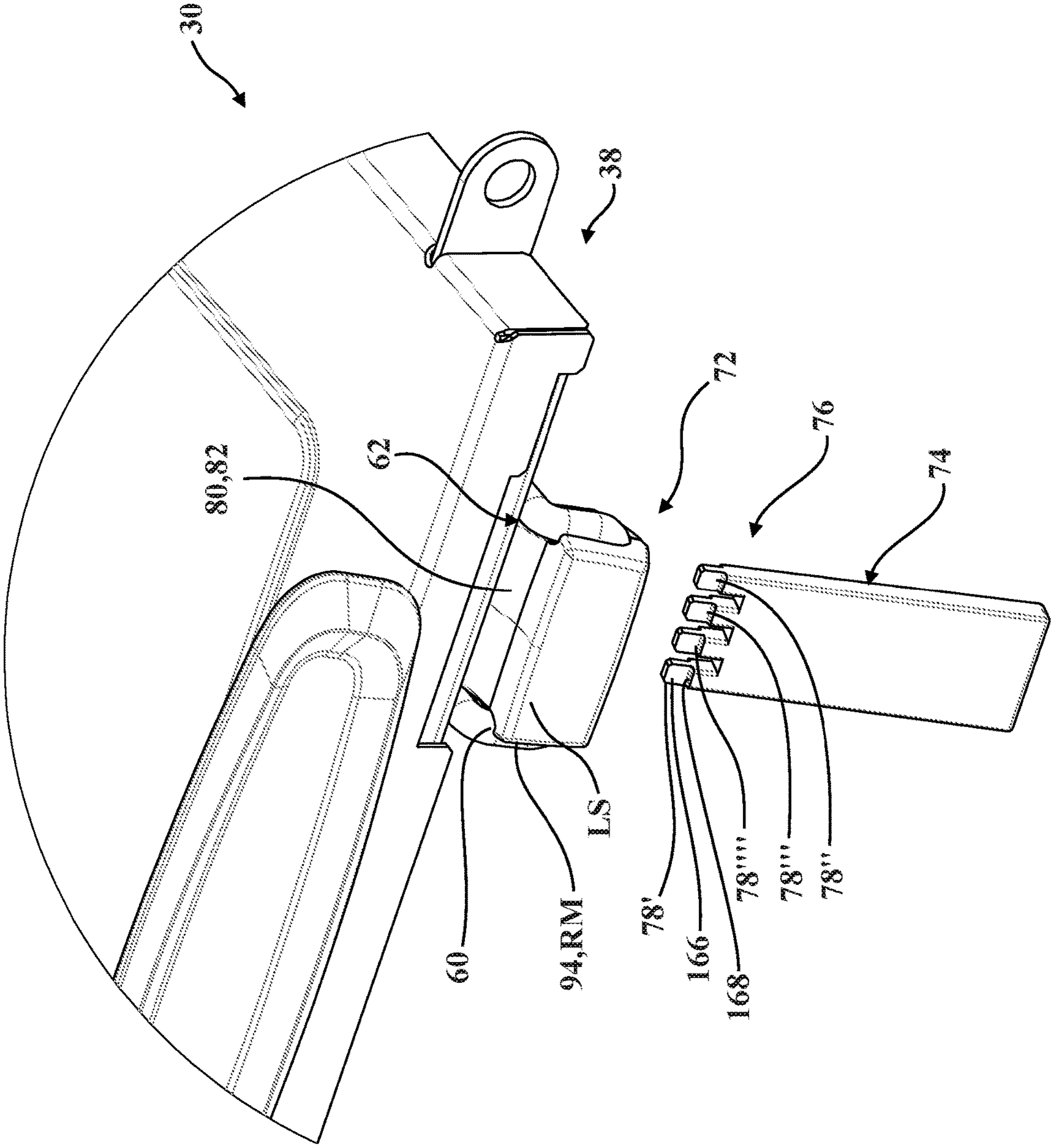
FIG. 18C is another partial perspective view of the patient support apparatus and cover of FIGS. 18A-18B, shown with the cover seated on the restraint mount and arranged with the restrictor in the restrict mode that is maintained in the locked state by the keeper of the lock mechanism, and shown with an instrument positioned adjacent to a receiver of the lock mechanism.
Figure 18D:
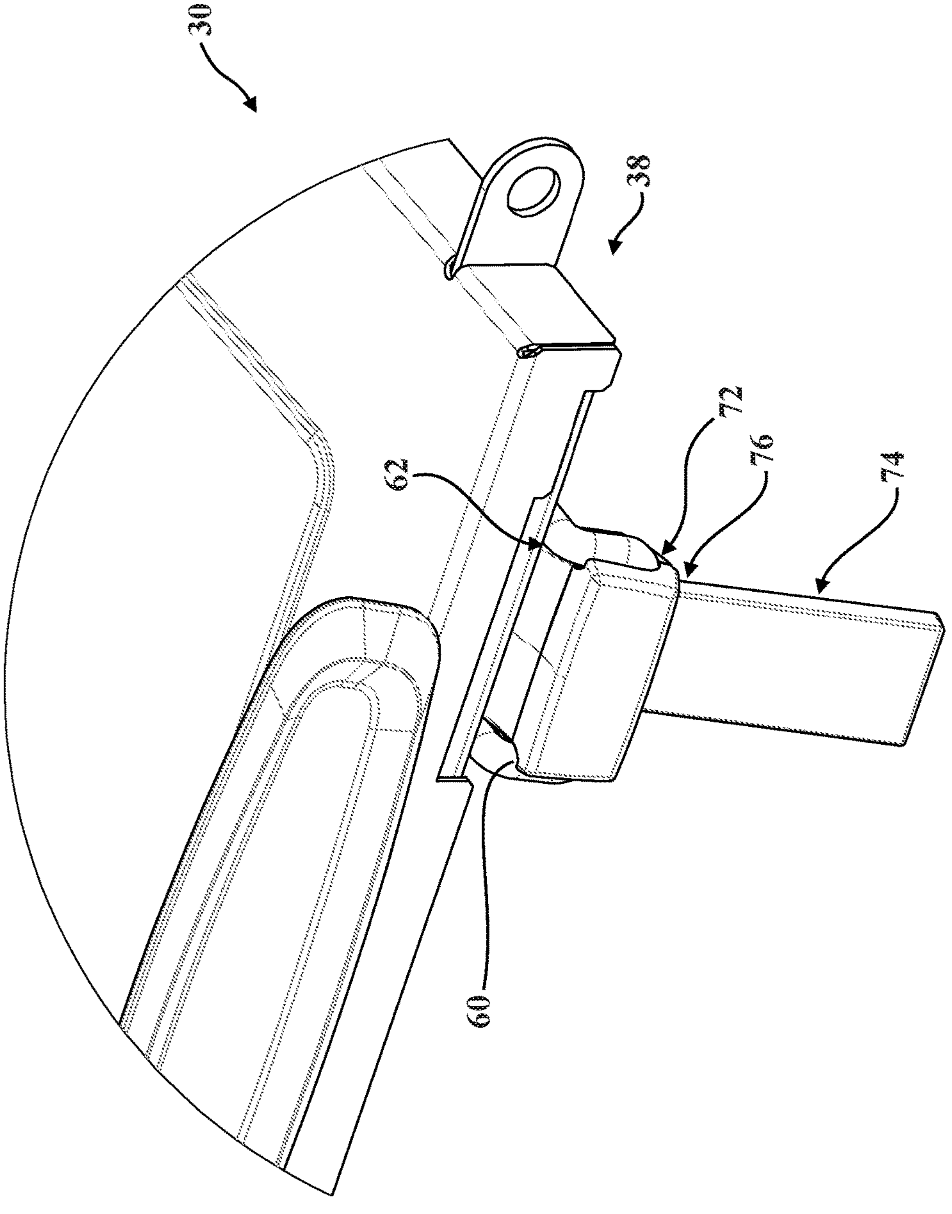
FIG. 18D is another partial perspective view of the patient support apparatus and cover of FIGS. 18A-18C, shown with the cover seated on the restraint mount and with the instrument positioned in the receiver of the lock mechanism to move the keeper to an unlocked state.
Figure 18E:
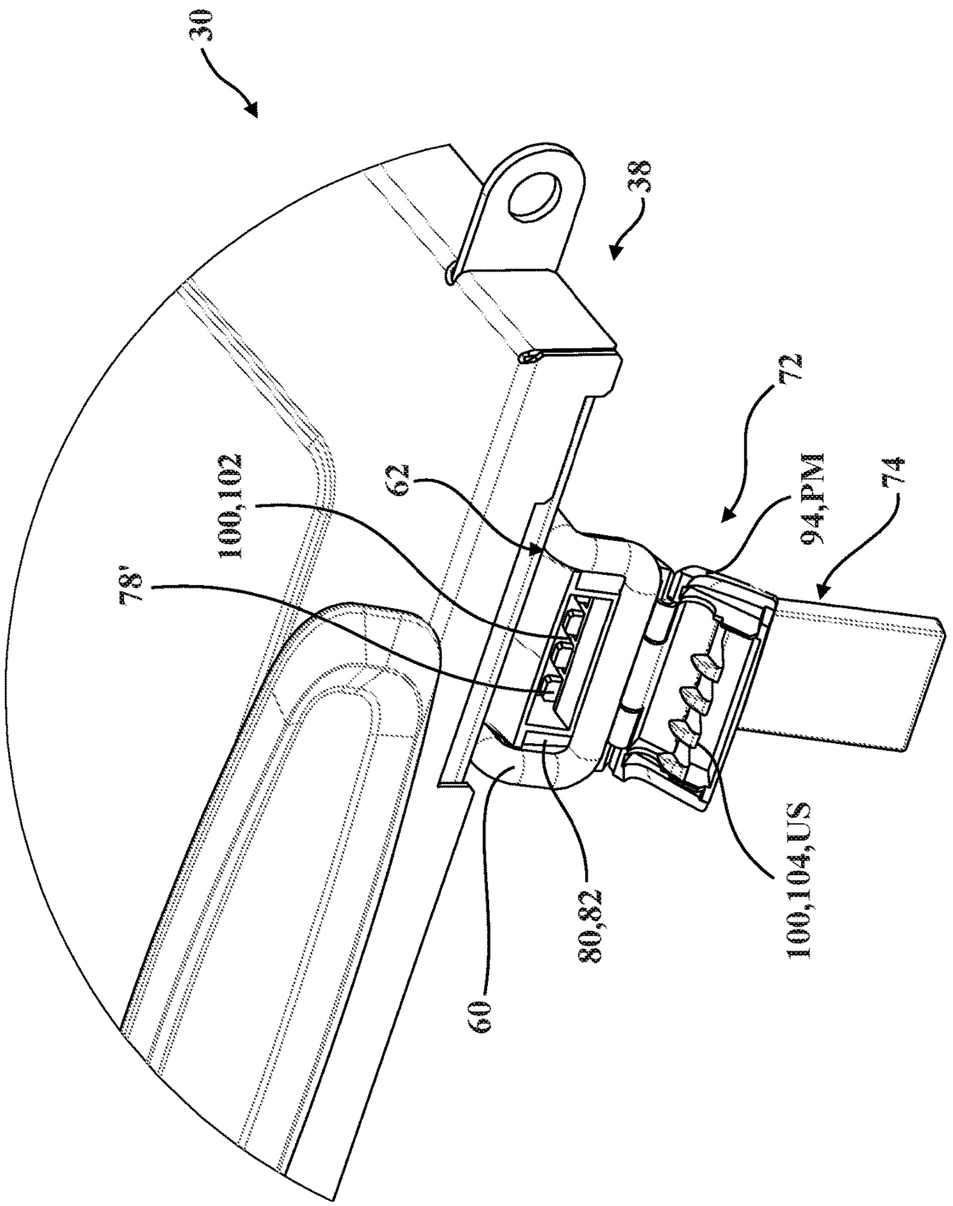
FIG. 18E is another partial perspective view of the patient support apparatus and cover of FIGS. 18A-18D, shown with the cover seated on the restraint mount and with the restrictor having moved to the permit mode in response to engagement of the instrument with the lock mechanism to facilitate removal of the cover from the restraint mount.
Figure 19A:
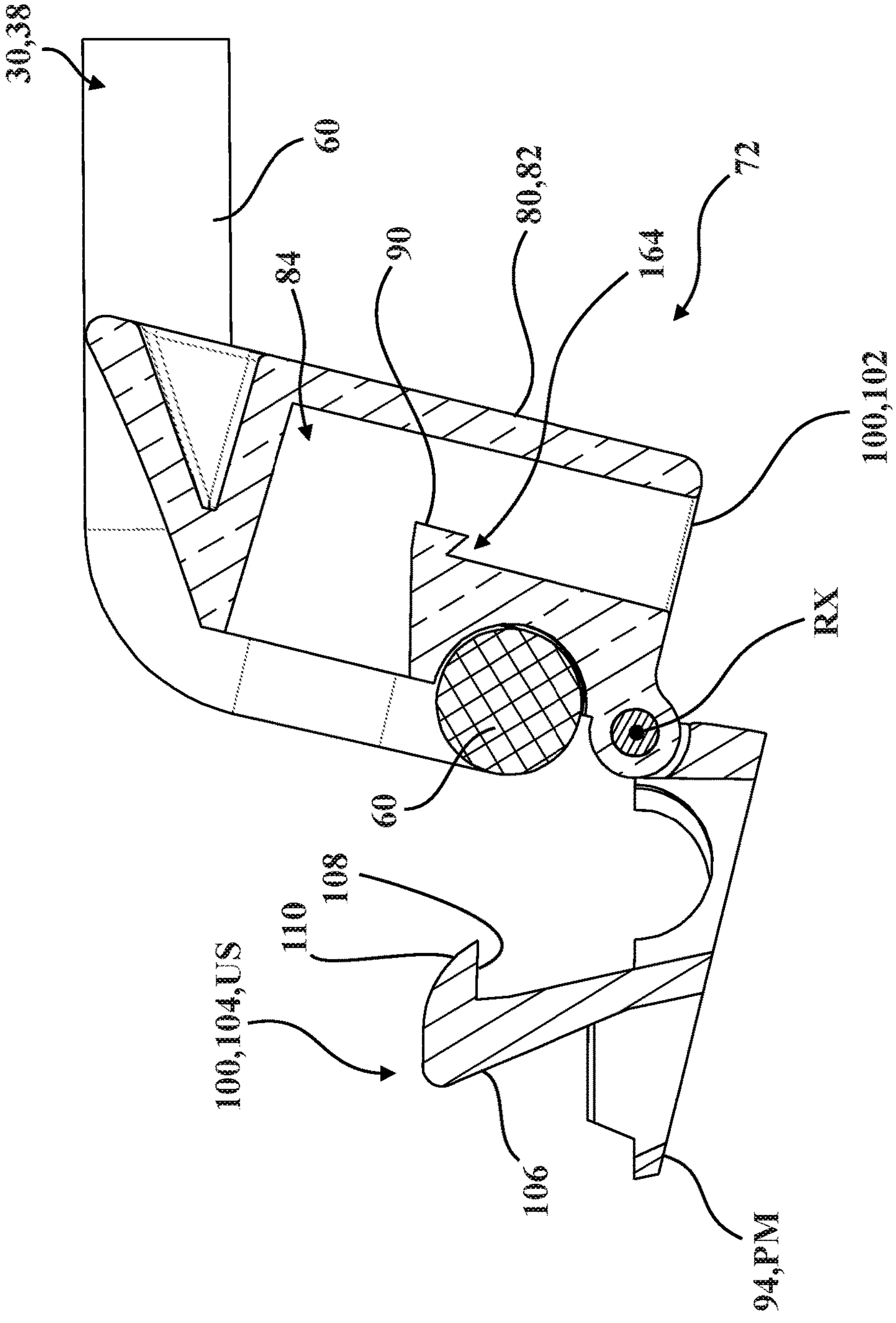
FIG. 19A is a partial sectional view of the cover and the restraint mount taken laterally through a portion of the keeper, with the cover arranged as depicted in FIG. 18B to illustrate attachment of the cover to the restraint mount with the restrictor in the permit mode.
Figure 19B:
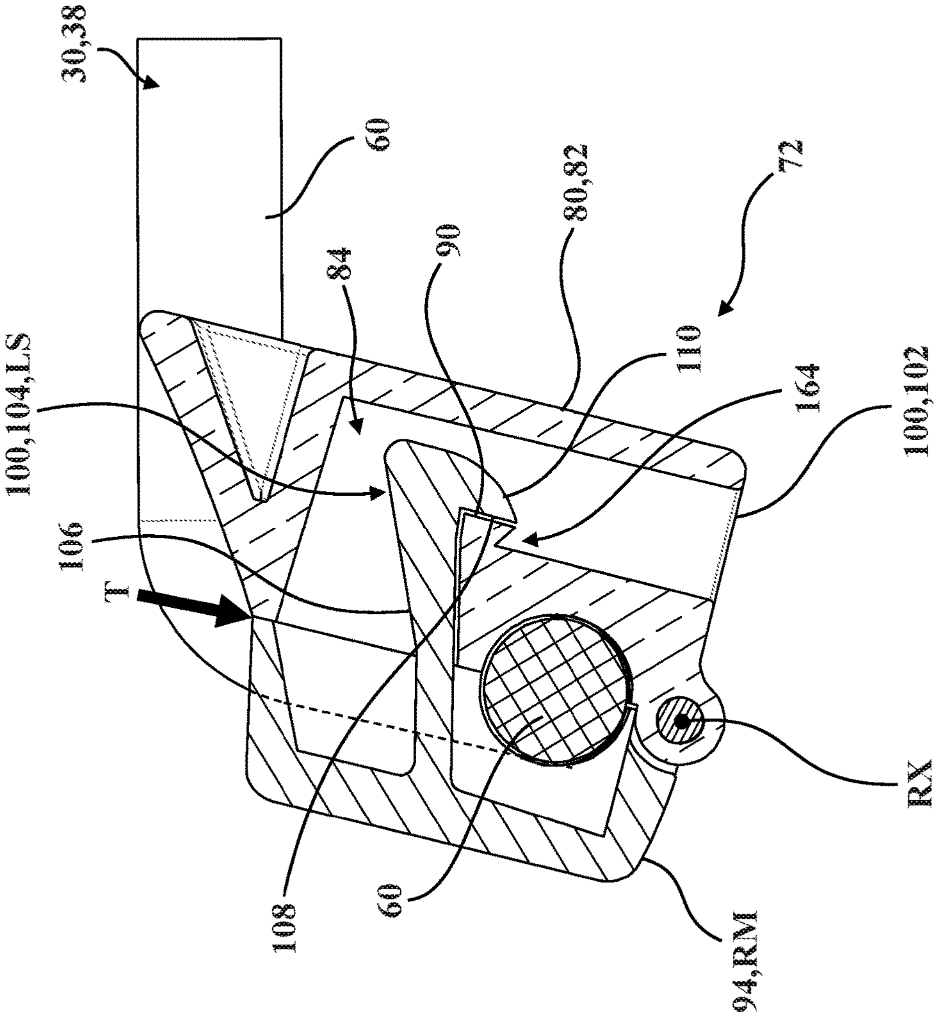
FIG. 19B is another partial sectional view of the cover and the restraint mount of FIG. 19A, with the cover arranged as depicted in FIG. 18C to illustrate operation of the restrictor in the restrict mode with the keeper in the locked state.
Figure 19C:
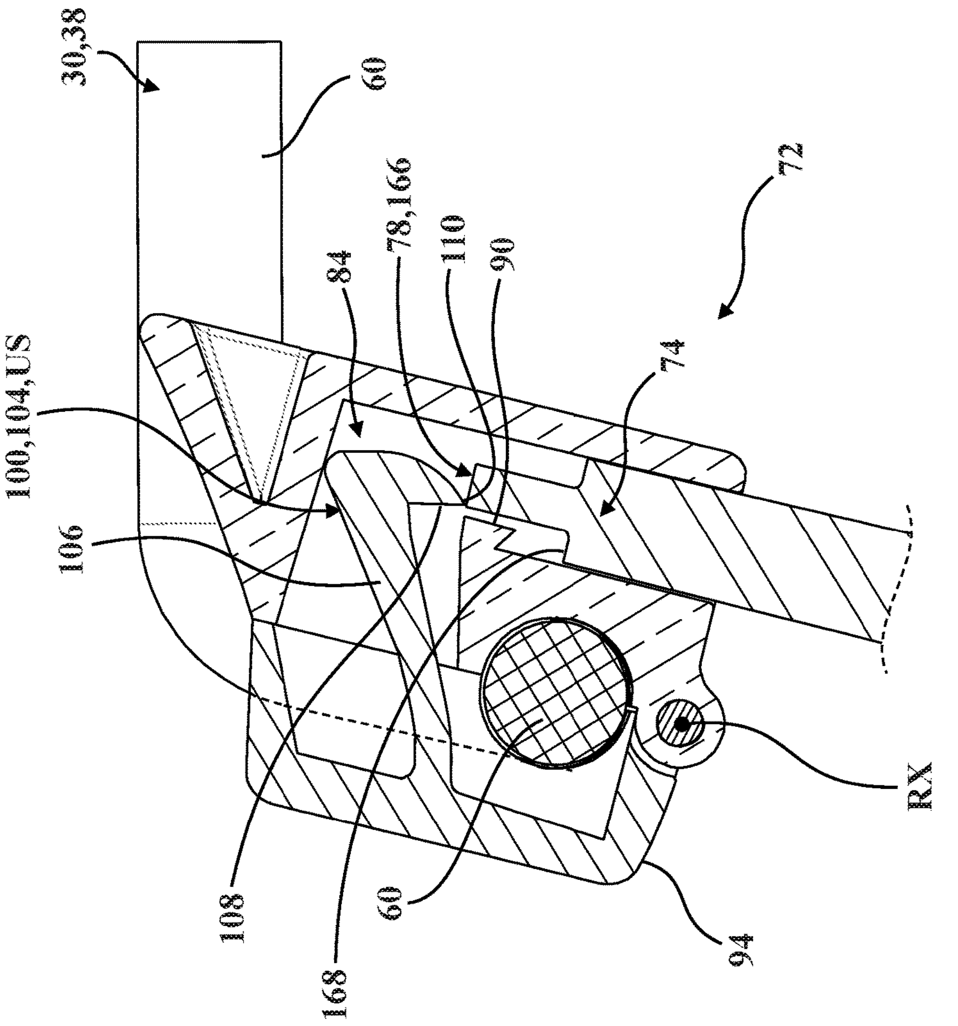
FIG. 19C is another partial sectional view of the cover and the restraint mount of FIGS. 19A-19B, shown with the cover arranged as depicted in FIG. 18D with the instrument inserted into the receiver and having moved the keeper into the unlocked state to facilitate moving the restrictor from the restrict mode to the permit mode.
Figure 19D:
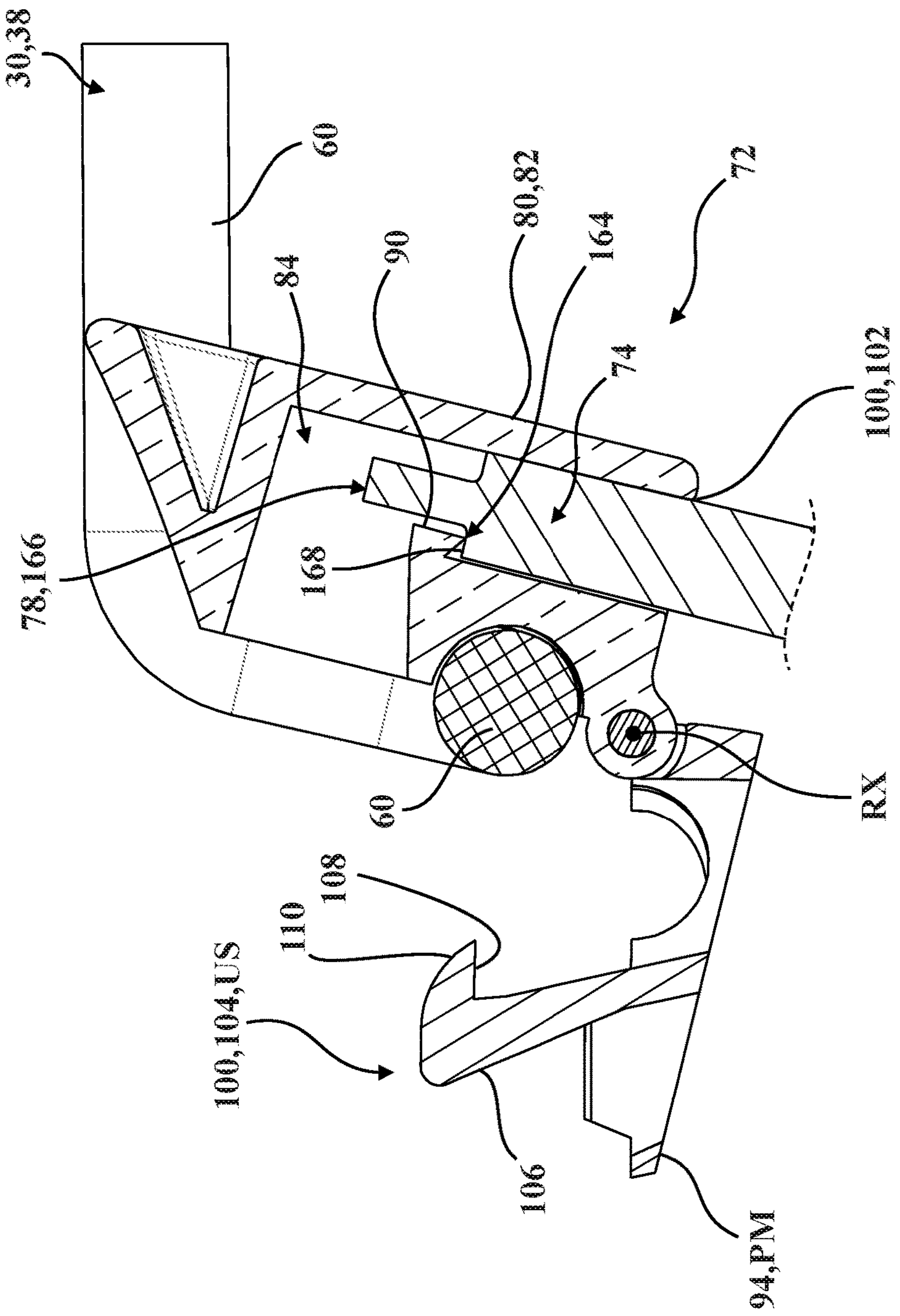
FIG. 19D is another partial sectional view of the cover, the restraint mount, and the instrument of FIG. 19C, shown with the restrictor having moved out of the restrict mode to facilitate removal of the cover from the restraint mount in the permit state.

It will be appreciated that the features described above regarding tamper resistance do not negatively impact operation of the cover 72 when used with the instrument 74 depicted in FIG. 18C.

As noted above, another version of the cover 72 is shown in FIGS. 20A-22B. Unless otherwise indicated, for the purposes of clarity and consistency, the components and structural features of the version of the cover 72 described above (e.g., in connection with FIGS. 17A-19D) that are the same as or that otherwise correspond to the version of the cover 72 of FIGS. 20A-22B are provided with the same reference numerals throughout the drawings and in the following description.

Referring to FIGS. 20A-22B, this version of the cover 72 is similar to the version of the cover 72 described above in connection with FIGS. 17A-19D. While the specific differences will be described in greater detail below, here too in this version the cover 72 may be attached to the patient support apparatus 30 and employs the restrictor 94 to selectively block access to the aperture 62 of the restraint mount 60 in order to prevent unauthorized objects from being passed through the aperture 62 of the restraint mount 60.

Figure 20A:
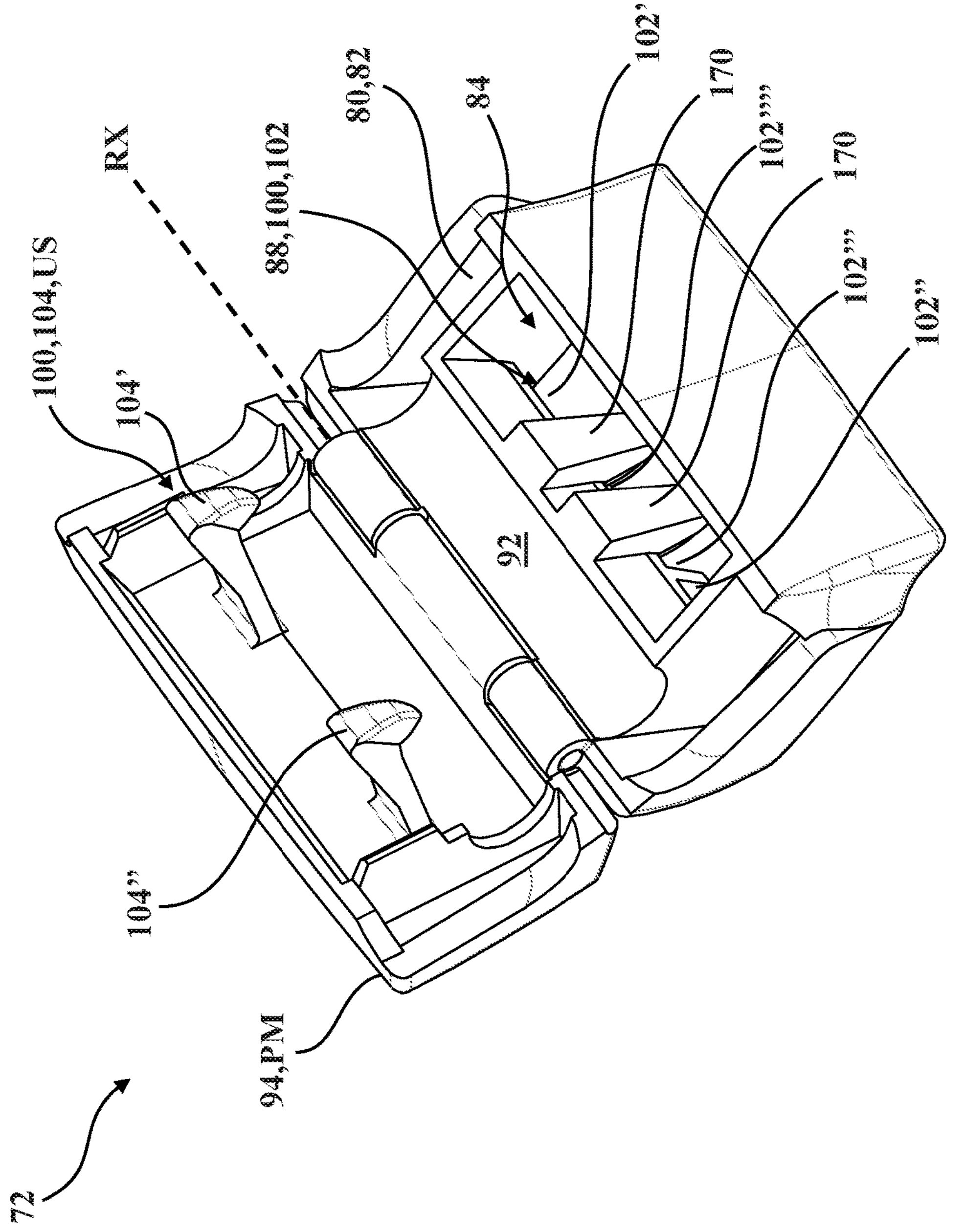
FIG. 20A is a perspective view of another version of the cover of FIG. 17A, the cover having a brace, a restrictor shown in a permit mode, and a lock mechanism with a keeper shown in an unlocked state.
Figure 20B:
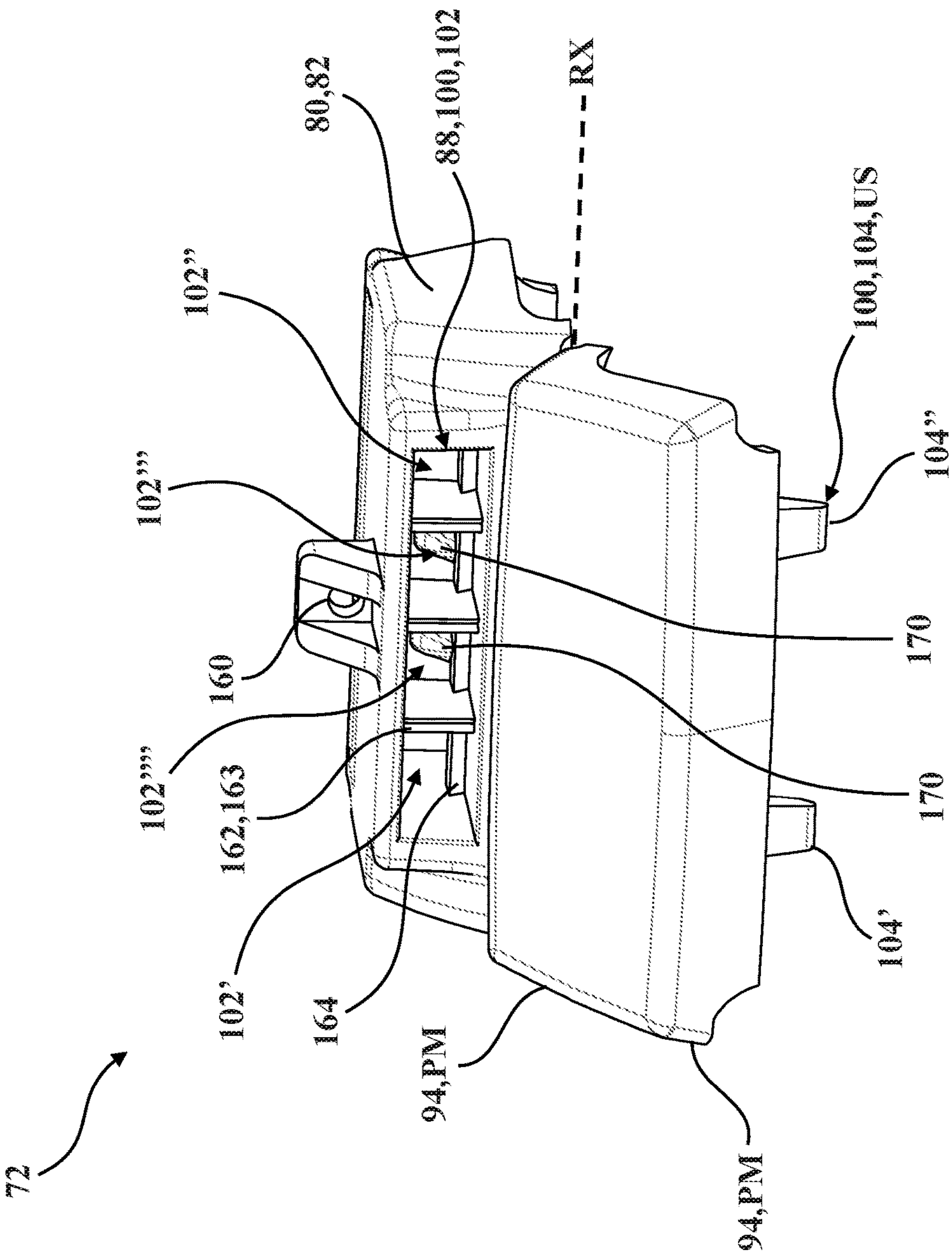
FIG. 20B is another perspective view of the cover of FIG. 20A.
Figure 21A:
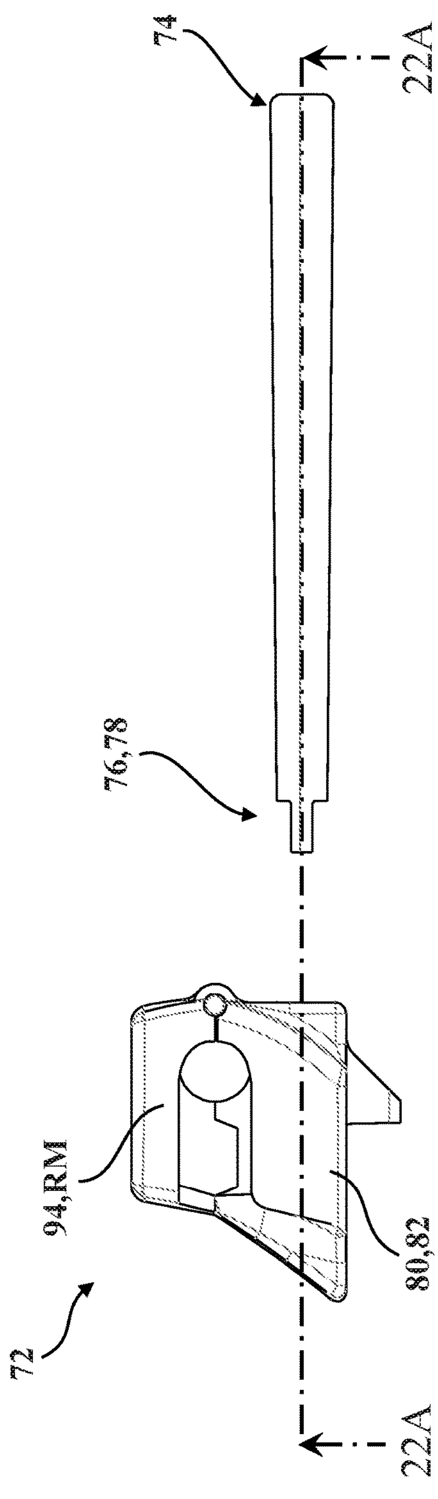
FIG. 21A is a side view of the cover of FIGS. 20A-20B shown positioned adjacent to an instrument.
Figure 21B:
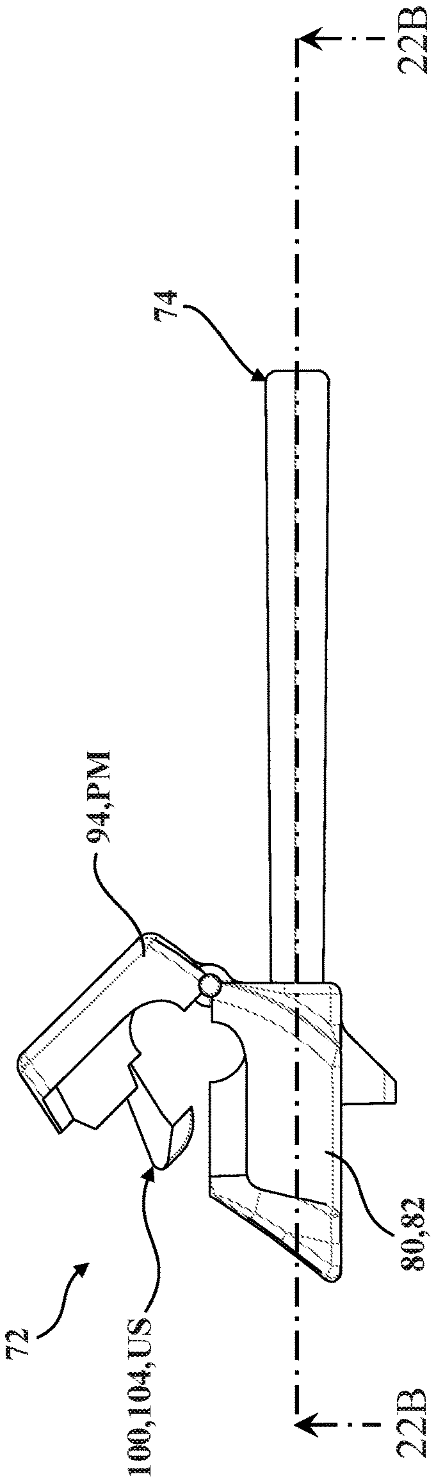
FIG. 21B is another side view of the cover and the instrument of FIG. 21A, shown with the instrument inserted into the cover.

As shown in FIG. 20A, in this version, the keeper 104 of the lock mechanism 100 is arranged on the restrictor 94 and is defined by or otherwise includes first and second keepers 104', 104" which are realized as independently movable resilient fingers 106 that each define respective retention faces 108 and release faces 110. However, in this version, the receiver 102 of the lock mechanism 100 is defined by or otherwise includes first, second, third, and fourth receivers 102', 102", 102''', 102"" formed in the brace body 82 of the brace 80. Here in this version, only the first and second receivers 102', 102" define adjacent abutment surfaces 90 which are arranged to abut corresponding retention faces 108 of the first and second keepers 104, 104" during operation in the restrict mode RM (see FIG. 19B).

Figure 22A:
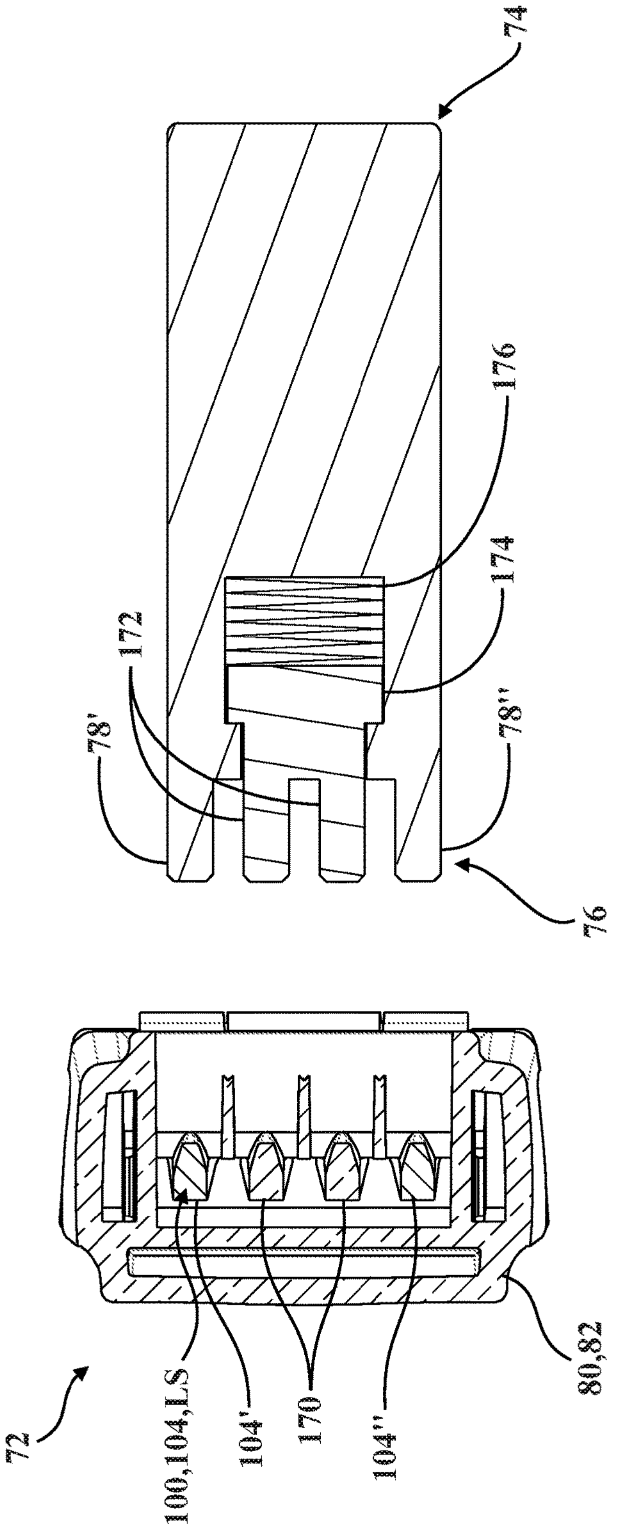
FIG. 22A is a sectional view taken along line 22A-22A in FIG. 21A.
Figure 22B:
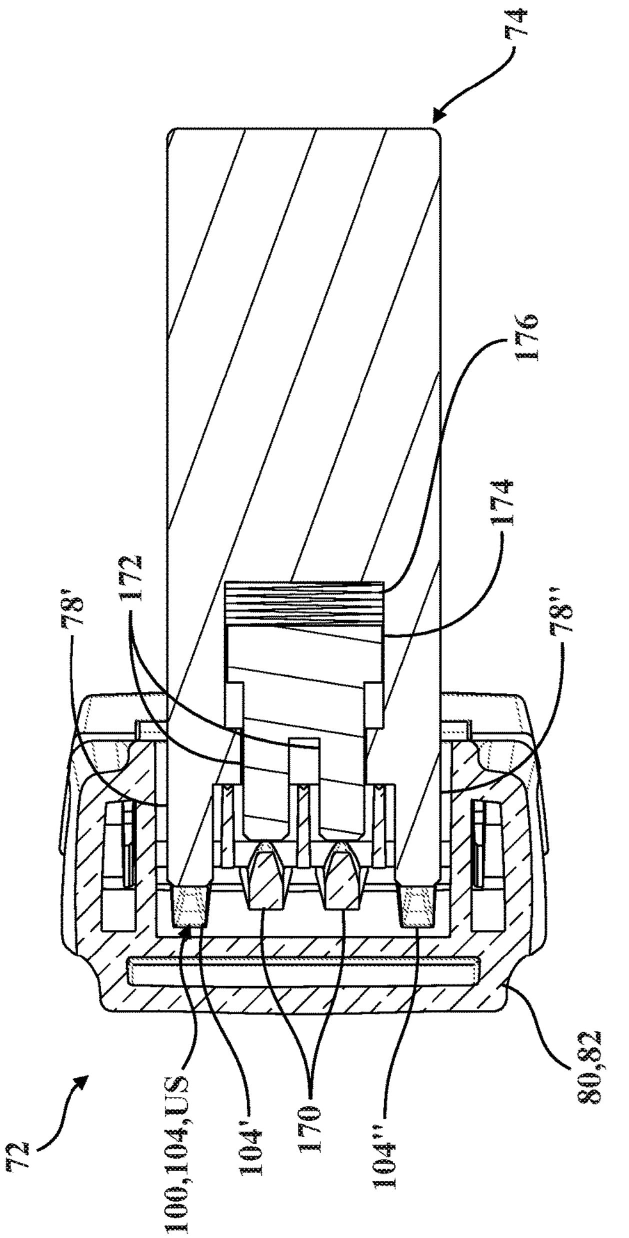
FIG. 22B is a sectional view taken along line 22B-22B in FIG. 21B.

In the illustrated version, false keepers 170 which are formed as a part of the brace body 82 of the brace 80 are associated with and disposed along the third and fourth receivers 102''', 102"". The false keepers 170 appear indistinguishable from the true first and second keepers 104', 104" when the cover 72 operates in the restrict mode RM (see FIGS. 20B and 22A). It will be appreciated that employing fewer keepers 104 than receivers 102 along with at least one false keeper 170 further promotes tamper resistance, in that a patient or another person attempting to open the cover 72 without the proper instrument 74 would waste time trying to "pick" false keepers 170. Here in this version, the interface 76 instrument 74 depicted in FIGS. 21A-21B may appear identical to the instrument 74 depicted in FIG. 18C when viewed externally, but is different in that it employs only first and second tabs 78', 78" along with retractable false tabs 172 that are associated with the third and fourth receivers 102''', 102"" along which the false keepers 170 are disposed. As is depicted generally in FIGS. 22A-22B, in this version the interface 76 of the tool 74 supports a tab carrier 174 defining the false tabs 172 which is urged distally by a carrier biasing element 176 such that the false tabs 172 appear to be additional tabs 78. In response to contact occurring between the false tabs 172 and the false keepers 170 as depicted in FIG. 22B, the tab carrier 174 retracts while the false tabs 172 are concealed from view within the receivers 102. It will be appreciated that various arrangements and quantities of false keepers 170 and/or false tabs 172 may be utilized. Other configurations are contemplated.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

Clauses

I. A cover system for selectively blocking insertion of unauthorized objects through an aperture of a restraint mount of a patient support apparatus, the cover system comprising:
- an instrument having an interface; and
- a cover including:
  - a brace configured for attaching to the patient support apparatus adjacent to the aperture,
  - a restrictor movably coupled to the brace and arranged for operation between:
    - a restrict mode where the restrictor is arranged relative to the brace to block access to the aperture of the restraint mount; and
    - a permit mode where the restrictor is arranged relative to the brace to at least partially permit access to the aperture of the restraint mount, and
  - a lock mechanism interposed between the brace and the restrictor, the lock mechanism including a receiver shaped to receive the interface of the instrument, and a keeper being movable between:
    - a locked state to inhibit movement of the restrictor relative to the brace to maintain the restrictor in the restrict mode; and
  - an unlocked state to permit movement of the restrictor relative to the brace to change operation of the restrictor between the permit mode and the restrict mode,
- wherein the keeper of the lock mechanism moves from the locked state to the unlocked state in response to selective engagement occurring between the interface of the instrument and the receiver of the lock mechanism.

II. The cover system of clause I, wherein the brace of the cover is shaped to receive at least a portion of the restraint mount of the patient support apparatus.

III. The cover system of any of clauses I-II, wherein the brace of the cover and at least a portion of the restrictor cooperate to block access to the restraint mount in the restrict mode.

IV. The cover system of any of clauses I-III, wherein the restrictor is pivotably coupled to the brace for movement about a restrictor axis between the restrict mode and the permit mode.

V. The cover system of clause IV, wherein the restrictor extends between a first end and a second end, with the keeper arranged at the first end of the restrictor, and with the restrictor axis arranged at the second end of the restrictor such that movement of the restrictor about the restrictor axis in the unlocked state moves the keeper relative to the receiver of the lock mechanism.

VI. The cover system of any of clauses IV-V, wherein engagement between the keeper and the restrictor in the locked state inhibits pivoting movement of the restrictor about the restrictor axis.

VII. The cover system of clause VI, wherein the keeper is disposed adjacent to the receiver in the locked state; and wherein the selective engagement between the interface of the instrument and the receiver of the lock mechanism is defined by movement of the interface along the receiver and into abutment with the keeper to move the keeper from the locked state to the unlocked state.

VIII. The cover system of any of clauses I-VII, wherein the brace includes a brace body defining an abutment surface; and wherein the keeper is operatively attached to the restrictor and includes a resilient finger defining a retention face arranged to contact the abutment surface of the brace body in the locked state to inhibit movement of the restrictor relative to the brace in the locked state.

IX. The cover system of clause VIII, wherein the resilient finger further defines a release face arranged adjacent to the receiver in the locked state; and wherein the selective engagement between the interface of the instrument and the receiver of the lock mechanism is defined by movement of the interface along the receiver and into abutment with the release face of the resilient finger which brings the retention face out of contact with the abutment surface of the brace body to move the keeper from the locked state to the unlocked state.

X. The cover system of any of clauses VIII-IX, wherein the brace body defines an interior with the abutment surface being located at least partially within the interior; and wherein the resilient finger is disposed at least partially within the interior in the lock state and is movable out of the interior in the unlocked state.

XI. The cover system of clause X, wherein the brace body defines an outer brace surface and a brace aperture formed in the outer brace surface and extending into communication with the interior, with the brace aperture defining the receiver.

XII. The cover system of any of clauses VIII-XI, wherein the keeper is further defined as a first keeper and the lock mechanism further includes a second keeper movable independent of the second keeper; and wherein the first keeper and the second keeper cooperate to inhibit movement of the restrictor relative to the brace in the restrict mode.

XIII. The cover system of clause XII, wherein the receiver is further defined as a first receiver shaped to receive a first tab of the interface of the instrument and the lock mechanism further includes a second receiver shaped to receive a second tab of the interface of the instrument.

XIV. The cover system of clause XIII, wherein the first and second keepers move from respective locked states to respective unlocked states in response to selective engagement occurring simultaneously between:

the first tab of the instrument and the first receiver of the lock mechanism, and the second tab of the instrument and the second receiver of the lock mechanism.

XV. The cover system of clause XIV, wherein the first keeper is disposed adjacent to the first receiver in the locked state and the second keeper is disposed adjacent to the second receiver in the locked state; and wherein the selective engagement between the first tab of the instrument and the first receiver of the lock mechanism is defined by movement of the first tab along the first receiver and into abutment with the first keeper to move the first keeper from the locked state to the unlocked state; and wherein the selective engagement between the second tab of the instrument and the second receiver of the lock mechanism is defined by movement of the second tab along the second receiver and into abutment with the second keeper to move the second keeper from the locked state to the unlocked state.

XVI. The cover system of clause I, wherein the restrictor is pivotably coupled to the brace for movement about a restrictor axis between the restrict mode and the permit mode;

wherein the receiver is pivotably coupled to the brace for movement about a receiver axis between a first receiver position and a second receiver position; and wherein the selective engagement of the interface of the instrument and the receiver of the lock mechanism is defined by rotational torque applied to the receiver from the interface which moves the receiver from the first receiver position to the second receiver position to move the keeper from the locked state to the unlocked state.

XVII. The cover system of clause XVI, wherein the brace includes a brace body defining a brace strap aperture arranged adjacent to the aperture of the restraint mount of the patient support apparatus in the permit mode, with at least a portion of the restrictor being arranged to block access to the brace strap aperture in the restrict mode to block access to both the brace strap aperture of the brace body and to the aperture of the restraint mount.

XVIII. The cover system of clause XVII, wherein the brace body further defines a guide supporting the keeper of the lock mechanism for movement between the locked state and the unlocked state.

XIX. The cover system of clause XVIII, wherein the cover further includes a link operatively attached to the receiver for concurrent movement about the receiver axis, the link defining a pivot mount; and wherein the keeper of the lock mechanism is pivotably coupled to the pivot mount such that pivoting movement of the receiver from the first receiver position to the second receiver position about the receiver axis translates into sliding movement of the keeper from the locked state to the unlocked state.

XX. The cover system of clause XIX, wherein the restrictor defines a catch face; and wherein the keeper defines a retention face arranged to contact the catch face of the restrictor in the locked state to inhibit movement of the restrictor relative to the brace in the locked state.

XXI. The cover system of clause XX, wherein the cover further includes a restrictor biasing element interposed between the restrictor and the brace body to urge the restrictor towards the permit mode during an absence of contact occurring between the catch face and the retention face.

XXII. The cover system of clause XXI, wherein the cover further includes a keeper biasing element interposed between the brace body and the keeper to urge the keeper toward the locked state during an absence of engagement between the receiver and the interface of the instrument.

XXIII. The cover system of clause XXII, wherein the keeper biasing element is coupled to the receiver to urge the receiver towards the first receiver position.

XXIV. The cover system of any of clauses XX-XXIII, wherein the restrictor further includes an extension spaced from the catch face and arranged for user engagement; and wherein the brace body further defines a relief arranged adjacent to the extension of the restrictor in the permit mode and shaped to permit user engagement with the extension to move the restrictor to the restrict mode.

XXV. The cover system of clause XXIV, wherein the restrictor is configured to move from the permit mode to the restrict mode in response to force applied to the extension via user engagement.

XXVI. The cover system of any of clauses XXIV-XXV, wherein the keeper defines a transition surface; and wherein the restrictor defines a release surface arranged in spaced relation from the transition surface in the restrict mode and in the permit mode, where movement of the restrictor from the permit mode towards the restrict mode brings the release surface into engagement with the transition surface to urge the keeper from the locked state towards the unlocked state until subsequent disengagement between the release surface and the transition surface permits the keeper to move to the locked state to retain the restrictor in the restrict mode.

XXVII. The cover system of any of clauses I-XXVI, wherein the brace of the cover is configured to engage at least a portion of the restraint mount of the patient support apparatus.

XXVIII. The cover system of any of clauses I-XXVII, wherein the brace of the cover includes fastener mounts arranged to engage fasteners for securing the cover adjacent to the restraint mount of the patient support apparatus.

XXIX. The cover system of any of clauses I-XXVIII, further including a tether to limit movement of the cover away from the restraint mount of the patient support apparatus in the permit mode, the tether having a first tether end operatively attached to one of the brace and the restrictor, and a second tether end for attaching to the patient support apparatus.

XXX. The cover system of any of clauses I-XXIX, wherein the interface of the instrument includes a key configured to engage the receiver of the lock mechanism; and wherein the receiver is shaped to receive the key.

XXXI. A patient support system comprising:

an instrument having an interface;

a patient support apparatus including:

a support structure with a patient support deck;

a restraint mount defining an aperture; and an apparatus device configured to control a function associated with operation of the patient support apparatus between a first apparatus mode and a second apparatus mode different from the first apparatus mode, the apparatus device including an apparatus receiver shaped to receive the interface of the instrument, wherein selective engagement occurring between the interface of the instrument and the apparatus receiver of the apparatus device changes operation between the first apparatus mode and the second apparatus mode; and a cover for selectively blocking insertion of unauthorized objects through the aperture of the restraint mount, the cover including:

a brace configured for attaching to the patient support apparatus adjacent to the aperture, a restrictor movably coupled to the brace and arranged for operation between:

a restrict mode where the restrictor is arranged relative to the brace to block access to the aperture of the restraint mount; and a permit mode where the restrictor is arranged relative to the brace to at least partially permit access to the aperture of the restraint mount, and a lock mechanism interposed between the brace and the restrictor, the lock mechanism including a receiver shaped to receive the interface of the instrument, and a keeper being movable between:

a locked state to inhibit movement of the restrictor relative to the brace to maintain the restrictor in the restrict mode; and an unlocked state to permit movement of the restrictor relative to the brace to change operation of the restrictor between the permit mode and the restrict mode, wherein the keeper of the lock mechanism moves from the locked state to the unlocked state in response to selective engagement occurring between the interface of the instrument and the receiver of the lock mechanism.

XXXII. The patient support system of clause XXXI, wherein the patient support apparatus further includes a plurality of wheels coupled to the support structure; and wherein the apparatus device is further defined as a braking device operable to brake at least one of the plurality of wheels in the first apparatus mode and to permit rotation of the plurality of wheels in the second apparatus mode.

XXXIII. The patient support system of clause XXXII, wherein the support structure of the patient support apparatus includes a base;

wherein the patient support apparatus further comprises a shroud coupled to the base; and wherein the apparatus receiver is at least partially concealed by the shroud.

XXXIV. The patient support system of any of clauses XXXII-XXXIII, further comprising a patient restraint having a restraint end shaped to be inserted through the aperture of the restraint mount of the patient support apparatus when the restrictor of the cover operates in the permit mode.

What is claimed is:

1. A cover system for selectively blocking insertion of unauthorized objects through an aperture of a restraint mount of a patient support apparatus, the cover system comprising:

an instrument having an interface; and a cover including:

a brace configured for attaching to the patient support apparatus adjacent to the aperture, a restrictor movably coupled to the brace and arranged for operation between:

a restrict mode where the restrictor is arranged relative to the brace to block access to the aperture of the restraint mount; and a permit mode where the restrictor is arranged relative to the brace to at least partially permit access to the aperture of the restraint mount, and a lock mechanism interposed between the brace and the restrictor, the lock mechanism including a receiver shaped to receive the interface of the instrument, and a keeper being movable between:

a locked state to inhibit movement of the restrictor relative to the brace to maintain the restrictor in the restrict mode; and an unlocked state to permit movement of the restrictor relative to the brace to change operation of the restrictor between the permit mode and the restrict mode, wherein the keeper of the lock mechanism moves from the locked state to the unlocked state in response to selective engagement occurring between the interface of the instrument and the receiver of the lock mechanism.

2. The cover system of claim 1, wherein the brace of the cover is shaped to receive at least a portion of the restraint mount of the patient support apparatus.

3. The cover system of claim 1, wherein the brace of the cover and at least a portion of the restrictor cooperate to block access to the restraint mount in the restrict mode.

4. The cover system of claim 1, wherein the restrictor is pivotably coupled to the brace for movement about a restrictor axis between the restrict mode and the permit mode; and wherein the restrictor extends between a first end and a second end, with the keeper arranged at the first end of the restrictor, and with the restrictor axis arranged at the second end of the restrictor such that movement of the restrictor about the restrictor axis in the unlocked state moves the keeper relative to the receiver of the lock mechanism.

5. The cover system of claim 1, wherein the restrictor is pivotably coupled to the brace for movement about a restrictor axis between the restrict mode and the permit mode;

wherein engagement between the keeper and the restrictor in the locked state inhibits pivoting movement of the restrictor about the restrictor axis;

wherein the keeper is disposed adjacent to the receiver in the locked state; and wherein the selective engagement between the interface of the instrument and the receiver of the lock mechanism is defined by movement of the interface along the receiver and into abutment with the keeper to move the keeper from the locked state to the unlocked state.

6. The cover system of claim 1, wherein the brace includes a brace body defining an abutment surface; and wherein the keeper is operatively attached to the restrictor and includes a resilient finger defining a retention face arranged to contact the abutment surface of the brace body in the locked state to inhibit movement of the restrictor relative to the brace in the locked state.

7. The cover system of claim 6, wherein the resilient finger further defines a release face arranged adjacent to the receiver in the locked state; and wherein the selective engagement between the interface of the instrument and the receiver of the lock mechanism is defined by movement of the interface along the receiver and into abutment with the release face of the resilient finger which brings the retention face out of contact with the abutment surface of the brace body to move the keeper from the locked state to the unlocked state.

8. The cover system of claim 6, wherein the brace body defines an interior with the abutment surface being located at least partially within the interior;

wherein the resilient finger is disposed at least partially within the interior in the lock state and is movable out of the interior in the unlocked state; and wherein the brace body defines an outer brace surface and a brace aperture formed in the outer brace surface and extending into communication with the interior, with the brace aperture defining the receiver.

9. The cover system of claim 6, wherein the keeper is further defined as a first keeper and the receiver is further defined as a first receiver shaped to receive a first tab of the interface of the instrument;

wherein the lock mechanism further includes a second keeper movable independent of the second keeper, and a second receiver shaped to receive a second tab of the interface of the instrument;

wherein the first keeper and the second keeper cooperate to inhibit movement of the restrictor relative to the brace in the restrict mode; and wherein the first and second keepers move from respective locked states to respective unlocked states in response to selective engagement occurring simultaneously between:

the first tab of the instrument and the first receiver of the lock mechanism, and the second tab of the instrument and the second receiver of the lock mechanism.

10. The cover system of claim 9, wherein the first keeper is disposed adjacent to the first receiver in the locked state and the second keeper is disposed adjacent to the second receiver in the locked state; and wherein the selective engagement between the first tab of the instrument and the first receiver of the lock mechanism is defined by movement of the first tab along the first receiver and into abutment with the first keeper to move the first keeper from the locked state to the unlocked state; and wherein the selective engagement between the second tab of the instrument and the second receiver of the lock mechanism is defined by movement of the second tab along the second receiver and into abutment with the second keeper to move the second keeper from the locked state to the unlocked state.

11. The cover system of claim 1, wherein the restrictor is pivotably coupled to the brace for movement about a restrictor axis between the restrict mode and the permit mode;

wherein the receiver is pivotably coupled to the brace for movement about a receiver axis between a first receiver position and a second receiver position;

wherein the selective engagement of the interface of the instrument and the receiver of the lock mechanism is defined by rotational torque applied to the receiver from the interface which moves the receiver from the first receiver position to the second receiver position to move the keeper from the locked state to the unlocked state; and wherein the brace includes a brace body defining a brace strap aperture arranged adjacent to the aperture of the restraint mount of the patient support apparatus in the permit mode, with at least a portion of the restrictor being arranged to block access to the brace strap aperture in the restrict mode to block access to both the brace strap aperture of the brace body and to the aperture of the restraint mount.

12. The cover system of claim 11, wherein the brace body further defines a guide supporting the keeper of the lock mechanism for movement between the locked state and the unlocked state;

wherein the cover further includes a link operatively attached the receiver for concurrent movement about the receiver axis, the link defining a pivot mount;

wherein the keeper of the lock mechanism is pivotably coupled to the pivot mount such that pivoting movement of the receiver from the first receiver position to the second receiver position about the receiver axis translates into sliding movement of the keeper from the locked state to the unlocked state;

wherein the restrictor defines a catch face; and wherein the keeper defines a retention face arranged to contact the catch face of the restrictor in the locked state to inhibit movement of the restrictor relative to the brace in the locked state.

13. The cover system of claim 12, wherein the cover further includes a restrictor biasing element interposed between the restrictor and the brace body to urge the restrictor towards the permit mode during an absence of contact occurring between the catch face and the retention face; and wherein the cover further includes a keeper biasing element interposed between the brace body and the keeper to urge the keeper toward the locked state during an absence of engagement between the receiver and the interface of the instrument.

14. The cover system of claim 12, wherein the restrictor further includes an extension spaced from the catch face and arranged for user engagement;

wherein the brace body further defines a relief arranged adjacent to the extension of the restrictor in the permit mode and shaped to permit user engagement with the extension to move the restrictor to the restrict mode; and wherein the restrictor is configured to move from the permit mode to the restrict mode in response to force applied to the extension via user engagement.

15. The cover system of claim 14, wherein the keeper defines a transition surface; and wherein the restrictor defines a release surface arranged in spaced relation from the transition surface in the restrict mode and in the permit mode, where movement of the restrictor from the permit mode towards the restrict mode brings the release surface into engagement with the transition surface to urge the keeper from the locked state towards the unlocked state until subsequent disengagement between the release surface and the transition surface permits the keeper to move to the locked state to retain the restrictor in the restrict mode.

16. The cover system of claim 1, wherein the brace of the cover includes fastener mounts arranged to engage fasteners for securing the cover adjacent to the restraint mount of the patient support apparatus.

17. The cover system of claim 1, further including a tether to limit movement of the cover away from the restraint mount of the patient support apparatus in the permit mode, the tether having a first tether end operatively attached to one of the brace and the restrictor, and a second tether end for attaching to the patient support apparatus.

18. A patient support system comprising:

an instrument having an interface;

a patient support apparatus including:

a support structure with a patient support deck;

a restraint mount defining an aperture; and an apparatus device configured to control a function associated with operation of the patient support apparatus between a first apparatus mode and a second apparatus mode different from the first apparatus mode, the apparatus device including an apparatus receiver shaped to receive the interface of the instrument, wherein selective engagement occurring between the interface of the instrument and the apparatus receiver of the apparatus device changes operation between the first apparatus mode and the second apparatus mode; and a cover for selectively blocking insertion of unauthorized objects through the aperture of the restraint mount, the cover including:

a brace configured for attaching to the patient support apparatus adjacent to the aperture, a restrictor movably coupled to the brace and arranged for operation between:

a restrict mode where the restrictor is arranged relative to the brace to block access to the aperture of the restraint mount; and a permit mode where the restrictor is arranged relative to the brace to at least partially permit access to the aperture of the restraint mount, and a lock mechanism interposed between the brace and the restrictor, the lock mechanism including a receiver shaped to receive the interface of the instrument, and a keeper being movable between:

a locked state to inhibit movement of the restrictor relative to the brace to maintain the restrictor in the restrict mode; and an unlocked state to permit movement of the restrictor relative to the brace to change operation of the restrictor between the permit mode and the restrict mode, wherein the keeper of the lock mechanism moves from the locked state to the unlocked state in response to selective engagement occurring between the interface of the instrument and the receiver of the lock mechanism.

19. The patient support system of claim 18, wherein the support structure of the patient support apparatus includes a base supporting a plurality of wheels;

wherein the apparatus device is further defined as a braking device operable to brake at least one of the plurality of wheels in the first apparatus mode and to permit rotation of the plurality of wheels in the second apparatus mode;

wherein the patient support apparatus further comprises a shroud coupled to the base; and wherein the apparatus receiver is at least partially concealed by the shroud.

20. The patient support system of claim 19, further comprising a patient restraint having a restraint end shaped to be inserted through the aperture of the restraint mount of the patient support apparatus when the restrictor of the cover operates in the permit mode.

* * * * *